(12) United States Patent
Ferren et al.

(10) Patent No.: US 12,078,454 B2
(45) Date of Patent: Sep. 3, 2024

(54) UNIVERSAL LASERLESS TRAINING ARCHITECTURE

(71) Applicant: Cubic Corporation, San Diego, CA (US)

(72) Inventors: Bran Ferren, Beverly Hills, CA (US); Colton O'Connor, Los Angeles, CA (US); Robert Liebersbach, Glendale, CA (US); Julian Brooks, Los Angeles, CA (US); Clinton Hope, Los Angeles, CA (US); Houstin Lee Lichtenwalner, Jr., Emmaus, PA (US)

(73) Assignee: Cubic Defense Applications, Inc., San Diego, CA (US)

( * ) Notice: Subject to any disclaimer, the term of this patent is extended or adjusted under 35 U.S.C. 154(b) by 585 days.

(21) Appl. No.: 16/994,345

(22) Filed: Aug. 14, 2020

(65) Prior Publication Data
US 2021/0302128 A1 Sep. 30, 2021

Related U.S. Application Data

(60) Provisional application No. 62/886,814, filed on Aug. 14, 2019.

(51) Int. Cl.
*F41G 3/26* (2006.01)
*G06T 7/70* (2017.01)
(Continued)

(52) U.S. Cl.
CPC .................. *F41G 3/26* (2013.01); *G06T 7/70* (2017.01); *G06V 20/10* (2022.01); *G01S 19/51* (2013.01); *G06V 2201/07* (2022.01)

(58) Field of Classification Search
CPC ........... F41G 3/26; F41G 3/2661; G06T 7/70; G06V 20/10; G06V 2201/07; G01S 19/51; G09B 9/006; G09B 9/003; F41A 33/00
(Continued)

(56) References Cited

U.S. PATENT DOCUMENTS 4,804,325 A * 2/1989 Willits .................. F41G 3/2661
434/22
8,920,172 B1 * 12/2014 Wilmink ................ G09B 9/003
434/19
(Continued)

OTHER PUBLICATIONS

International Search Report and Written Opinion mailed Apr. 1, 2021 in related application No. PCT/US2020/046509, all pgs.
(Continued)

*Primary Examiner* — Robert P Bullington
*Assistant Examiner* — Stephen Alvesteffer
(74) *Attorney, Agent, or Firm* — MUGHAL GAUDRY & FRANKLIN PC

(57) ABSTRACT

A laserless combat simulation device includes at least one processing device and a memory device having instructions stored thereon that, when executed by the at least one processing device cause the at least one processing device to receive a trigger event from a weapon device. The instructions further cause the at least one processing device to receive image data from an optical sensor array of the weapon device of a field of view of the weapon device, receive position information and orientation information of the weapon device at the time of the trigger event, analyze the image data to determine an identity and location of a target, and calculate a ballistic outcome based at least in part on the position information and orientation information of the weapon device, the identity and location of the target, and ballistic characteristics of a simulated round fired from the weapon device.

20 Claims, 30 Drawing Sheets

(51) Int. Cl.
*G06V 20/10* (2022.01)
*G01S 19/51* (2010.01)

(58) Field of Classification Search
USPC .......................................................... 434/19
See application file for complete search history.

(56) References Cited

U.S. PATENT DOCUMENTS

| | | | | |
|---|---|---|---|---|
| 9,816,783 | B1* | 11/2017 | Means | F41J 9/08 |
| 10,203,414 | B2* | 2/2019 | Nazemi | F41G 3/165 |
| 2007/0190494 | A1* | 8/2007 | Rosenberg | A63F 13/216 |
| | | | | 463/40 |
| 2007/0287134 | A1* | 12/2007 | Chung | G09B 19/00 |
| | | | | 434/22 |
| 2010/0221685 | A1 | 9/2010 | Carter | |
| 2012/0156652 | A1* | 6/2012 | Lane | F41J 9/14 |
| | | | | 434/11 |
| 2013/0225288 | A1* | 8/2013 | Levin | A63F 13/92 |
| | | | | 463/31 |
| 2015/0018057 | A1* | 1/2015 | Carter | F41G 3/26 |
| | | | | 463/2 |
| 2015/0057057 | A1* | 2/2015 | Fischer | A63F 13/245 |
| | | | | 463/7 |
| 2015/0141100 | A1 | 5/2015 | Carter | |
| 2017/0307333 | A1* | 10/2017 | Northrup | F41G 3/26 |
| 2017/0316711 | A1* | 11/2017 | Surdu | F41A 33/00 |
| 2021/0106914 | A1* | 4/2021 | Fan | A63F 13/577 |

OTHER PUBLICATIONS

International Preliminary Report on Patentability mailed on Feb. 24, 2022 in International Patent Application No. PCT/US2020/046509, 7 pages.

* cited by examiner

Pattern Compiling Flowchart

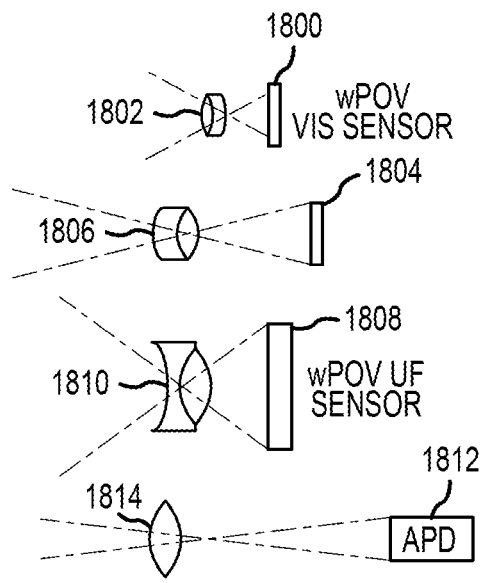
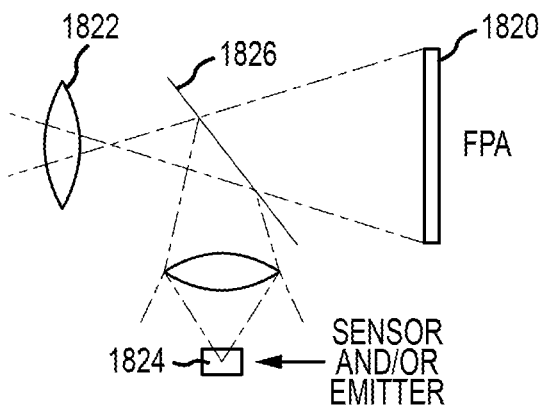
FIG.18A
FIG.18B
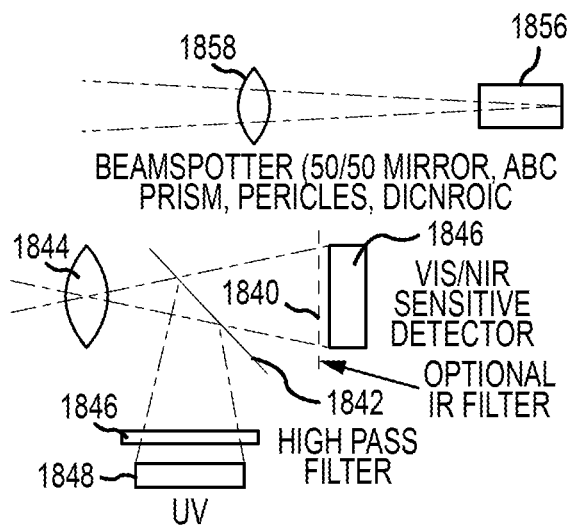
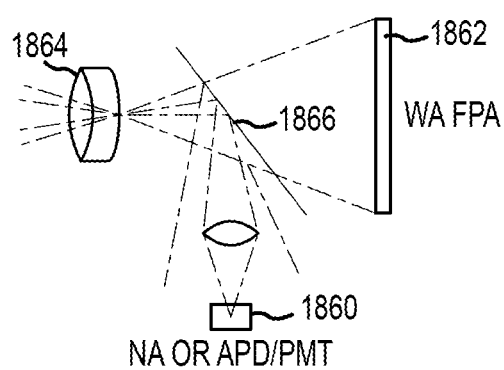
FIG.18C
FIG.18D

FIG.19A — SENSE VIS + UV

FIG.19B — SENSOR + EMITTER

FIG.19C — SENSE

FIG.19D — SENSE + eWH

FIG.19E

Auto-Ranging Flowchart

UNIVERSAL LASERLESS TRAINING ARCHITECTURE

CROSS-REFERENCES TO RELATED APPLICATIONS

This application claims the benefit of priority to U.S. Provisional Patent Application No. 62/886,814, filed Aug. 14, 2019, entitled "UNIVERSAL LASERLESS TRAINING ARCHITECTURE," the entire content of which is incorporated herein by reference for all purposes.

STATEMENT REGARDING FEDERALLY SPONSORED RESEARCH AND DEVELOPMENT

This invention was made with government support awarded by the Defense Energy Center of Excellence, d/b/a National Security Technology Accelerator as outlined in NSTXL OTA Contract #: W900KK-18-9-0005/TO W900KK-19-9-0023; NSTXL Project Agreement #NSTXL-TREX-16-0023. The government has certain rights in the invention.

BACKGROUND OF THE INVENTION

Conventional combat training systems are often laser-based systems. While these systems can provide some benefits, there are significant problems with laser-based approaches. For example, the use of lasers oversimplifies the ballistics of a projectile, instead treating all fired shots as linear vectors (or conical vectors due to laser beam divergence). This eliminates the ability to simulate the effects of lead/lag (for moving targets and/or moving shooters), elevation, canting, time-of-flight, bullet drop, and windage. The effects of laser divergence further cause conventional systems to provide inadequate accuracy and range in relation to the weapons the lasers are intended to simulate. Conventional systems also unable to function through obscuration, occlusion, target hiding, and some atmospheric effects, instead requiring a clear line of sight to hit a target, thus unrealistically allowing a user to take cover by positioning his receiver behind a non-protective obstruction, such as a shrub that would not protect the user from an actual live round. Conventional systems also require users to wear and/or otherwise be equipped with excessive extra equipment, which reduces simulation realism and restricts soldier freedom of movement. Laser systems are not adaptable to a sufficient range of weapons & targets, nor to a large enough number of entities. Additionally, manual calibration of conventional systems is time-intensive and delays war gaming exercises. Improvements to combat training systems is desired to address these and other problems.

BRIEF SUMMARY OF THE INVENTION

Embodiments of the present invention are directed to laserless training systems that enable combat situations to be simulated more realistically than by using conventional approaches. Embodiments operate by placing optical emitters on targets and optical sensing arrays on weapon devices, allowing the weapon devices to image targets and/or other beacons) that are in the field of view of the weapon device. The optical sensing arrays may receive target identifiers from any targets within the field of view for subsequent determination of ballistic hit/miss outcomes. These calculations may be performed by the weapon device and/or by one or more base station servers. The systems and methods described herein utilize position and orientation data from targets and weapon devices, as well as environmental data, and ballistic data to determine whether a simulated shot would hit or miss a target, enabling the systems to accurately simulate the results of a simulated shot, even when a target is obscured or hidden, all while taking into account atmospheric effects, such as wind and/or other weather. Additionally, the present systems and methods enable accurate hit/miss determinations even in the event that the shooter and/or target is moving at the time of a trigger pull.

In one embodiment, a laserless combat simulation device is provided. The device may include at least one processing device and a memory device having instructions stored thereon that, when executed by the at least one processing device cause the at least one processing device to receive a trigger event from a weapon device and receive image data from an optical sensor array of the weapon device of a field of view of the weapon device. The instructions may further cause the at least one processing device to receive position information and orientation information of the weapon device at the time of the trigger event, analyze the image data to determine an identity and location of a target, and calculate a ballistic outcome based at least in part on the position information and orientation information of the weapon device, the identity and location of the target, and ballistic characteristics of a simulated round fired from the weapon device.

In some embodiments, the combat simulation device is the weapon device. The position information may include one or both of global navigation satellite system (GNSS) data and global positioning satellite real-time kinematics (GPS-RTK) data. The image data may include data sensed by one or more of an ultraviolet (UV) light sensor array or an infrared (IR) sensor array. In some embodiments, the orientation information may be provided by an inertial measurement unit (IMU) of the weapon device. The memory may further include instructions that cause the at least one processing device to determine movement data associated with one or both of the weapon device and the target and calculate lead or lag for the simulated round based on the movement data associated with one or both of the weapon device and the target. Calculating the ballistic outcome may be further based on the lead and the lag. In some embodiments, calculating a ballistic outcome may include determining a bullet drop based at least in part on the ballistic characteristics, the position information of the weapon device, and the location of the target.

In another embodiment a laserless combat training system may be provided. The system may include an optical target beacon arranged within a volume space and a weapon device operable by a user. The weapon device may be respectively coupled to an optical sensor array, a position module, and an orientation module. The system may further include one or more programmed processors configured to receive a location of the optical target and of the weapon device within the volume space, determine one or more relative locations using the received locations, and receive an orientation of the weapon device via the orientation module. The processors may be further configured to receive optical image data of the volume space via the optical sensor array and receive a trigger event from the weapon device. The processors may also be configured to in response to receiving the trigger event, receive optical image data via the optical sensor array and calculate a virtual ballistic outcome using the orientation of the weapon and optical image data.

In some embodiments, the system may also include at least one fixed beacon that provides environmental context data when imaged within the field of view of the weapon device. At least one beacon may be affixed to a mobile object within the volume space. In some embodiments, the optical target beacon may be affixed to a human target. The one or more programmed processors may be part of a server base station that is managing a combat training simulation. The one or more programmed processors may be further configured to determine a first orientation. The orientation of the weapon device may be a second orientation and may be based on the received optical image data, relative locations, and the first orientation. The second orientation may be an updated/calibrated version of the first orientation. The virtual ballistic outcome may be further based at least in part on current real or simulated weather conditions.

In another embodiment, a method of determining a simulated ballistic result in a laserless combat simulation system is provided. The method may include receiving a trigger event from a weapon device and receiving image data from the weapon device of a field of view of the weapon device. The method may also include receiving position and orientation information of the weapon device at the time of the trigger event and analyzing the image data to determine an identity and location of a target. The method may further include calculating a ballistic outcome based at least in part on the position and orientation information of the weapon device, the identity and location of the target, and ballistic characteristics of a simulated round fired from the weapon device.

In some embodiments, the method may also include communicating the ballistic outcome to one or both of the weapon device and the target. Calculating the ballistic outcome may further include determining whether any obstructions were positioned between the weapon device and the target at the time of the trigger event. The method may further include continuously calibrating a position module of the weapon device prior to detecting the trigger event. The identity and location of the target may be determined based on a pulse-coded signal emitted by the target. The method may further include determining that the weapon device is aimed at one or more of the target and a fixed beacon and communicating a signal to the one or more of the target and a fixed beacon that causes the one or more of the target and the fixed beacon to emit a pulse-coded signal that identifies the one or more of the target and the fixed beacon.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

FIGS. 18A-18D illustrate various hybrid FOV detectors according to some embodiments of the present invention.

FIGS. 19A-19E illustrates various sensor and filter arrays according to some embodiments of the present invention.

DETAILED DESCRIPTION OF THE INVENTION

Figure 1:
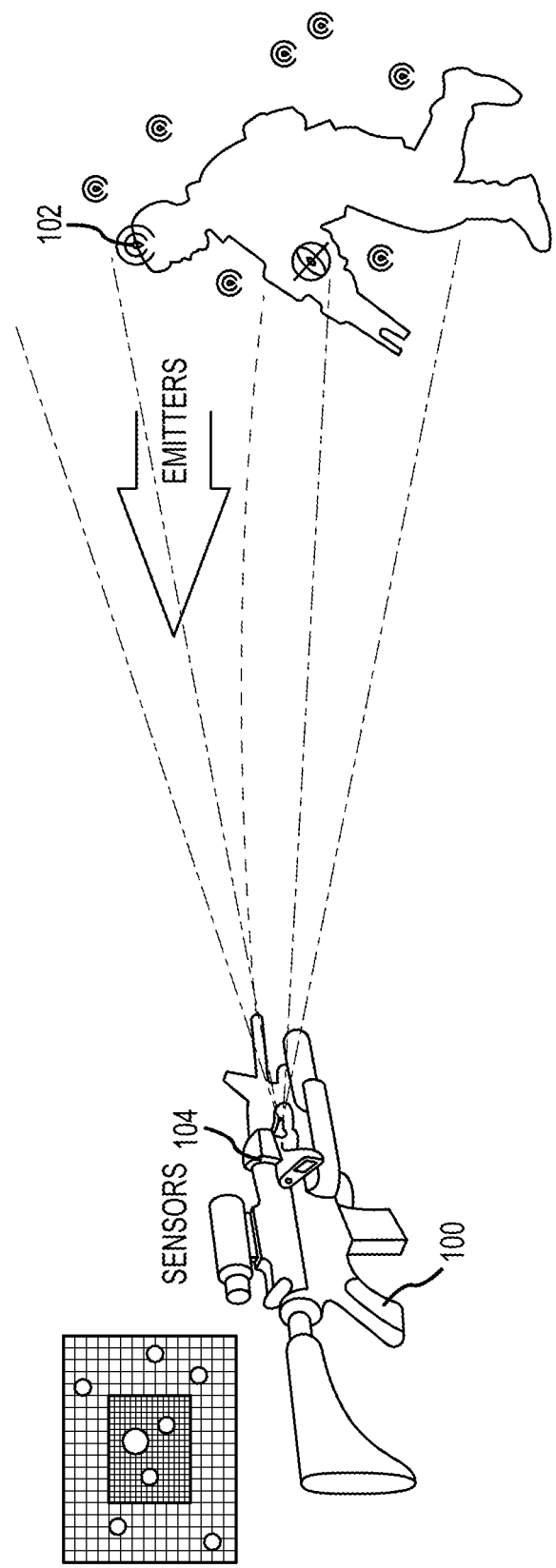
FIG. 1 illustrates a simplified laserless training system according to some embodiments of the present invention.

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the present invention address numerous deficiencies associated with conventional laser-based training systems. For example, embodiments of the present invention provide the ability to simulate direct fire through occlusion or atmospheric effects, greater levels of ballistic accuracy, and the ability to provide adequate simulation of real-world ballistics effects such as lead, elevation, canting, time-of-flight, and windage. In some embodiments, the systems and methods described here may operate using coordinated ultraviolet (UV) (or other wavelength) optical beaconing and sensing, which is out-of-band (for both human and traditional night vision equipment) along with precise location information (such as provided by global navigation satellite system (GNSS) data), and orientation information (such as provided by an inertial measurement unit (IMU)), and an associated communications and data processing scheme.

Unlike conventional laser-based systems that rely on laser beams emitted by a weapon device to illuminate a target, embodiments of the present invention utilize deterministic ballistic simulation for accuracy & realism. Embodiments take into account position, orientation, and/or pose information from both weapons and targets and utilize this data in conjunction with ballistic information specific to the particular weapon and ammunition used, environmental conditions, and any obstructions and/or intervening objects between a weapon and target to determine whether a simulated shot results in a hit or miss, and for hits, what the result of a hit may be (kill, injury, etc.). Weapon orientation modules allow embodiments of the invention to compute a precise orientation of the beacon and weapon, which enables trainees to learn from realistic ballistic effects such as windage and canting, and increases accuracy by an order of magnitude. The system knows the range between shooter and target at time of fire, which allows for a calculation of the round's time of arrival at the target as well as the definitive determination of the hit box impacted by the round. A physics simulation evaluates effects like bullet drop, time of flight, and spin drift. Canting and superelevation are incorporated based on readings from the weapon's orientation module. Sufficient information is available to fully determine the round's position of impact at target range when the round would really arrive, rather than simply at time of fire. Additionally, embodiments take into account the order of interaction of bullet. For example, a brick wall between the weapon device and the target stops the bullet, while a bush positioned between the weapon device and the target would not necessarily prevent the target from being hit. Each object within the training environment may have bullet permeability, characteristics, etc. coded in and accounted for in a ballistic outcome calculation.

When a clear line of sight exists between the shooter and the target, enhanced accuracy of the ballistics simulation can be achieved using the image of the target's beacon as captured on the shooter's weapon camera. At 600 m, the systems' area of uncertainty will be 20 cm by 20 cm, sufficient to move from a probabilistic simulation to a deterministic evaluation of whether or not a true round would have impacted the target. The location and lethality of a hit will be inferred from the geometry of the target because each human, tank, vehicle and so on has known dimensions encoded in the beacon, along with the beacon's mounted position. Note that multiple, individually coded beacons can be located on a target to help determine orientation, as can its internal compass.

In cases where the shooter's sensor is unable to detect the target's beacon at time of fire (such as when the target moves behind an object), the system can still precisely locate the target for the purpose of deterministic hit evaluation. The target's location in the virtual world can be established using the network of fixed sensors that maintain vision of the target when the shooter does not have line of sight. Additionally, dynamic terrain mapping and knowledge of stable infrastructure will ensure that the type of occlusion is known to the system at time of fire so that hits will be scored according to the known capabilities of the round being fired. For target ranges of more than 50 m, the systems of the present invention evaluate hit-or-miss before the bullet would have arrived. With WiFi connectivity, the estimated latency for the systems is approximately 50 ms. Further reductions in latency are possible if point-to-point communications are used instead of requiring base station support to evaluate shooter and target relative positions. The present systems and methods may interpolate subpixels to better than 0.5 mrad in both dimensions based on a 2 megapixel sensor and a 27 degree FOV lens. Additional fixed sensors in the field ensure that the target's position will often be determined using a sensor that is closer to the target than the shooter is to the target.

In some embodiments, auxiliary sensors, such as special cameras, may be placed within structures, in open spaces, behind walls, and/or other areas of shorter visibility ranges. These additional sensors may be used to maintain target tracking through obscurations such as buildings.

Embodiments of the invention operate using an inverted optical configuration. More specifically, embodiments place an imaging device (optical sensing array) on each weapon device and emitter beacons on each target. The imaging devices may detect pulse-coded signals emitted from the beacons on targets, as well as from fiduciary beacons. For example, beacons may be mounted on targets and in the surrounding area, which emit signals that are then acquired by the optical sensing array on the weapon in order to determine an accurate aimpoint. The constellation of beacons also allows for continuous recalibration of the system. Continuous recalibration is particularly useful, as it enables the system to maintain an exceptionally high level of precision and ensures that the simulated ballistic results remain accurate throughout a training exercise. For example, the automatic recalibration of the system overcomes any drift that occurs as a result of orientation devices (such as inertial measurement units (IMUs), which also allows the system to operate using lower cost, less precise orientation devices. The systems and methods described herein may utilize GNSS for varied coarse position data, so inexpensive units may be selected. Beacons also encode the known geometry of the target they are mounted on (such as a human or a tank), so that the lethality and location of an incoming shot can be inferred. The systems and methods described herein may incorporate three types of beacons (human platform target beacons, mobile platform target beacons, and/or fiducial (stationary) beacons that are used to automatically update weapon orientation calibrations), which record data such as their health status. In some embodiments, a collection of fiducial beacons may maintain a visual fix on the target even when the shooter cannot.

Embodiments of the present invention provide numerous benefits over conventional laser-based systems. Laser-based systems only determine that the weapon is pointing at the target and is limited to scenarios in which one or more visible sensors are illuminated by the laser beam. In contrast, the systems of the present invention determine precise aim with high resolution (typically on the order of megapixels) imaging sensors and are capable of simulating realistic ballistic effects, such as bullet drop, effects of canting, windage, etc. Narrowband filtration on the camera/sight eliminates interference from sunlight, as can beacon modulation. Embodiments of the invention may utilize an auxiliary high-speed (temporal) UV photodetector channel on the weapon for high speed optical communications. In some embodiments, an optional emitter on the sight (shooter) end of the system, adds bidirectional communications capability. Narrower field of view increases accuracy but requires more assistance from GNSS position data throughout the system. Embodiments may implement a dual optical system with both wide and narrow fields of view. Multiple inputs from GNSS, optical sight, IMU, and inclinometers may be fused to preserve the training experience in case any one of the signals is interrupted. Embodiments of the present invention provide a more realistic and convenient training package for trainees. For example, the equipment configurations of the present invention may help reduce the equipment size, weight, and power demands. This in turn improves ergonomics for the operator, and reduces negative training associated with extra equipment. As such, the systems described here may lighten the system load to improve ergonomics and mobility for operators. Two 18650 battery cells per kit provide a 72-hour battery life. Minimizing system gear on the soldier also streamlines ease and cost of upgrading, while increasing the realism of the training experience.

Because ballistics are evaluated mathematically based on participant locations within the virtual world, different techniques can be used based on munitions type. As a result, the present systems provide a weapon agnostic solution that can be easily modified to meet future requirements. For example, can be readily adapted to any known weapon system and target in the global inventory, and the system attachment is even small enough to be used on a side arm. Whether occlusion by the terrain or infrastructure actually stops a round can also be dynamically evaluated based on the munitions type. Additionally, embodiments provide a scalable and flexible systems architecture that is extensible and adaptive for special exceptions, and capable of integrating with existing and future systems.

Ultraviolet (UV) beacons may be particularly useful because at these short wavelengths the UV light cannot be detected by human visual observers, nor by night vision gear. Current night vision equipment biases sensitivity towards the visible spectrum, or towards the infrared (IR) for use with IR illuminators. The photocathode itself will generally not respond to light beyond its design classification, so along with antireflective coatings, these effects lead to a very low probability of any signal being seen and amplified by a night vision intensifier tube.

GNSS devices equipped to every entity in the war game will enable a centrally maintained virtual world which tracks all entities' (shooters, targets, objects) absolute positions and velocities in real time. Each soldier will be outfitted with a GNSS receiver, orientation module, transceiver, computer, electro/optical package(s), display, and power sub-system. The distribution and location of these devices will vary with application. All might be integrated into one device, or in the case of a soldier kit, be split between helmet, weapon, and belt/vest pack.

Each orientation module will fuse low cost MEMS based IMUs (gyro/accelerometer), pendulous 2-axis inclinometer, triaxial magnetometer, thermometer, and smart GNSS with real-time kinematic (RTK) or other correction. Commonly used for high precision theodolites, pendulous inclinometers use a small disk supported between two conductors, and based on capacitance change can measure angle in two directions to a resolution of 0.0005 degrees (0.0087 milliradians). Sensor fusion across these instruments will be capable of continuously measuring and reporting the orientation of the weapon's barrel and the soldier's location. Because human bodies and heads move in a predictable way, the UV beacon mounted on the soldier's helmet can be used to infer the soldier's silhouette when combined with the inclinometers on their person and weapon. Whether standing, crouched, or prone, the UV beacon's encoded orientation on the head is compared to the body position feeds to determine whether the soldier can score a hit or be targeted by someone else in their current posture. Ballistic trajectory mapping will be based on weapon orientation at time of fire, and can be compared to entity positions (and silhouette plus orientation) in the virtual world to compute time and place of impact for the round, from which simulated kills can be scored. This method provides a solution to the traditional problems of occlusion, atmospheric effects, and ballistics simulation.

Potential targets (soldiers, platforms, infrastructure, etc.) will be tagged with UV beacons that emit modulated pulses as directed by the central system or the target's local computing device. These beacons may also have on-board GNSS and comms. Weapon kits will include cameras and optical telescopes, sensitive only in the UV region of the electromagnetic spectrum. Due to the choice of UV light and band-passed sensors, beacons will be readily discernable above the background of reflected sunlight in images captured by weapon cameras, and at the same time the beacons will be invisible to the naked eye and to night vision devices. Note that there could be an occasional issue with UV induced fluorescence of certain nearby objects, but intuitively this should be controllable.

In some embodiments, a smart watch or other wearable technology may be outfitted with custom programming to serve as the interface for the trainee. The watch display will inform users of system health, shot number, shot accuracy, and whether or not they have been hit. Additional features that could be considered include gamification rankings, haptic feedback, biometrics, and health data.

Weapon cameras will continuously scan their field of view for images of all beacons, including fiducial beacons that will be positioned at known locations on stable infrastructure elements. Every captured camera frame that derives a center of mass calculation from an image of a fiducial beacon will provide relative positional data that can be compared against the current virtual world. This data will also be used to update or renew the calibration of the OM, which is otherwise expected to accumulate drift or uncertainty over time. In this way, the UV beaconing system will allow for enhanced accuracy of simulated fire even in instances where the target's UV beacon is occluded at time of fire.

Turning now to FIG. 1, a simplified laserless training system is illustrated. In its simplest form, the system includes a weapon device 100 that interacts with a target beacon 102 to enable a trainee to conduct target practice. The target beacon 102 may be fixed in place (such as on a stationary target within a shooting range) and/or may be mobile, such as being placed on a human, vehicle, and/or other object capable of movement. The weapon device 100 includes an optical sensing array 104 that serves to detect signals emitted from an optical emitter (not shown) of the target beacon 102. In some embodiments, the optical emitter and optical sensing array 104 may operate using ultraviolet (UV) wavelengths, however other wavelengths of light (such as visible light, infrared (IR), etc. may be used in various embodiments. Signals emitted from the target beacon 102 may be acquired by the optical sensing array 104 on the weapon device 100. Data within these signals (such as an identity of a target associated with the target beacon 102, a position, orientation, and/or pose of the target, and/or other information), as well as position and orientation information of the weapon device 100 may be utilized to determine whether a simulated round fired from the weapon device 100 would successfully hit the target. This determination will be discussed in greater detail with respect to FIGS. 2A-2C below. For example, at the time of a trigger event, the weapon device 100 may utilize position information from a position module (such as a GPS, GNSS, GPS+RTK system, etc.) and orientation information from an orientation module (such as an inertial measurement unit (IMU)) to understand the location and aim of the weapon device 100. The optical sensing array 104 may capture an image of the target beacon 102 at the time of the trigger event, which may provide the weapon device 100 with position and/or object information (type of object, size, pose, etc.) associated with the target beacon 102. Based on the position information, the weapon device 100 may calculate a distance between itself and the target beacon 102. The weapon device 100 may then access one or more ballistic lookup tables and/or algorithms associated with a type of ammunition and the type of weapon device 100 to determine whether the trigger event resulted in a successful hit of the target beacon 102. In some embodiments, the ballistic lookup tables and/or algorithms may factor in variables such as elevation angles, canting, windage, bullet drop, etc. This allows the system to more accurately simulate ballistic outcomes, as the system does not rely on a laser lighting up a beacon as done in conventional systems. The ballistic outcome may not only register as a hit or miss, but for hits may include information about what location (head, shoulder, chest, leg, arm, etc.) on the target the hit was made and the effectiveness of the hit (e.g., kill, disabled a vehicle, minor injury (hit soldier can continue in the combat simulation), major injury (hit soldier is knocked out of the simulation), and/or any other outcome.

In some embodiments, the weapon device 100 may detect when the weapon device 100 and/or target beacon 102 is moving at the time of the trigger event. For example, the orientation module and/or position module may be used to detect a direction and velocity of movement of the weapon device 100 at the time of the trigger event. To determine movement of the target beacon 102, the weapon device 100 may analyze multiple frames captured by the optical sensing array 104 (which may be sampling continuously even when no trigger event is detected). Based on a comparison between a number of frames (often consecutive) captured by the optical sensing array 104, the weapon device 100 may determine a direction and velocity of any movement of the target beacon 102. For example, the weapon device 100 may determine changes in any pixels (specifically pixels that include an optical signal emitted from the target beacon 102) from one frame to the next. Based on any movement of the optical signal (centroid) from one pixel to another, the weapon device 100 may determine that the target beacon 102 is moving (taking into account any known movement of the weapon device 100 itself). The calculation of the ballistic outcome may take any movement information of the weapon device 100 and/or target beacon 102 into account, which enables the system to factor in lead and/or lag to generate more realistic arms training.

In some embodiments, the weapon device 100 may alert the target beacon 102 as to the outcome of a particular simulated shot. For example, once the weapon device 100 has performed the ballistic outcome calculation, the weapon device 100 may send a communication to the target beacon 102 that informs the target beacon 102 as to the hit/miss result, and possibly additional information about any hits (such as location/effectiveness of hit). This communication of data may be performed in any number of ways. For example, each of the weapon device 100 and target beacon 102 may include a radio frequency (RF) antenna that allows for transmission of information (such as the ballistic outcome) between the two devices. In other embodiments, an optical path (using the same or different wavelength of light as the optical sensing array 104) may be established between the two devices. In yet other embodiments, a network node may be coupled with the weapon device 100 and the target beacon 102 and may serve as an intermediate router for information passed between the devices. In some embodiments, the signal containing the ballistic outcome may further include a deactivation instruction that may disable all or part of the target. As just one example, for a well-placed hit on a tank, a ballistic outcome may result in the deactivation of all or part of the tank (such as the movement/operation of the barrel or turret). In some embodiments, when the target beacon 102 is affixed to a user, the signal containing the ballistic outcome may inform the user (such as via an audio command, on an interface of that user's weapon device, on a head up display, watch screen, and/or other wearable interface) that the user has been hit and killed, enabling the user to promptly exit the training scenario.

It will be appreciated that the above system with a single weapon device 100 and single target 102 is merely an example of the simplest form of the system and that the system may be scaled up to provide more complex training simulations. Such simulations may include any number of trainees, weapon devices, target beacons, etc. Some embodiments may also include fixed fiducial beacons that may be affixed to known objects. These fiducial beacons not only indicate the presence and location of certain objects, but also may be used by the optical sensing arrays of the weapon devices to better understand where a weapon device is being aimed. Additionally, knowledge about locations and object identities of objects having fiducial beacons affixed thereto may be used in calibrating the weapon devices and in generating more accurate ballistic outcomes. For example, if a target beacon 102 is positioned behind a boulder (identified by a fiducial beacon), the weapon device 100 knows that the target may not be hit. However, if the target beacon is behind a small bush, the weapon device 100 may still calculate a ballistic outcome that registers a hit on the target, even if the target beacon 102 is obscured by the bush.

Figure 2A:
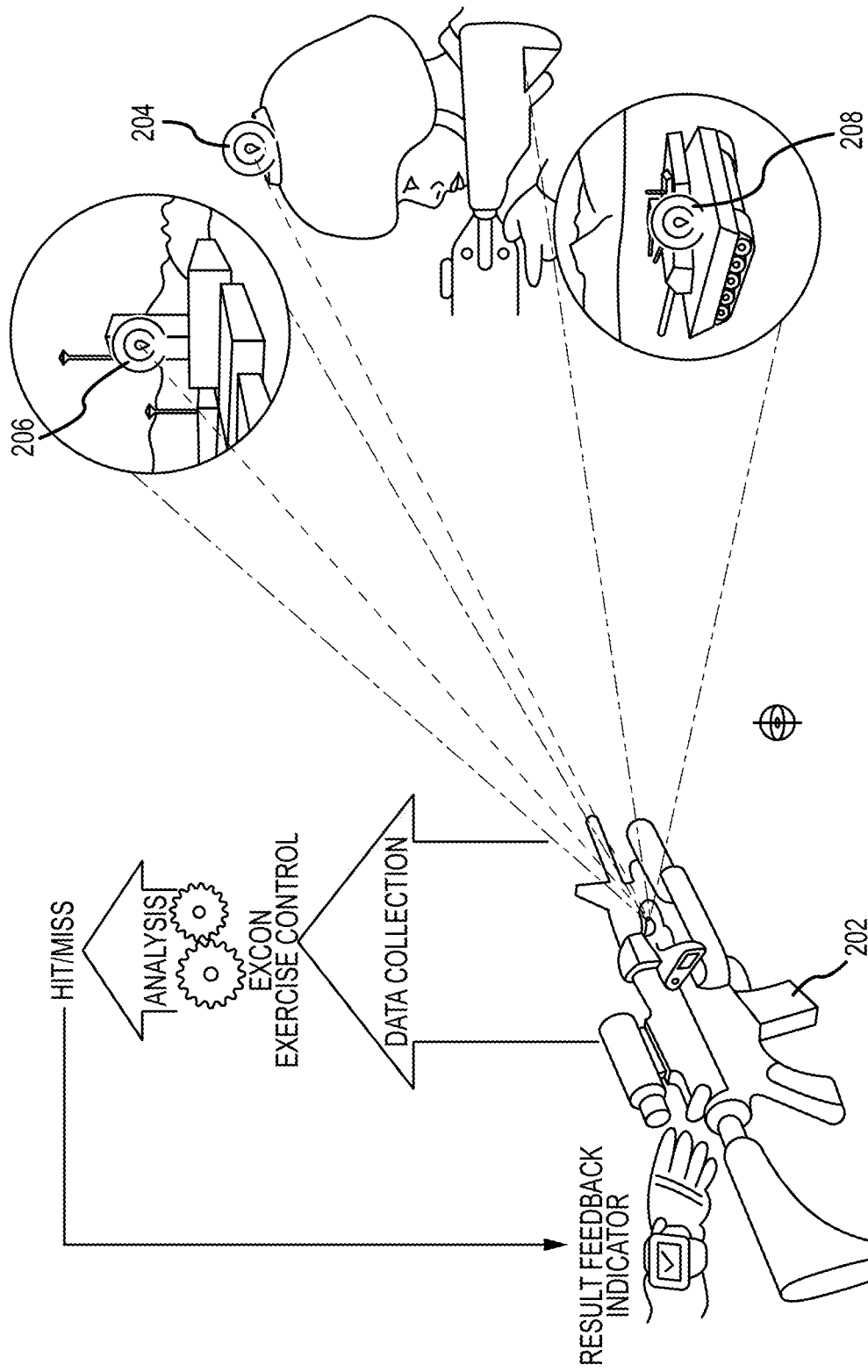
FIG. 2A illustrates a laserless training system according to some embodiments of the present invention.
Figure 2B:
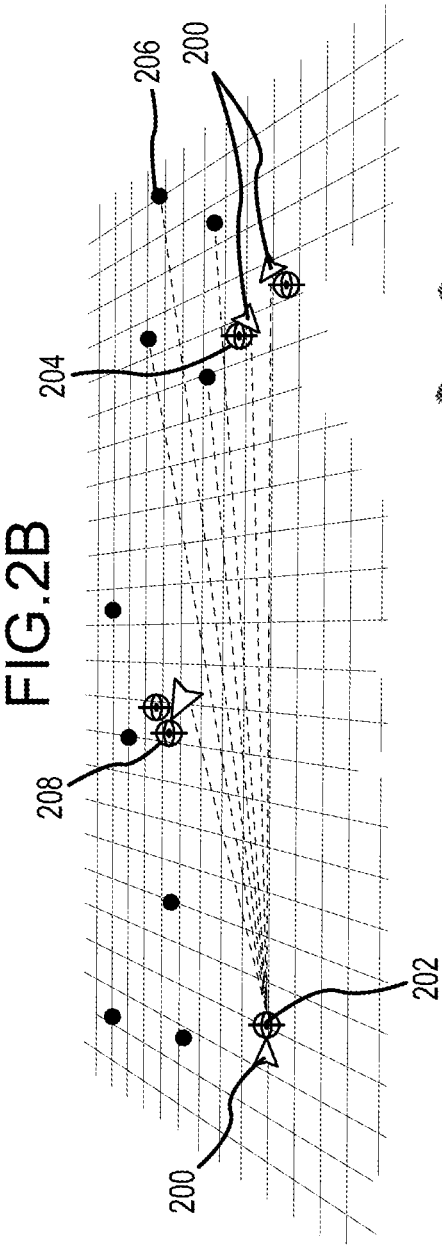
FIG. 2B. illustrates a coordinate system of the laserless training system of FIG. 2A.
Figure 2C:
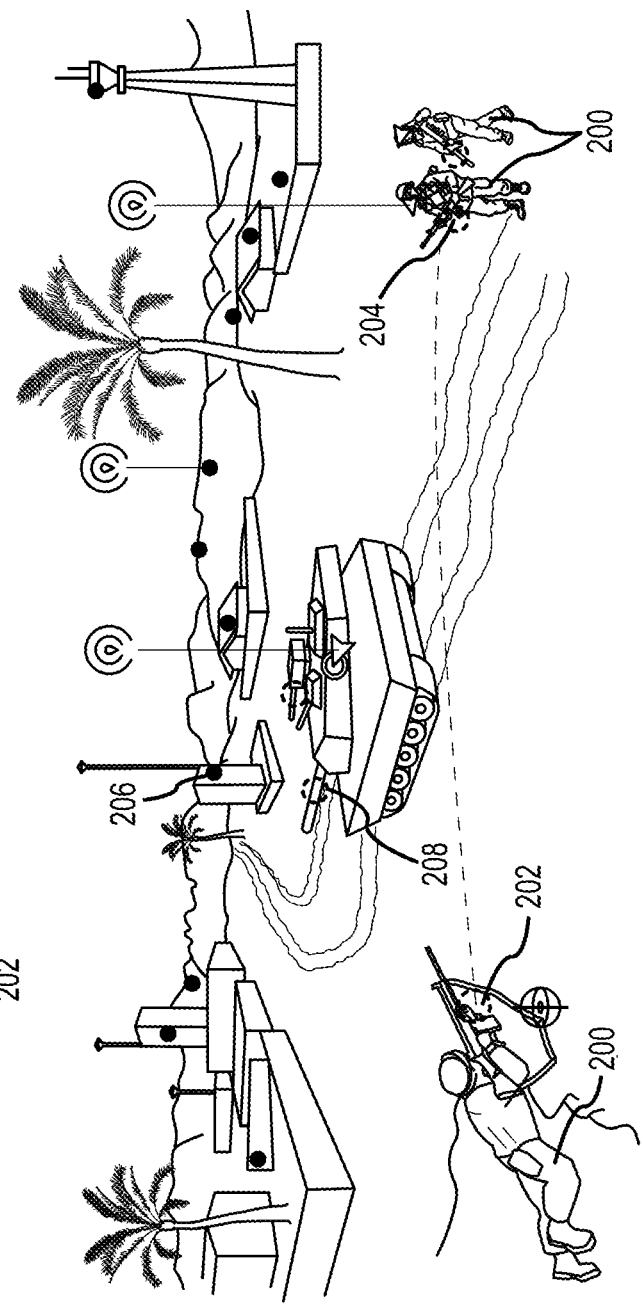
FIG. 2C illustrates a 3D rendered view of the laserless training system of FIG. 2A.

As the system becomes more complex, it may become advantageous to incorporate a server base station, which may then perform cloud-based ballistic outcome cautions. FIGS. 2A-2C illustrate a more complex combat training simulation according to embodiments of the present invention. As illustrated, a number of trainees 200 each carry a weapon devices 202 (which may be similar to weapon device 100 described above) and wear at least one target beacon 204 (which may be similar to target beacon 102 described above). It will be appreciated that while three trainees 200 are illustrated in FIGS. 2B and 2C, any number of trainees 200 (and weapon devices 202 and target beacons 204) may be present in a particular training simulation. Each weapon device 202 is fitted with an optical sensing array, a position module, and an orientation module. As illustrated, each target beacon 204 is in the form of an optical emitter positioned on the trainee's helmet, although additional target beacons 204 and/or alternative locations of the target beacons 204 may be used in various embodiments. The training simulation may also include any number of fiducial beacons 206 and/or mobile platform beacons 208. For example, the fiducial beacons 206 may be positioned on fixed objects with known locations, such as buildings, walls, trees, etc. The mobile platform beacons 208 may be positioned on moveable objects, such as tanks and other vehicles. Each of the beacons (target beacon 204, fiducial beacon 206, and/or mobile platform beacon 208) may be a geolocated (GNSS) optical beacon. These beacons emit pulse-coded signals that are usable by the optical sensing array to accurately determine where the weapon device 202 is aimed. For example, at the time of a trigger event, the optical sensing array of a weapon device 202 may capture an image of the target beacon 204 and any other beacons within a field of view of the optical image array. As just one example, a narrow field of view sensor may be focused on the target beacon 204, while a wide field of view sensor may capture beacons (such as fiducial beacon 206 and/or mobile platform beacon 208) positioned about the target beacon 204 as best illustrated in FIGS. 2A and 2B. The additional beacon data from the wide field of view sensor may help calibrate the location and aimpoint of the weapon device 202, while the narrow field of view image sensor may more precisely determine the aimpoint of the weapon device 202.

Figure 14:
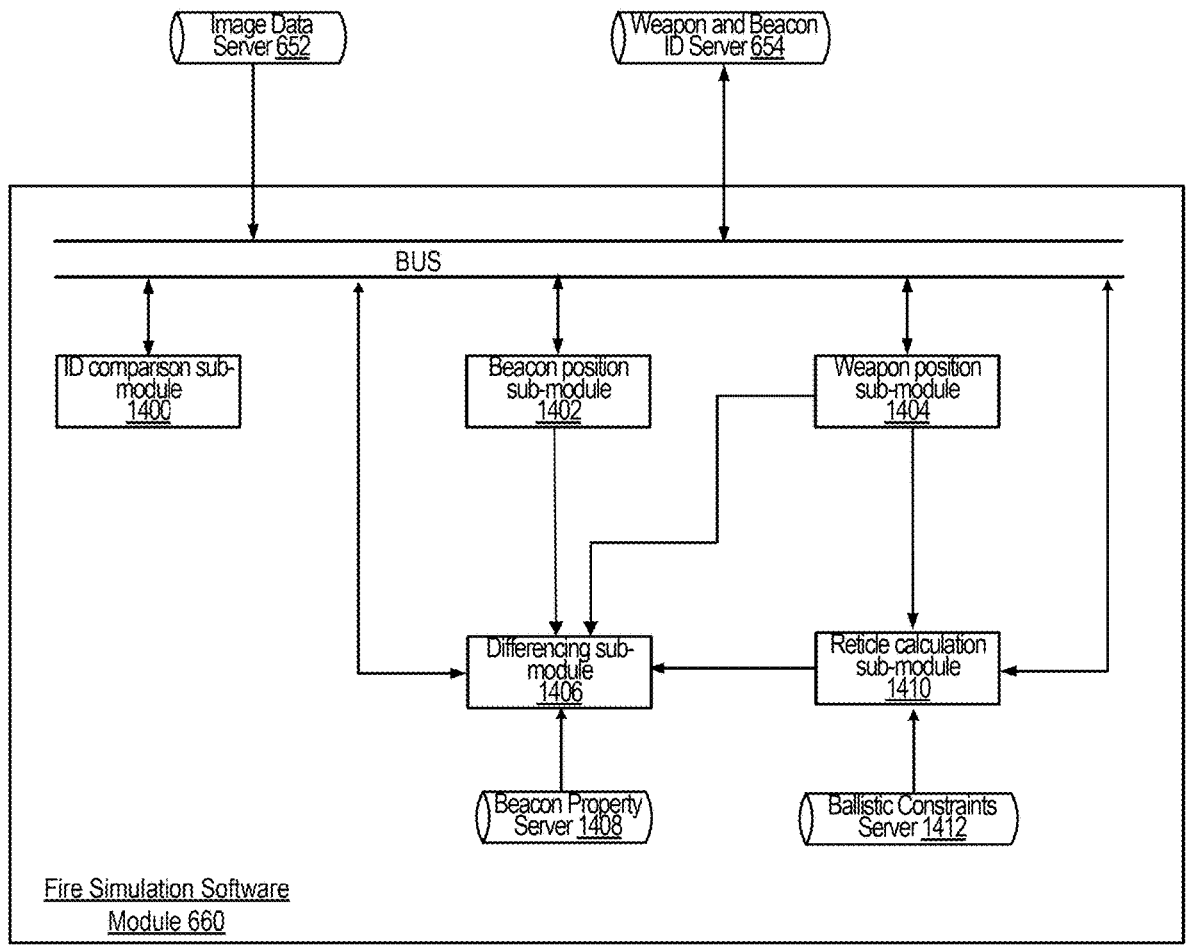
FIG. 14 illustrates an architecture of a fire simulation module according to some embodiments of the present invention.
Figure 15:
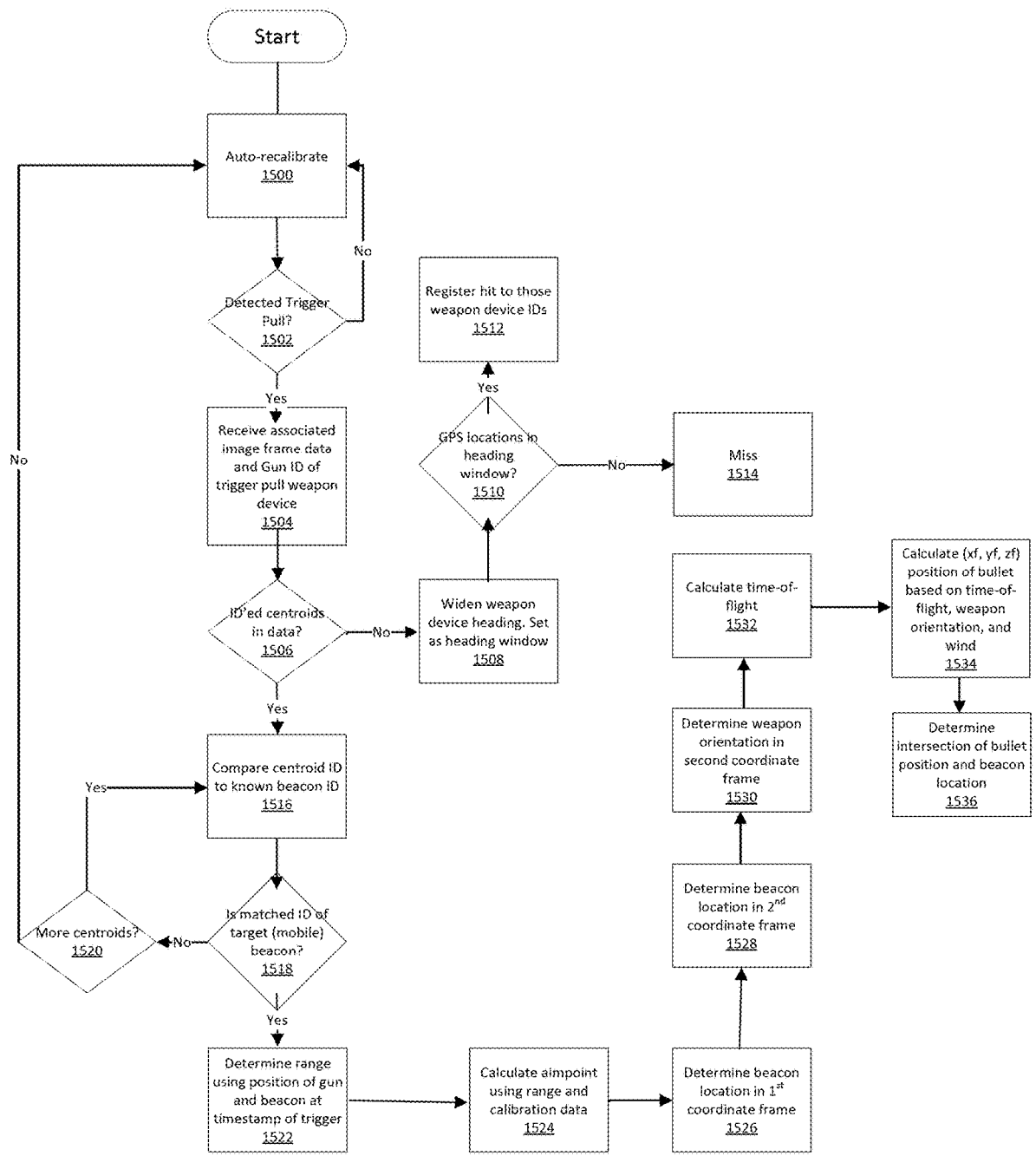
FIG. 15 is a flowchart of a process for performing a fire simulation according to some embodiments of the present invention.

The image and information derived from the image (such as calibration information and a location of the target beacon 204 relative to the weapon device 202) may be provided to a base station server 210, which may perform calculations to determine a simulated ballistic trajectory 212 and determine whether this trajectory intersected with a position (or expected position in the case of a moving object) with one or more objects within the simulation, such as the target beacon 202 to determine the ballistic outcome. Such calculations are discussed in greater detail in relation to FIGS. 14 and 15. Once the ballistic outcome has been generated, the base station server 210 may communicate the result to one or more trainees 200. For example, the trainee 200 holding the weapon 202 that fired the simulated round and/or the trainee 200 that was shot (if a hit was determined) may be notified of the result of the shot, which may include a hit/miss status, location of the hit (head, neck, torso, limb, etc.), and/or whether the hit resulted in injury or death.

In some embodiments, each user may have a Wireless Personal Area Network (WPAN), such as Bluetooth Low Energy (LE), which enables the communication of the equipment on the soldier (UV beacon, smart watch, radio), and on the weapon (IMU, inclinometers, sensor, and processor). Each individual may also include a radio that facilitates communication between the users and with central base station server(s) via a 4G LTE or other wireless network (such as LTE/5G point to point and or a mesh network) provided by existing towers.

FIGS. 3A-3G illustrate one embodiment of a weapon device 300 in accordance with the present invention. Weapon device 300 may be used in any of the systems described herein. While weapon device 300 is in the form of an automatic rifle, it will be appreciated that weapon device 300 may take any number of forms, including hand guns, single shot rifles, assault rifles, artillery units, tank weaponry, and/or any other projectile-based weapon system. Weapon device 300 may include a weapon body 302, which in some embodiments may include a stock 304 and/or handle 306. Handle 306 may include a trigger 308. The weapon body 302 may also include a barrel 310 that may fire a simulated training round. Additionally, in some embodiments, the weapon device 300 may include a telescopic sight 312 with UV-sensitive (or other wavelength) focal plane camera, and optional high-speed UV detector for high speed optical communications. The weapon device 300 may also include one or more add-on modules that interact with the various beacons and/or base station servers described herein. For example, a weapon pose unit and UV camera housing 314 may be affixed to the barrel 310 and/or otherwise mounted to the weapon device 300 in a manner that a UV camera (or other optical sensing array) 316 is in alignment with the barrel 310. A microprocessor housing 318 may be affixed to the weapon body 302, along with a power pack 320 which may be used to supply the UV camera 316, microprocessor 318, and/or other electronics components with power for operation.

Figure 3A:
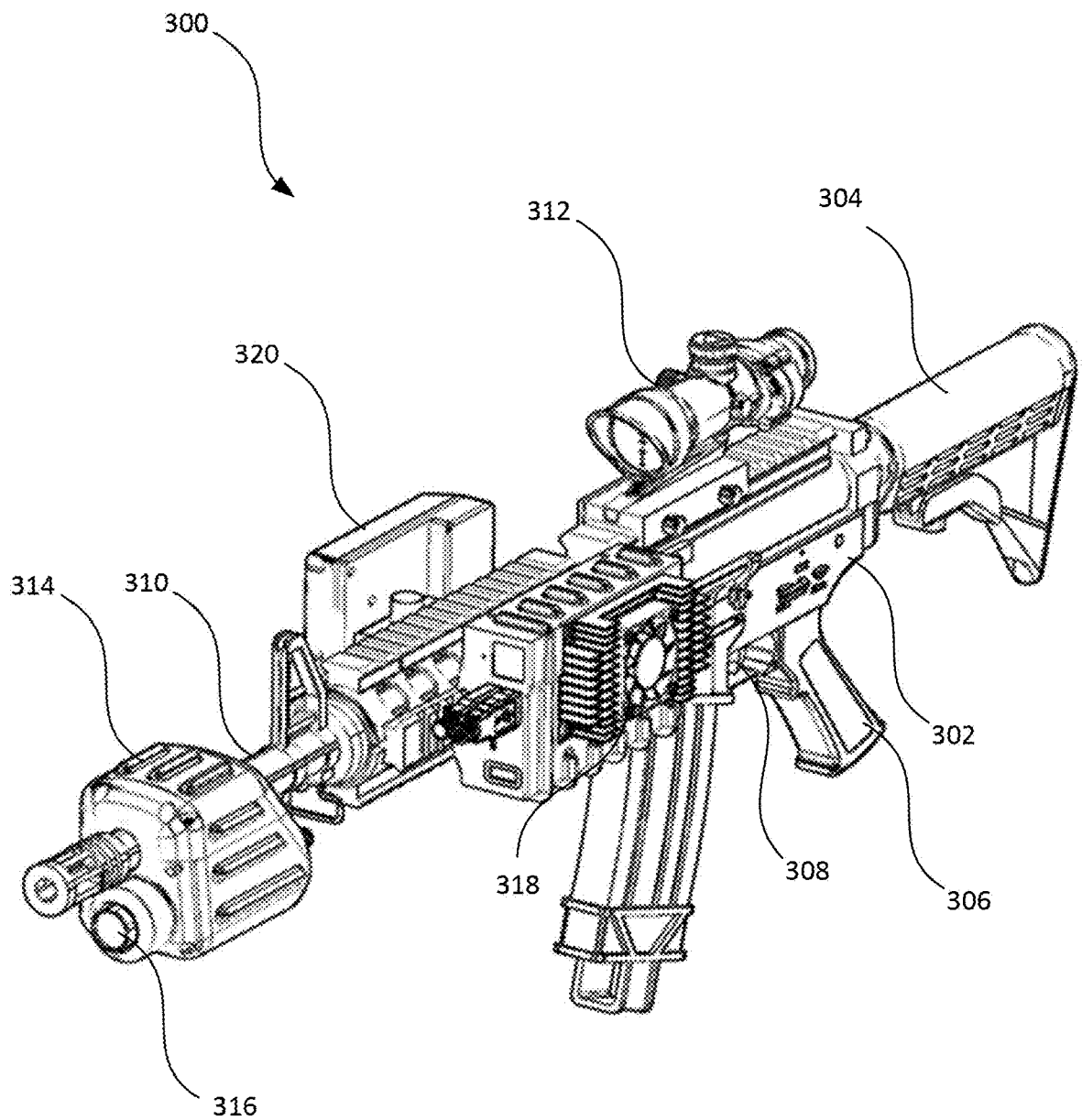
FIGS. 3A-3G illustrate a weapon device according to some embodiments of the present invention.
Figure 3B:
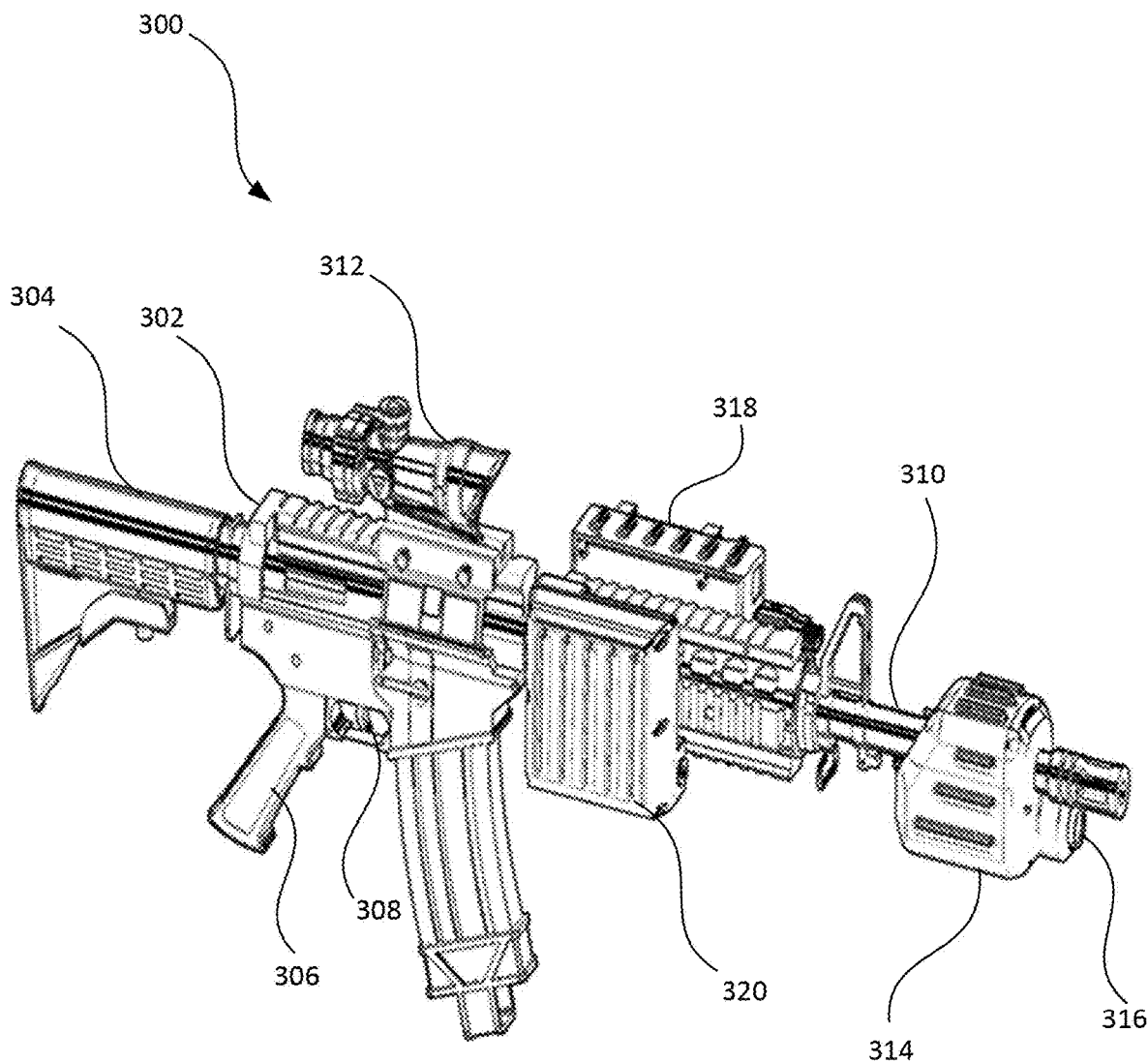
Figure 3C:
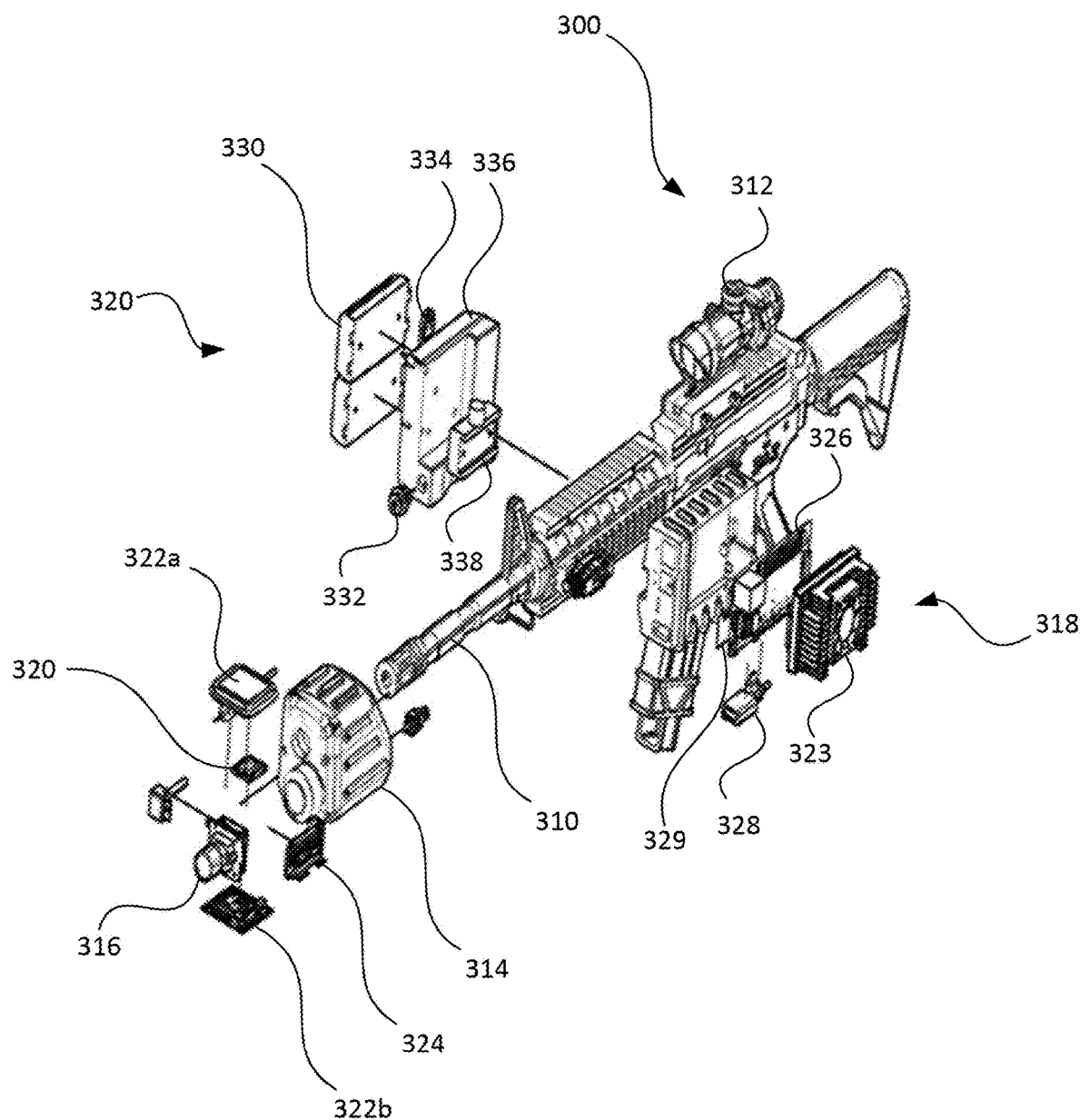
Figure 3D:
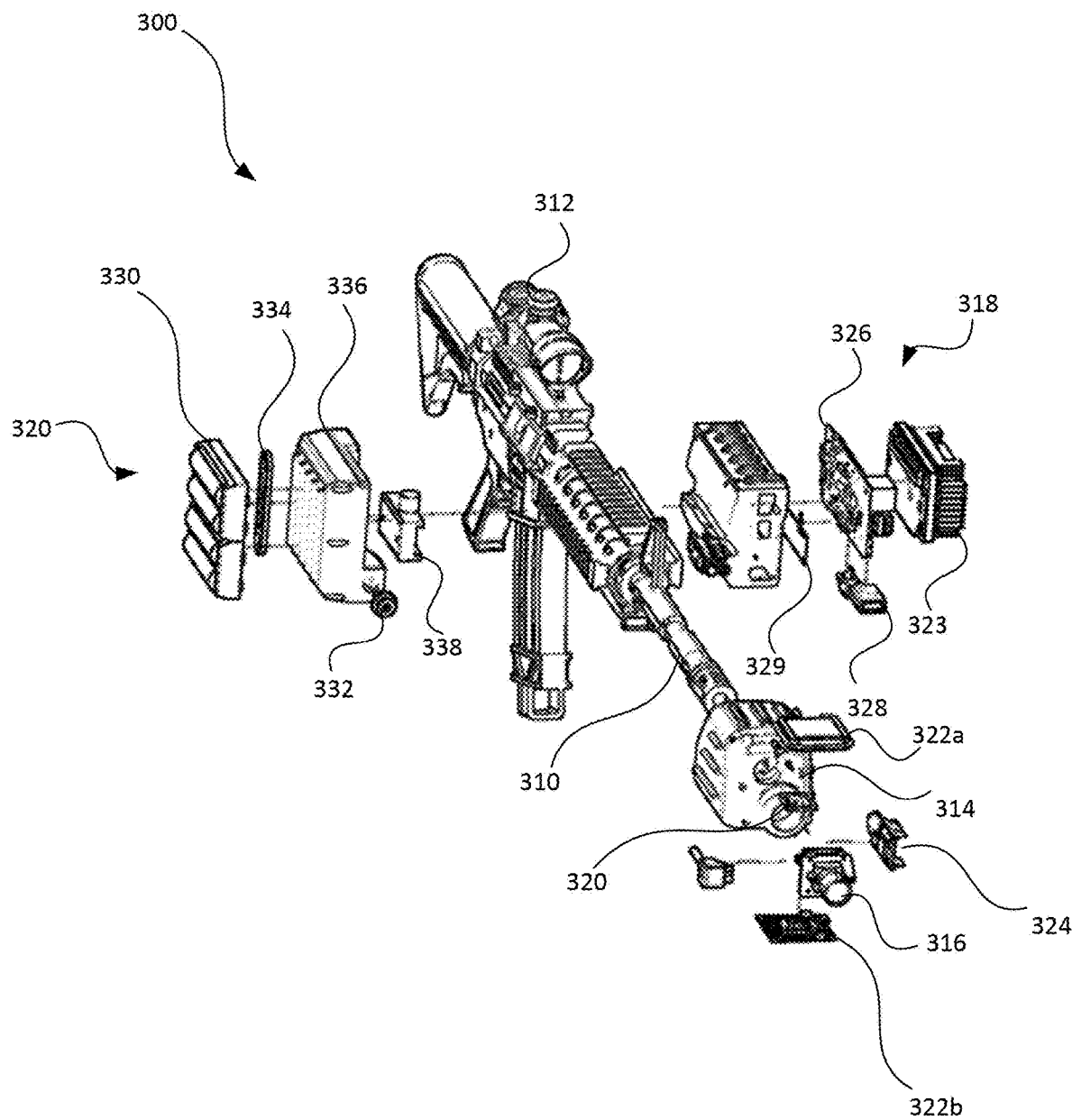
Figure 3E:
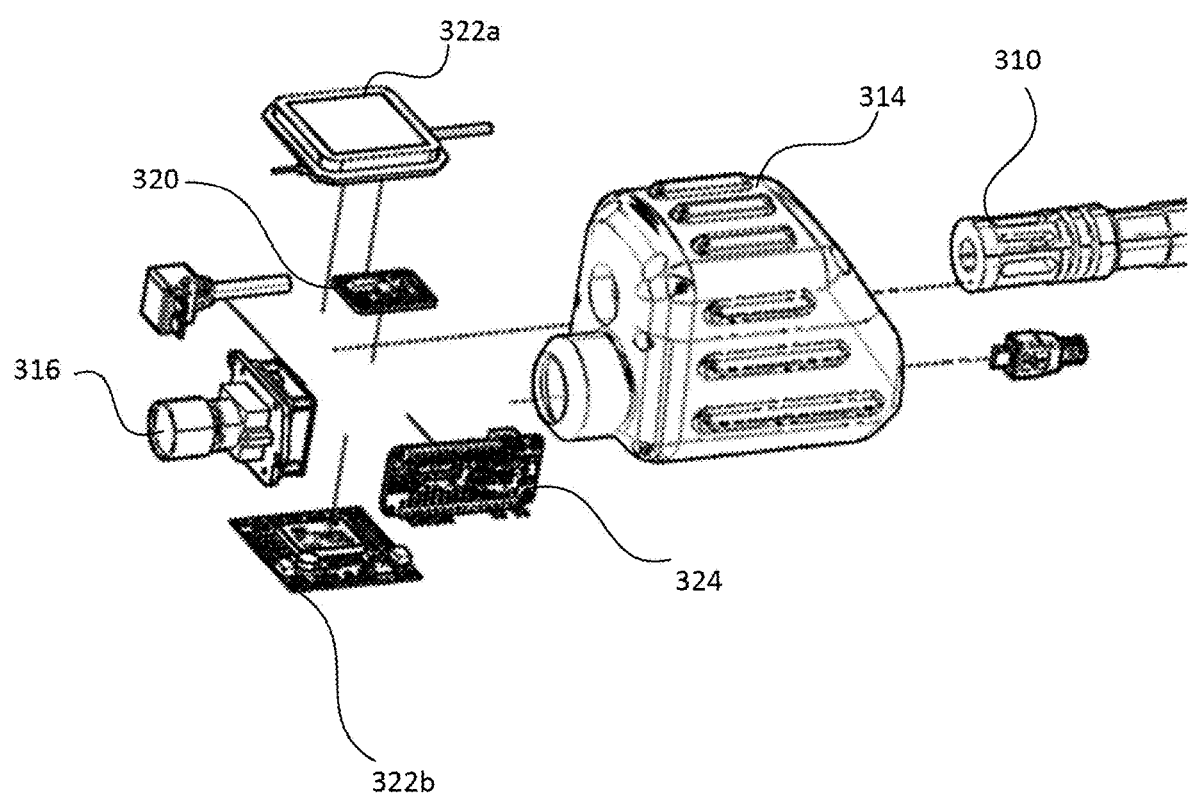

Components of the weapon pose unit and UV camera housing 314 are best illustrated FIG. 3E. For example, the weapon pose unit and UV camera housing 314 may include an orientation module 320 and a position module 322. The orientation module 320 may include an inertial measurement unit (IMU), 3-axis magnetometer, and/or 2-axis pendulous inclinometer (to determine an azimuth angle and/or canting of the weapon device 300) that are capable of determining an orientation and/or angular movement of the weapon device 300. The position module 322 may include a GPS, GNSS, and/or GPS+RTK sensor, which may be used to determine a location of the weapon device 300 as well as for synchronization/calibration purposes. In some embodiments, the position module 322 may include multiple components. For example, a first position module 322a may include an antenna, while a second position module 322b may include other components of the position module, such as a processing unit.

The weapon pose unit and UV camera housing 314 may also include UV (or other optical wavelength) camera 316 with a narrowband filter. The UV camera 316 may be mounted within the weapon pose unit and UV camera housing 314 so as to be aligned with the barrel 310 of the weapon device 100. A microcontroller 324 may also be included that controls operation of the orientation module 320, position module 322, UV camera 316, and/or any other electronics components housed within the weapon pose unit and UV camera housing 314. While not shown here, some embodiments may include an optional UV emitter for bi-directional communications with target. In some embodiments, one or more auxiliary sensors, such as temperature, humidity, and/or other sensor may be included.

Figure 3F:
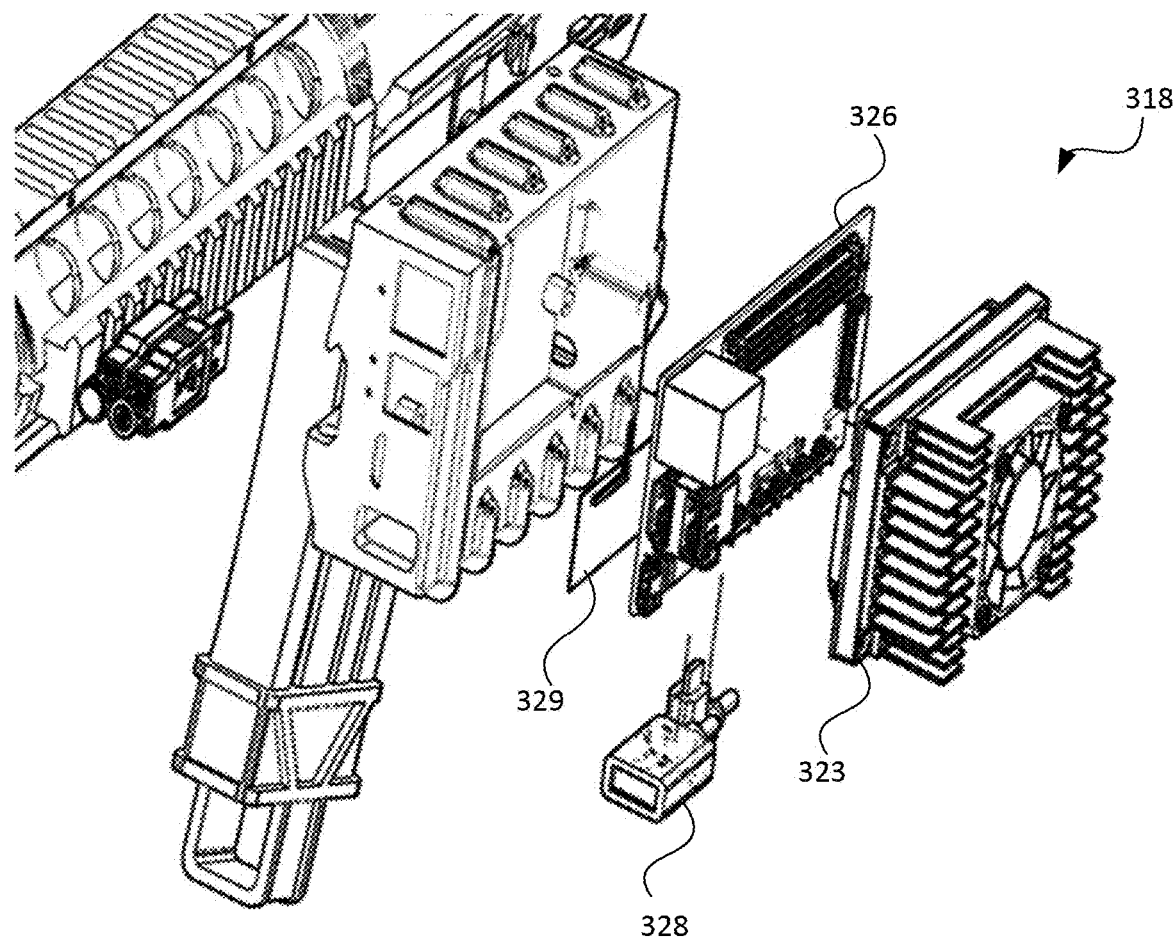

As best illustrated in FIG. 3F, the microprocessor housing 318 may include a microprocessor 323 that may control operations of the various modules of the weapon device 300, including tying trigger events to actuation of the UV camera 316 and/or other functions. A breakout board 326 or other interface device may be included to interface the microprocessor 323 with a connection port 328 (such as a universal serial bus (USB) port) and a wireless antenna 329. The wireless antenna 329 may be used to link the weapon device 300 with other systems, such as a belt pack worn by a user and/or a base station server.

Figure 3G:
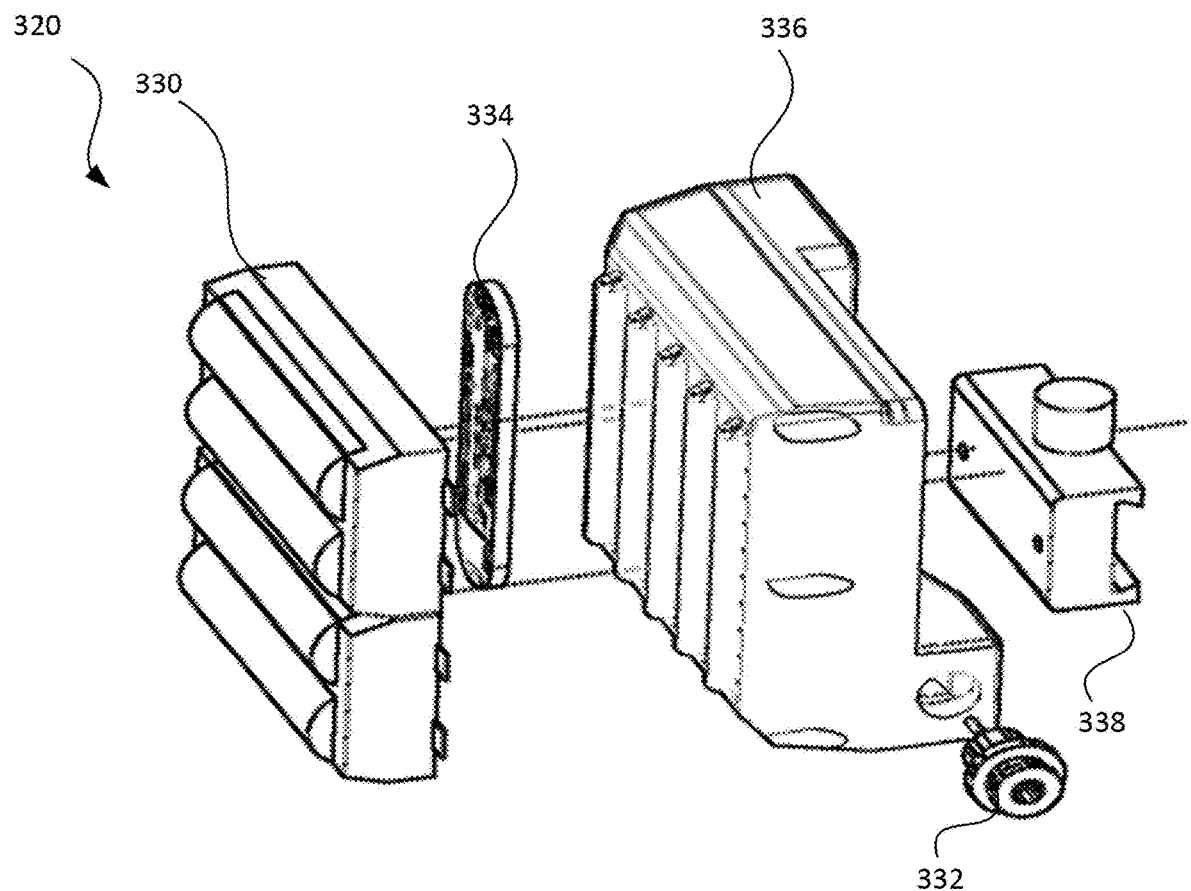

As best illustrated in FIG. 3G, the power pack 320 may include a battery pack 330. For example, one or more batteries may be included that provide power to the various electronic systems of the weapon device 300. In some embodiments, the batteries of the battery pack 330 may be rechargeable. In such embodiments, the power pack 320 may include a battery charging port 332 that is usable to interface a power source to the battery pack 330. A battery management system 334 may be included that may be used to adjust power levels supplied to various electronic components during use. For example, when the weapon device 300 is currently not in an aiming position, the battery management system 334 may reduce or cut power to one or more systems to conserve power. Similarly, the battery management system 334 may reduce the frequency and/or content of transmissions to external devices (such as target beacons and/or base station servers) and/or reduce sampling rates of photodetectors to cut down on power consumption in times of non-use. The power pack 320 may also include a case 336 that houses the various components of the power pack 320 and a mount 338 that secures the case 336 to the weapon body 302.

Figure 4:
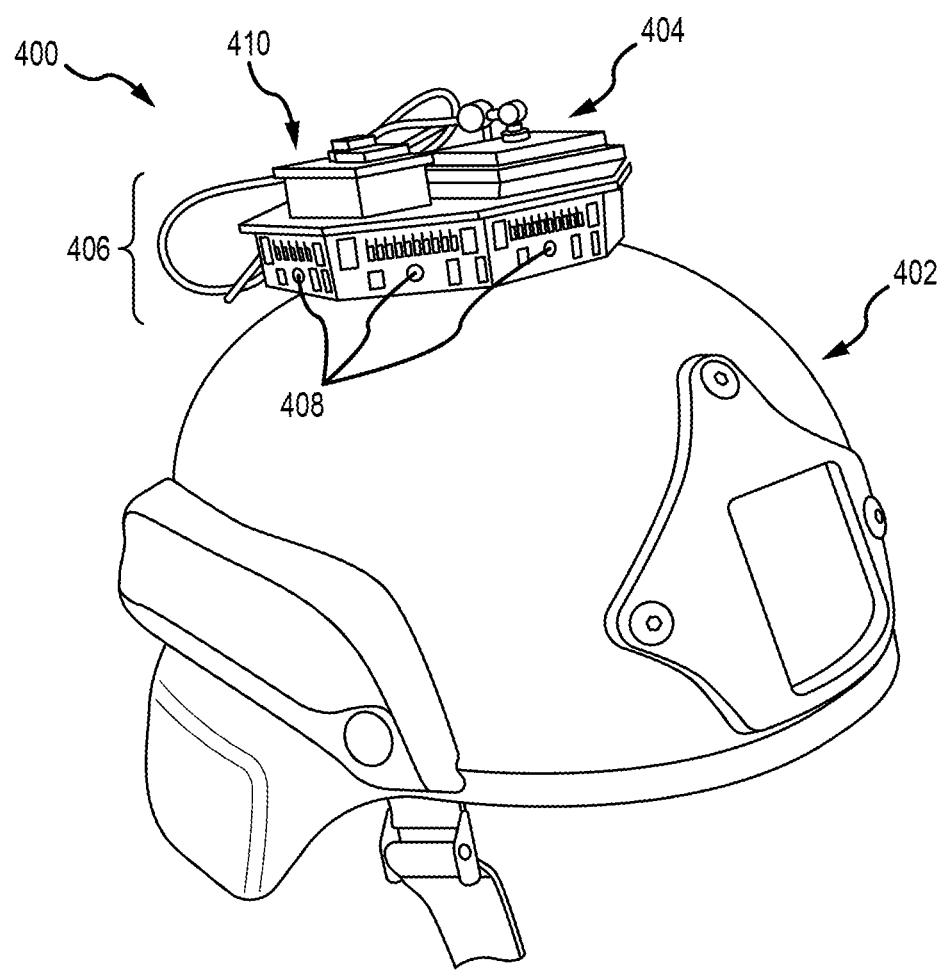
FIG. 4 illustrates a mobile beacon according to some embodiments of the present invention.

FIG. 4 illustrates one embodiment of a target/mobile beacon 400 according to the present invention. As illustrated, mobile beacon 400 is affixed atop a user's helmet 402, however other mounting locations are possible. The mobile beacon 400 may include a position module 404, such as a GNSS smart receiver with correction. A beacon pose unit 406 may be included, which may include an inclinometer and/or IMU that are usable to determine a pose of the user wearing the mobile beacon 400. One or more optical emitters (such as UV emitters) 408 may be positioned on the helmet 402. As illustrated, a number of optical emitters 408 may be positioned at various angular positions of the helmet 402, ensuring that at least one optical emitter 408 is visible from any viewing angle of the helmet 402. The angular positions may be at regular intervals (such as at every 45 degrees) and/or at irregular intervals. The mobile beacon 400 may also include a local power, communications antenna, and/or microcontroller 410.

In some embodiments, each user may also be given one or more additional pieces of equipment. For example, a wrist-mounted display/control may provide an interface to the war game, and includes the option for health tracking of warfighters. A belt/vest pack may include power, radios, local communications, inclinometer, and processing capabilities. In some embodiments, supplemental UV emitters on helmet, uniform, etc. Speakers may be provided to enable soldier communications, such as enabling the use of a panic button.

Figure 5A:
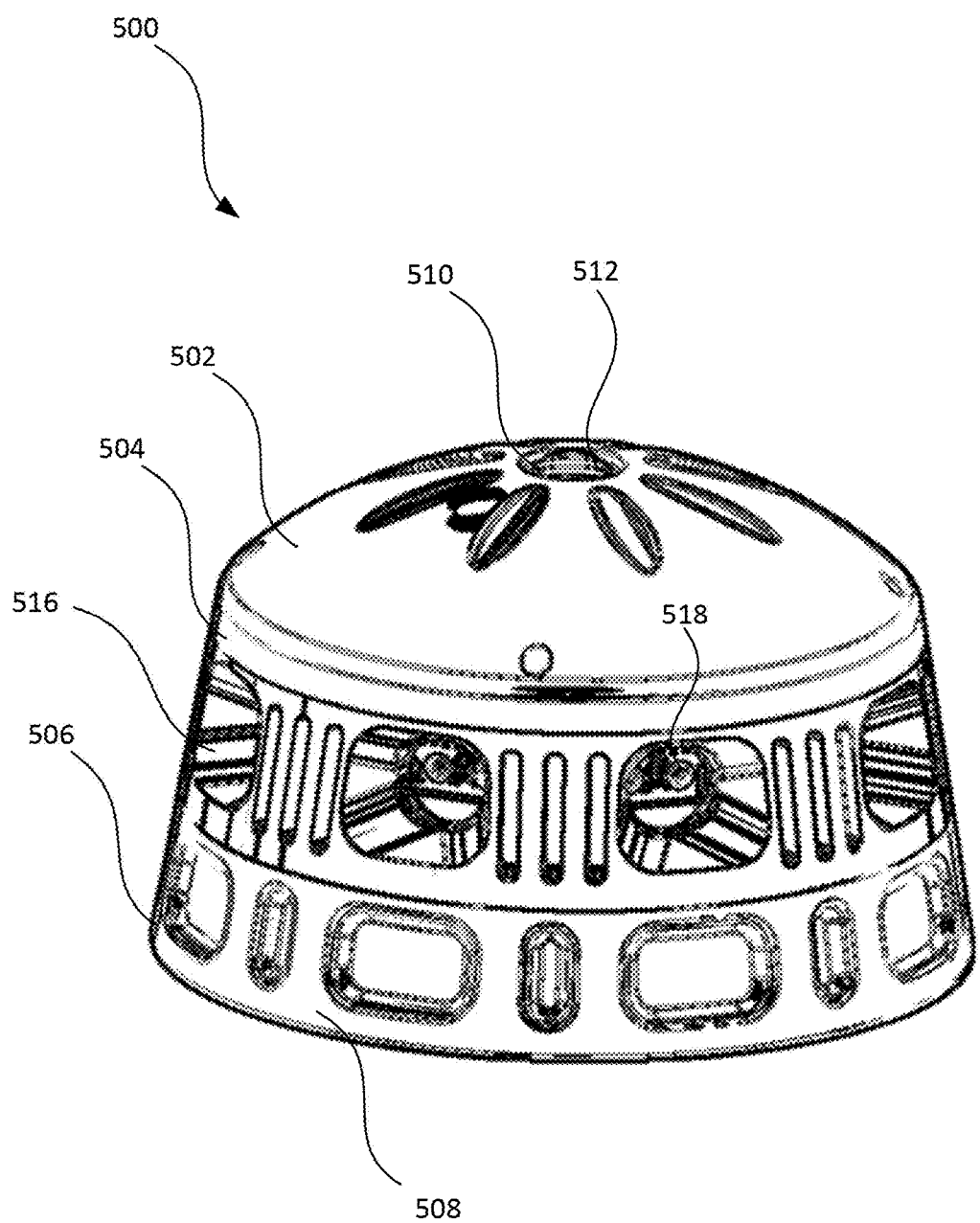
FIGS. 5A and 5B illustrate a fiducial beacon according to some embodiments of the present invention.
Figure 5B:
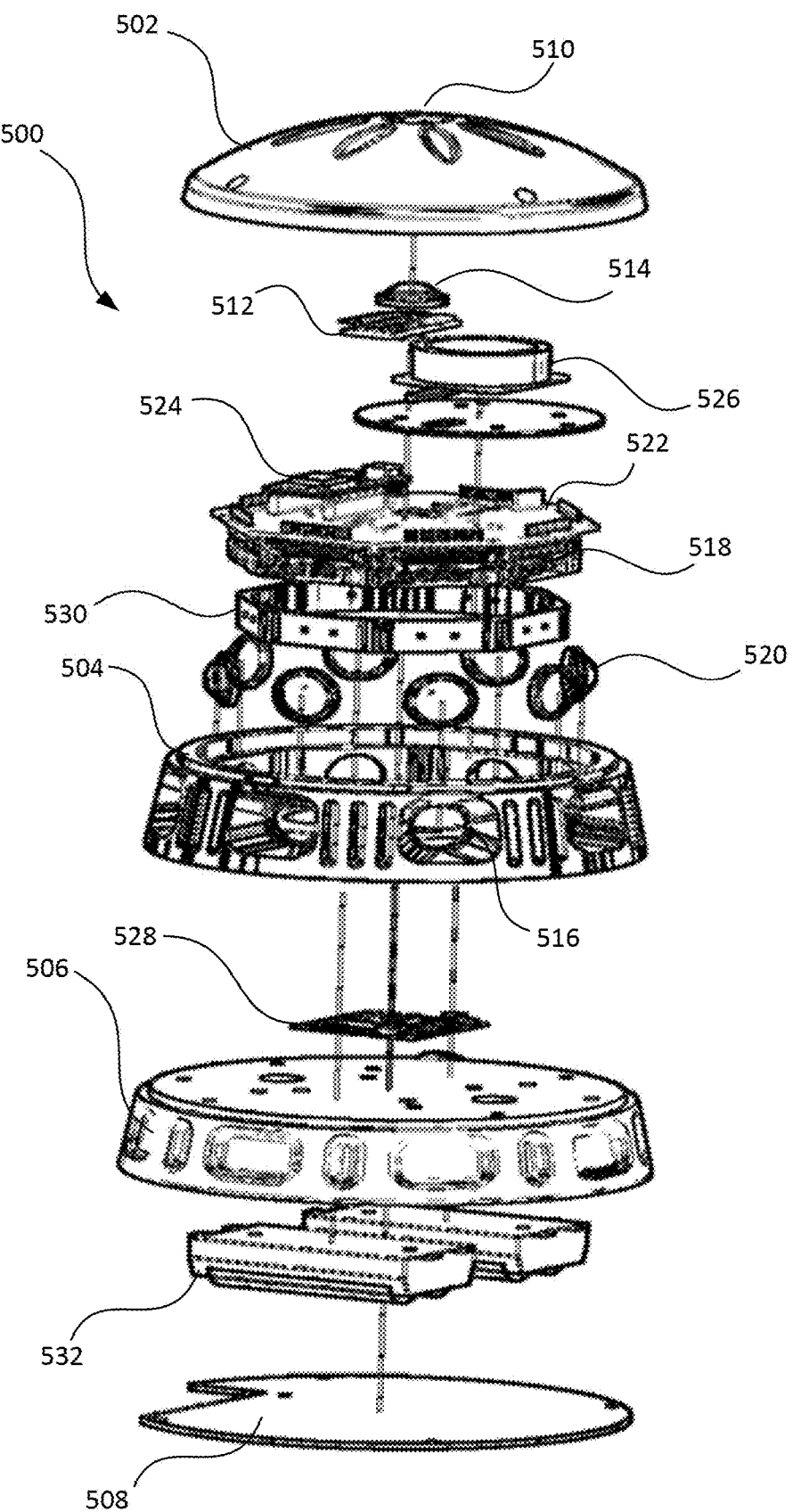

FIGS. 5A and 5B illustrate one embodiment of a fiducial beacon 500 according to the present invention. The fiducial beacon 500 may include a cover casing 502, heat sink casing 504, base casing 506, and base closeout 508 which are secured together to house internal components of the fiducial beacon 500. In some embodiments, the cover casing 502 defines a central aperture 510 that provides viewing access for a vertically oriented optical LED emitter 512 (possibly with a dedicated circuit board) and vertically oriented lens 514. The heat sink casing 504 may define a number of radially arranged apertures 516 that provide viewing access for a number of laterally oriented optical LED emitters 518 (with one or more circuit boards) and a number of laterally oriented lenses 520. The fiducial beacon 500 may include a circuit board 522 that include a microcontroller 524 as well as a beacon pose unit and/or IMU. The fiducial beacon 500 may also include a GPS antenna 526 and a GPS chip 528 for determining the position of the fiducial beacon 500 and/or for calibration/synchronization purposes. The fiducial beacon 500 may also include a heat spreader 530 and a power supply 532, such as one or more batteries. Fiducial beacons 500 may be used as object beacons that may be stationed on trees, fences, buildings, and/or other fixed objects and may mark position and incorporate physical properties into penetration prediction for ballistic outcome calculations. The fiducial beacons 500 may also enable the base station servers to automatically recalibrate the system to maintain timing and location precision.

It will be appreciated that the weapon devices, mobile beacons, and fiducial beacons described above are merely representative of a single embodiment and that numerous design variations may exist to suit the needs of a particular application.

Figure 6:
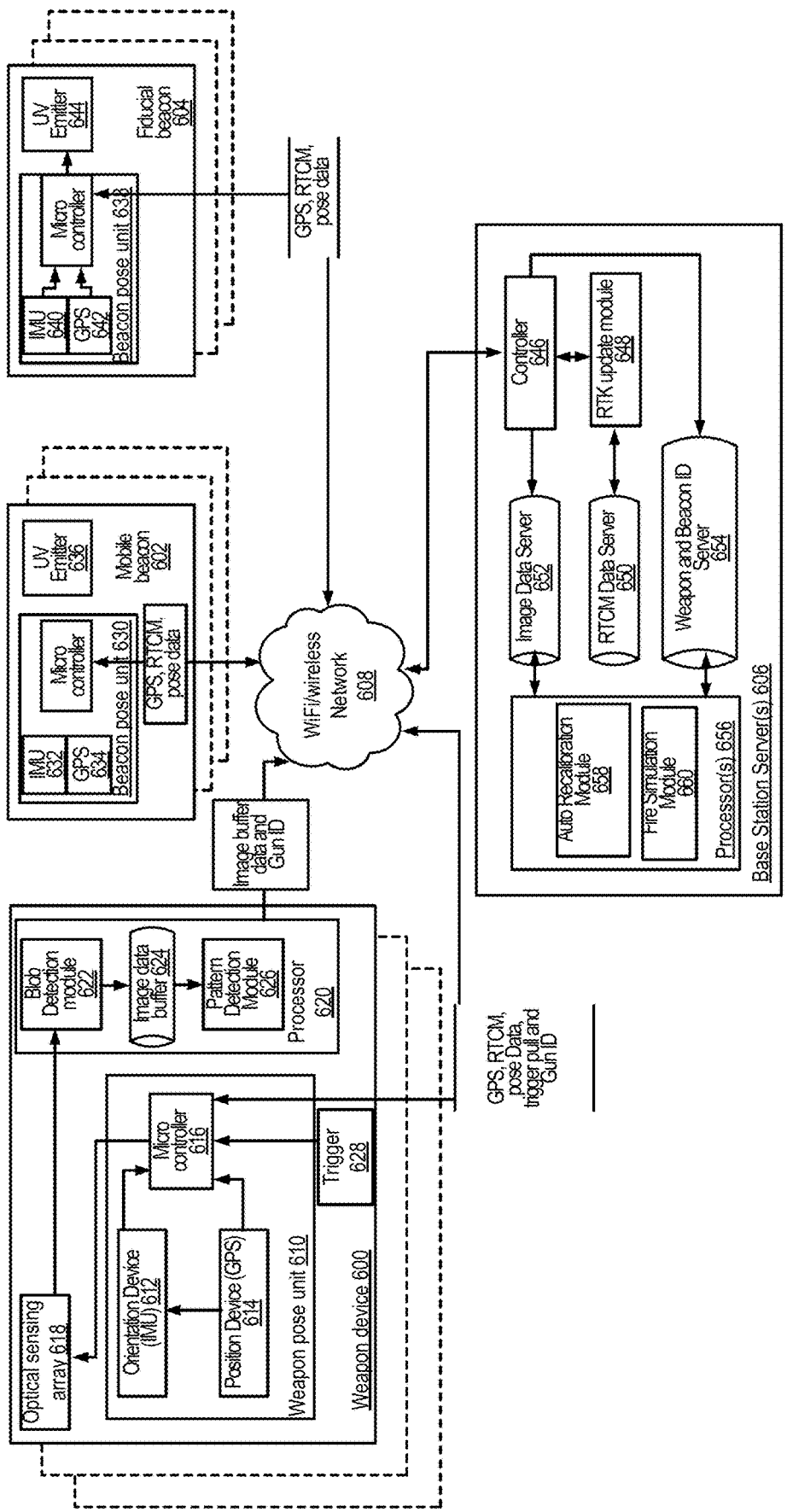
FIG. 6 illustrates a system architecture of a laserless training system according to some embodiments of the present invention.
Figure 7:
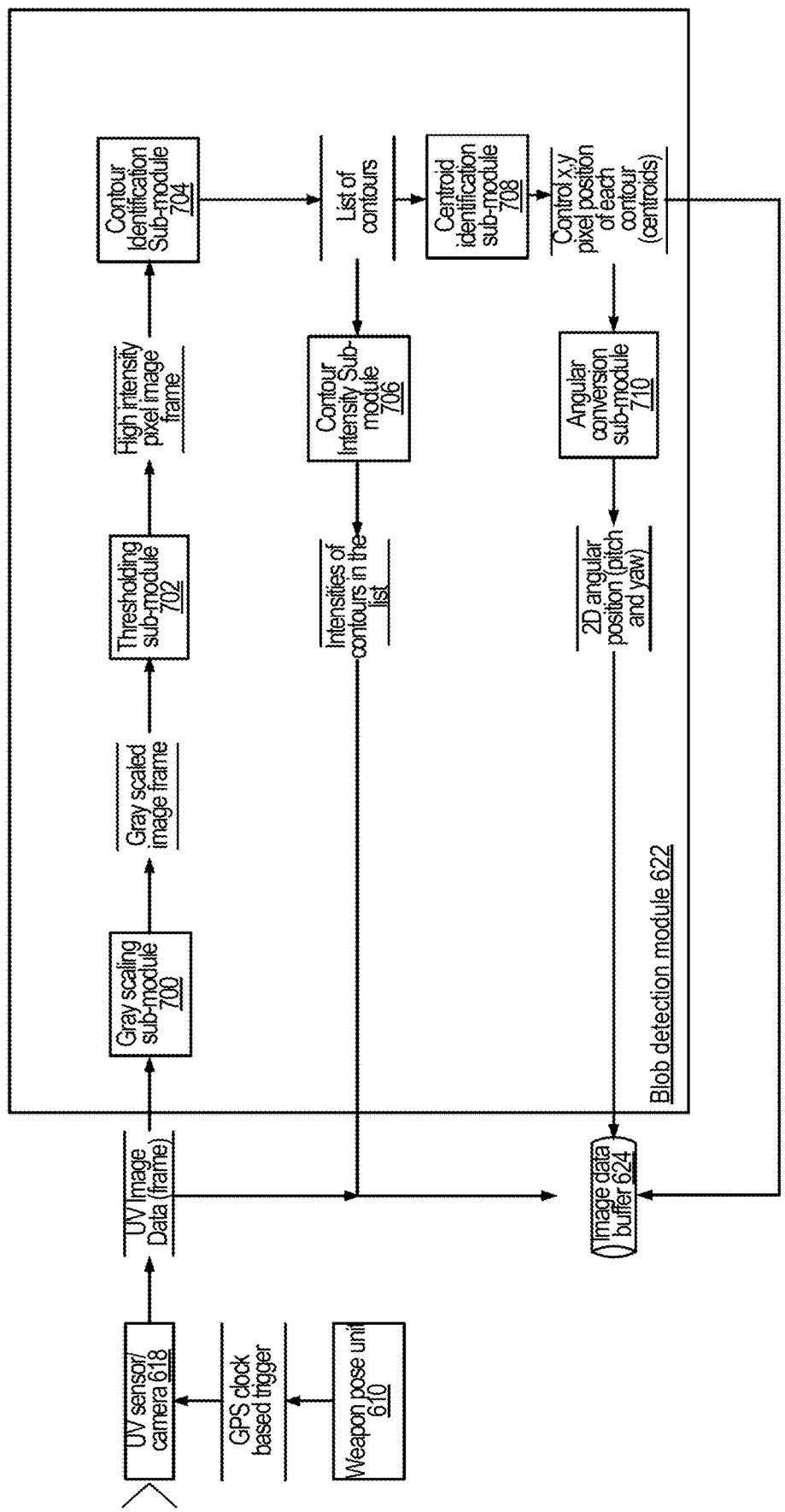
FIG. 7 illustrates an architecture of a blob detection module according to some embodiments of the present invention.
Figure 8:
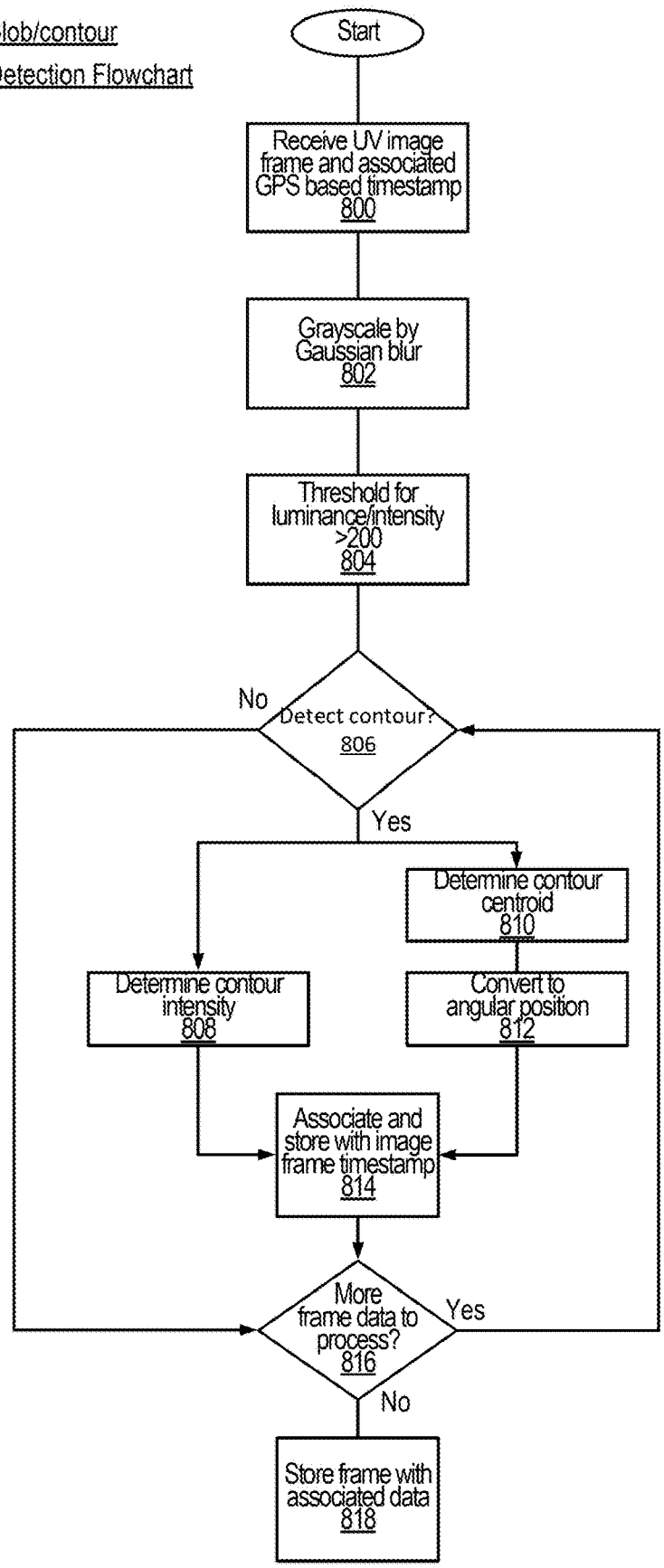
FIG. 8 is a flowchart of a process for performing blob detection according to some embodiments of the present invention.

FIG. 6 illustrates a system architecture of a combat simulation system similar to the systems described above. The system may include at least one weapon device 600, at least one mobile beacon 602, at least one fiducial beacon 604, and one or more base station servers 606. The various components may be communicatively coupled with one another over one or more networks 608. For example, each network 608 may include one or more cellular data network, such as 3G, 4G LTE, 5G, and/or future cellular networks, WLAN, WiMAX, and/or other wireless network technologies.

Each weapon device 600 may include a weapon pose unit 610 that is configured to determine a position and orientation of the weapon device 600. For example, the weapon pose unit 610 may include an orientation device 612, which may include an IMU and/or other devices that may help determine an angular position of the weapon device 600. The weapon pose unit 610 may also include a position device 614, such as a GPS, GPS-RTK, and/or GNSS system that is usable to determine an absolute position of the weapon device 600 on a coordinate system of a training area. The position device 614 may also be used to implement calibration operations that synchronize the various components of the system using timing features of the satellite network. Information from the weapon pose unit 610 may be passed through a microcontroller 616 for processing and/or transmission to the base station servers 606 over the one or more networks 608. The weapon device 600 also includes an optical sensing array 618, such as a UV camera sensor, that is configured to image a field of view of the weapon device 600. Images from the optical sensing array may be passed to a processor 620, which may perform one or more image processing functions to identify any beacons (centroids) present within the image frame data. For example, the a blob detection module 622, image data buffer 624, and pattern detection module 626 of the processor 620 may be used to detect any beacon signals present within image frame data from the optical sensing array and then determine the identity of any beacons found as discussed in greater detail with respect to FIGS. 7-11. In some embodiments, rather than performing the image processing at the weapon device 600, some or all of the image processing steps may be performed by the base station servers 606.

The weapon device 600 may also include a trigger 628. When the trigger 628 is pulled, the weapon device 600 may pass information such as pose information (orientation and position), a timestamp associated with the trigger pull, a weapon device identifier, and/or other information to the base station servers 606 for ballistic outcome calculations and/or calibration update calculations. In addition to this information, the weapon device 600 may pass the image frame data (and any processed centroid/beacon information) to the base station servers 606.

Each mobile beacon 602 (which may be affixed to a target, such as a human) may include a beacon pose unit 630. The beacon pose unit 630 may include an orientation device 632, which may include an IMU and/or other devices that may help determine an angular position of the mobile beacon 602. The beacon pose unit 630 may also include a position device 634, such as a GPS, GPS-RTK, and/or GNSS system that is usable to determine an absolute position of the mobile beacon 602 on a coordinate system of a training area. The position device 634 may also be used to implement calibration operations that synchronize the various components of the system using timing features of the satellite network. Information from the beacon pose unit 630 may be passed to the base station servers 606 over the one or more networks 608. Each mobile beacon 602 includes an optical emitter 636, such as a UV emitter, that is configured to emit a pulse-coded optical signal that contains an ID associated with the particular mobile beacon 602. In some embodiments, the pulse-coded signal may include additional information, such as location information, movement information, object information (size, materials, etc.), and/or other information.

Each fiducial beacon 604 (which may be affixed to a fixed object, such as a tree, building, fence, etc.) may include a beacon pose unit 638. The beacon pose unit 638 may include an orientation device 640, which may include an IMU and/or other devices that may help determine an angular position of the fiducial beacon 604. The beacon pose unit 638 may also include a position device 642, such as a GPS, GPS-RTK, and/or GNSS system that is usable to determine an absolute position of the fiducial beacon 604 on a coordinate system of a training area. The position device 642 may also be used to implement calibration operations that synchronize the various components of the system using timing features of the satellite network. Information from the beacon pose unit 638 may be passed to the base station servers 606 over the one or more networks 608. Each fiducial beacon 604 includes an optical emitter 644, such as a UV emitter, that is configured to emit a pulse-coded optical signal that contains an ID associated with the particular fiducial beacon 604. In some embodiments, the pulse-coded signal may include additional information, such as location information, movement information, object information (size, materials, etc.), and/or other information.

It will be appreciated that the various optical beacons described herein may each include optics (reflectors, refractors, total internal reflectance (TIR) lens, etc.) to tailor the emitted light characteristics (beam-shaping, directivity, etc.) to meet the needs of a particular application. Additionally, LEDs of the various beacons may include visible blocking filters, such as UV pass-band filters.

Each base station server 606 may take data from the weapon device 600, mobile beacons 602, and fiducial beacons 604 and may calculate ballistic outcomes. For example, a controller 646 may receive the pose information (orientation and position), a timestamp associated with the trigger pull, a weapon device identifier, the image frame data (and any processed centroid/beacon information) from one or more weapon devices 600, location, identification, and/or other data from one or more mobile beacons 602, and/or location, identification, and/or other data from one or more fiducial beacons 604. Location information may be passed to a real-time kinematics (RTK) update module 648 and Radio Technical Commission for Maritime Services (RTCM) data server 650. Image data from the weapon devices 600 may be communicated to an image data server 652. Pose data from the various devices may be communicated to a weapon and beacon ID server 654 for storage and associated with their respective device IDs.

One or more processors 656 of the base station server 606 may access the image data and/or pose data to perform one or more functions. For example, an auto-calibration module 658 may perform an auto-calibration process as described in greater detail in relation to FIGS. 12 and 13. For example, the auto-recalibration process may keep weapon devices calibrated for accurate location determination and may help synchronize timing across all devices in the training environment. A fire simulation module 660 may perform a fire simulation process to determine a ballistic outcome for a simulated shot based on reception of a trigger pull as described in relation to FIGS. 14 and 15.

It will be appreciated that the system architecture described above is merely representative of a single example of a system, and that numerous variations may exist. For example, one or more modules or systems may be combined or split to meet the needs of a particular application. Additional components and/or process steps are possible in various embodiments.

Associated image frame data, and associated data are referred to herein, sometimes analogously, to generally point to data that may be calculated, determined, received, and/or otherwise obtained that is associated together either by storing or collecting with respect to a common factor or common other piece of information between the associated data. Associated image frame data may more specifically refer to data that is calculated, determined, received, and/or otherwise obtained that is associated together by storing or collecting with respect to a processed image frame from/to which the data is related.

In many operating examples, UV image capturing may occur based on a position module (GPS) 614 of the weapon device 600 receiving position data from satellites in communication with the GPS devices. The optical sensing array 618 receives GPS initiated pulses from the coupled microcontroller 616 to initiate/trigger a sequence of image frame capturing (UV frequency image data). The microcontroller 616 gets a 1 Hz pulse from the coupled position module (GPS device) 614 which triggers the microcontroller 616 to pulse the optical sensing array 618 for sequence image capturing. The coupling of the optical sensing array 618 to the microcontroller 616, and the coupling of the microcontroller 616 to the position module 614 is to ensure in-sync timing of the image sequence and GPS position data reception. That is, the position module 614 receives satellite position data and pulses the microcontroller 616 every second (or some other predetermined period of time). In response to that pulse, the microcontroller 616 then pulses a sequence to the optical sensing array 618 for image capturing such that for every second, a sequence of images is captured. The position module 614 is further coupled to the weapon devices orientation module 612 to further sync orientation data read out with position data and image capturing.

The microcontroller 616 is configured to continuously send evenly spaced hi-lo triggering pulses to the optical sensing array 618 in response to the 1 Hz pulse from the position unit. For example, for a given second, the microcontroller unit sends a high state (1) for $\frac{1}{64}^{th}$ of the second and a low state (0) for $\frac{1}{64}^{th}$ of the second, continuously, such that there will be 32 high state periods and 32 low state periods within a given second.

The optical sensing array 618 is configured to capture a UV image frame on the rising edge of the pulses and associate a timestamp of the image capturing with the image frame. In beacons 602, 604, this same architecture and process is used to trigger emittance of LEDs, wherein with the beacons 602, 604, it is the LED array which is coupled to the microcontroller for emittance sequence triggering. However, the beacons 602, 604 may not be triggered to emit on every high pulse. The beacons 602, 604 may be precoded to emit on some hi pulses (be on) and be off on other high pulse according to a predetermined image detectable pattern associated with the beacons' identification.

As described above, the blob detection module 622 and pattern determination module 626 may be used to detect any beacon signals present within image frame data from the optical sensing array and then determine the identity of any beacons found. An architecture of the blob detection module 622 and a process flow are described in relation to FIGS. 7 and 8. For example, the blob detection module 622 may include a gray scaling sub-module 700, a thresholding module 702, a contour identification sub-module 704, a contour intensity sub-module 706, a centroid identification sub-module 708, and an angular conversion sub-module 710. A process for performing blob detection may begin at block 800 by the blob detection module 622 receiving the image frames from a UV sensor/camera of the optical sensor array 618 of a weapon device 600 with corresponding timestamps are read out to the on-board processor 620 of the weapon device 600 and are image processed by the blob detection module 622. The blob detection module 622 executes a plurality of sub-modules to detect objects in the image that may correspond to beacons in the environment that were imaged. For example, the blob detection module 622 detects the image objects (blobs) by first executing a programming function in the grey scaling sub-module 700 that applies a Gaussian blur to the image and thus produces a gray scaled image at block 802. Next, the blob detection module 622 thresholds the image by executing a programming function in the thresholding sub-module 702 that removes pixels with luminance/intensity values below a particular threshold, such as 200, to produce a high intensity pixel image frame at block 804. In other embodiments the threshold value may be altered for the needs suitable as required by the process's application. After thresholding, the blob detection module 622 executes a programming function in the contour identification sub-module 704 that finds contours in the above threshold image data (high intensity image). If no contours are detected, the process determines whether there is more frame data to process at block 816 If one or more contours are detected, the contour identification module 704 produces a list of identified contours from the high intensity pixel image frame, with each identified contour in the list being defined by a pixel position value corresponding to boundary points of the contour as identified from the high intensity pixel image frame. Next, the list of identified contours is provided to the contour intensity sub-module 706 and the centroid identification sub-module 708. At the contour intensity sub-module 706, a programming function is executed that sums, for each contour respectively, the intensity values of all the pixels within a volume defined by the boundary points at block 808. The intensity sums are then stored at block 814, in association with the image frame from which they appear and the timestamp of the image frame capturing, in image data buffer 624. The centroid identification sub-module 708 executes a programming function that calculates a central pixel (centroid), for each contour respectively, using the boundary points of the centroids in the list at block 812. That is, for a set of boundary points defining a given contour, the centroid identification sub-module 708 calculates a center pixel expressed by an (x,y) pixel location within the image. The centroid identification module 708 then provides a list of calculated centroids (one centroid for each contour) to the angular conversion sub-module 710. At the angular conversion sub-module 710, a programming function is executed that uses calibration data and the centroid to convert the (x,y) pixel location to an angular position with respect to the image frame, for each centroid of the list respectively at block 812. Generation of the calibration data will be discussed further below. The calibration data includes a determined effective focal length of the UV sensor and a determined principle point of the UV sensor. The principle point is contemplated as being the optical axis of the UV sensor, thus the angular conversion sub-module 710 calculates and determines a 2D angular position relative to the optical axis of the UV sensor. The angular position may be referred to as the "offset angles" and/or "yaw and pitch" with respect to the UV sensor's optical axis (as defined by the principle point). A list of angular positions, (a 2D position for each centroid expressed angularly by $\Theta,\Phi$), and (x,y) positions are then also stored at the image data buffer 624 in association with the intensity of the contour from which they are derived at block 814, and thus the image frame from which they appear and the associated timestamp. The process determines whether there is more frame data to process at block 816. If more frame data is found, the process returns to block 806 to detect contours within the frame data. If no additional frame data is present, the process stores the frame with associated data at block 818. This process may be repeated whenever additional frames are received at the blob detection module 622.

In some operating examples of the present system, the lens of the UV camera/sensor may introduce distortions during image capturing, and furthermore, the lens may be misaligned with respect to the sensing array of the UV camera. In many operating examples, that the distortion and misalignment may be accounted for by performing a lens calibration comprising capturing a stack of images with the UV camera, wherein the captured images are of a checkerboard patterned calibration chart. The checkerboard calibration chart is configured to include UV reflective portions and UV absorption portions such that there is a sufficient contrast in UV detection between the two portions. The stack of images are then provided to, and operated on, by a known lens calibration algorithm that produces a distortion matrix and a camera matrix, wherein the distortion matrix is applied to subsequent images captured by the UV camera. The camera matrix includes values defining the effective focal length ($f_x,f_y$) and the principle point ($p_x,p_y$), wherein the principle point is used to convert (x,y) image pixel positions to angular positions ($\Theta,\Phi$) as described above.

Furthermore, in many operating examples of the present system, the system is further calibrated considering rotation offset between the weapon device's weapon device barrel and the UV camera, and is referred to as boresight calibration. In particular, it is contemplated that the boresight calibration accounts for how much roll, pan, and tilt the UV camera may have with respect to the weapon device's gun barrel. Each weapon device 600 may comprise a calibration module (not shown) within the on-board processor(s) communicatively coupled to the blob detection module 622, the microcontroller 616, and the image data buffer 624. The calibration module may execute the boresight calibration to determine how much pan, tilt, (also referred to as pitch and yaw), and roll may be present in the UV camera. The boresight calibration includes two steps, each executed by the processors of the weapon device 600 executing computer readable instructions of the calibration module, wherein a first step corrects for roll offset between the gun barrel and the UV camera, and then a second step correct for pan and tilt offset between the gun barrel and UV camera. To correct for roll offset, a user of the weapon device 600 views two emitting beacons in the environment. The user then aligns the beacons with a lateral (level) reticle line marker in the scope sight. This may be achieved by manually rotating the weapon device 600 so that the beacons align with the lateral reticle line or the beacons may be configured in the environment to be in horizontal alignment. The boresight calibration computer readable instructions cause the processors to perform a method comprising: 1) capturing a UV image of the two beacons, wherein the two beacons are aligned to the lateral reticle marker; 2) determining, via the blob detection module, the angular positions ($\Theta_1,\Phi_1$) and ($\Theta_2,\Phi_2$), as described above, for each beacon (centroid) respectively within the image; and then 3) calculating an angle between the two beacons within the image based on a ratio of the differences between the positions, according to:

$$\text{Roll} = \tan^{-1}\left(\frac{\Theta 1 - \Theta 2}{\Phi 1 - \Phi 2}\right), \quad \text{Eqn. 1}$$

wherein Roll is the roll offset of the UV camera with respect to the weapon device gun barrel. Next, pan and tilt offset of the UV camera is determined based on the calculated roll offset, predetermined x and y distance offsets as measured between the central axis of the UV camera and the central axis of the weapon device gun barrel, and a range between the location of the imaging weapon device (i.e. weapon device capturing an image frame) and the location of the beacon being image. As noted above, pan and tilt offset determination may only utilize one beacon being imaged, furthermore the user aligns the beacon in the center of the reticle marker within the scope. The boresight calibration computer readable instructions cause the processors to perform a method comprising: 1) capturing a UV image of a beacon, wherein the beacon is aligned to the center of a reticle marker; 2) determining, via the blob detection module, the angular position ($\Theta_b,\Phi_b$) of the beacon (centroid) within the image; 3) determining a corrected angular position based on the calculated roll and a rotation matrix wherein, $$\begin{pmatrix}\Theta_{corrected}\\ \Phi_{corrected}\end{pmatrix} = \begin{bmatrix}\cos(\text{Roll}) & -\sin(\text{Roll})\\ \sin(\text{Roll}) & \cos(\text{Roll})\end{bmatrix}\times\begin{bmatrix}\Theta_b\\ \Phi_b\end{bmatrix}; \quad \text{Eqn. 2}$$

4) determining the UV camera pitch and yaw based on the corrected angular position of the beacon, the x and y distance offsets, and a range between the location of the imaging weapon device and the location of the beacon in the image according to:

$$\Theta_{cam} = \tan^{-1}\left(\frac{y_{offset}}{\text{Range}_{GPS}}\right) - \Theta_{corrected} \text{ and} \quad \text{Eqn. 3}$$

$$\Phi_{cam} = \tan^{-1}\left(\frac{x_{offset}}{\text{Range}_{GPS}}\right) - \Phi_{corrected}, \quad \text{Eqn. 4}$$

wherein
$\Theta_{cam}$ is the angular amount of UV camera panning (pitch) with respect to the weapon device gun barrel;

$\Phi_{cam}$ is the angular amount of UV camera tilt (yaw) with respect to the weapon device gun barrel; and $\text{Range}_{GPS}$ is a calculated distance between the GPS based location (longitude, latitude, and altitude) of the weapon device and the GPS based location (longitude, latitude, and altitude) of the beacon. Moreover, determining the distance is further based on the radius of the earth at a given latitude. The $\text{Range}_{GPS}$ may be determined according to:

$$\text{Range}_{GPS} = \sqrt{r_w^2 + r_b^2 - 2r_w r_b \cos(\text{lat}_w)\cos(\text{lat}_b)\cos(\text{long}_w - \text{long}_b)\sin(\text{lat}_w)\sin(\text{lat}_b)}, \quad \text{Eqn. 5}$$

wherein
$\text{lat}_w$ is the GPS determined and reported latitude of the weapon device;

$\text{lat}_b$ is the GPS determined and reported latitude of the beacon being imaged;

$\text{long}_w$ is the GPS determined and reported longitude of the weapon device;

$\text{long}_b$ is the GPS determined and reported longitude of the beacon being imaged;

$r_w$ is the distance of the weapon device from the center of the earth; and $r_b$ is the distance of the beacon from the center of the earth.

$r_w$ and $r_b$ are determined by summing the GPS altitude and the radius of the earth, wherein the radius of the earth is a function of (i.e. based on) the GPS based latitude. That is:

$$r_w = R_E(\text{lat}_w) + \text{Alt}_w \quad \text{Eqn. 6}$$

and $$r_b = R_E(\text{lat}_b) + \text{Alt}_b \text{ wherein} \quad \text{Eqn. 7}$$

$\text{Alt}_w$ and $\text{Alt}_b$ are the GPS determined and reported altitude for the weapon device and beacon respectively. In addition, the radius of the earth at a given latitude may be determined by:

$$R_E(\text{lat}) = \sqrt{\frac{(a^2\cos(\text{lat})^2 + b^2\sin(\text{lat})^2}{(a\,\cos(\text{lat})^2 + b\sin(\text{lat})^2}}, \quad \text{Eqn. 8}$$

wherein
a is the radius of the earth at the equator; and
b is the radius of the earth at the pole.

In some embodiments, the blob detection may be performed on UV images only, while in other embodiments the blob detection may be performed on a number of images of various wavelengths, such as UV in combination with IR and/or visible light images. For example, a field sequential set up may allow each wavelength to be sampled in a given image cycle. Blob detection on visible light may be particularly useful for recognizing landmarks, pattern recognition, and/or object detection, while UV images are used to recognize beacons. Such multi-wavelength systems may analyze the delta between images to detect various features within the images.

Additionally, in some embodiments, one or more special-purpose subsystems may be included to perform additional image processing steps to help increase the accuracy of the blob detection process. For example, special-purpose subsystems (which may leverage machine learning techniques)

may be included that perform motion compensation, sensor overload compensation, process images to handle various weather/environmental features (such as distortions due to precipitation and/or fog), eliminate vertical streaking (which may occur when a ccd sensor is overloaded), identify and correct artifacts or other distortions, identify and remove reflected signals, and/or perform other image processing functions.

Figure 9:
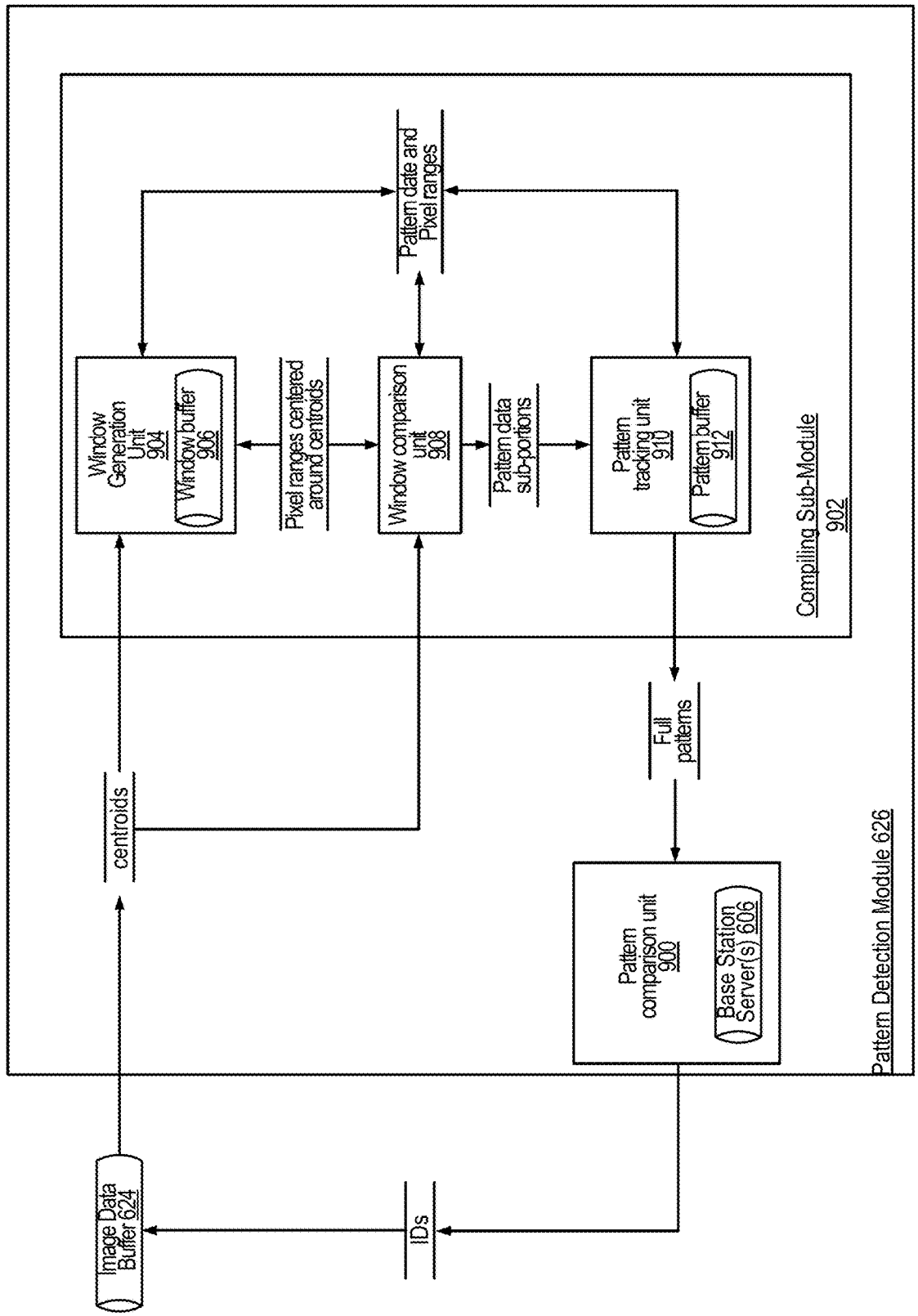
FIG. 9 illustrates an architecture of a pattern detection module according to some embodiments of the present invention.
Figure 10:
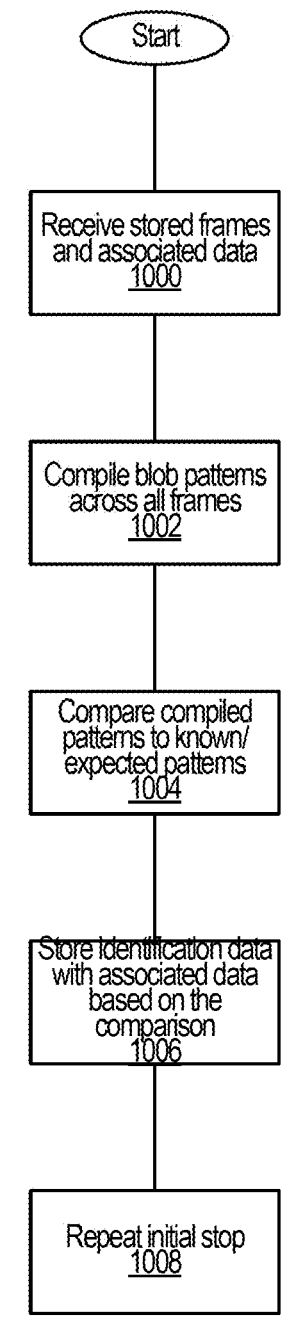
FIG. 10 is a flowchart of a process for performing pattern detection according to some embodiments of the present invention.

It is noted that the above calibration methods may be initiated by a calibration mode trigger which is actuated by a user of the weapon device. Furthermore, each weapon device communicates the predetermined x and y offsets, $\Phi_{cam}$, $\Theta_{cam}$, and Roll to the base station server(s) wherein the values are stored in association with preregistered weapon device IDs and may be utilized for subsequent processing. Discussion will now continue with the pattern detection module 626 and a process for performing pattern detection as illustrated in FIGS. 9 and 10.

The pattern detection module 626 executes a plurality of sub-modules to detect identification patterns of the contours that have been identified and stored in the image data buffer 624. For example, the pattern detection module 626 may include a pattern comparison module 900, a compiling sub-module 902, a window generation unit 904, a window buffer 906, a window comparison unit 908, a pattern tracking unit 910, and a pattern buffer 912. It is noted that the determination of a contour's intensity, angular position, and (x,y) position constitutes the detection/identification of a blob/contour. At this point of the process, the image data will have stored, for each image frame, a time stamp of the image frame's capturing and a list of identified blobs/contours, wherein the list of identified blobs/contours is defined by an (x,y) centroid position, a corresponding blob/contour intensity, and a corresponding angular position (converted from the centroid), for each blob/contour of the list as detailed in relation to FIGS. 7 and 8 above. Furthermore, the collection of centroid positions, angular positions, and intensities for each image frame and timestamp may be referred to as associated data.

The pattern detection module 626 receives the centroids within the associated data of an image frame from the image frame buffer 712 to begin pattern detection at block 1000. In particular, a pattern compiling sub-module 902 receives the stored frames and associated data for each frame. The compiling sub-module 902 executes a programming function that builds a pattern which corresponds to a given centroid, wherein the pattern is built by tracking a centroid appearance across image frames until one or more of the patterns are of a predetermined length at block 1002. After one or more patterns are of a predetermined length (i.e. equal to a predetermined threshold length), the compiling sub-module 902 outputs the threshold satisfying patterns to the pattern comparison sub-module 900. Further description of the pattern compiling sub-module 902 will be discussed below.

The pattern comparison sub-module 900 includes an ID server which further comprises known preregistered IDs of all beacons within the environment. Each ID is stored in association with a predetermined permutation of image detectable patterns. It is noted that each beacon is preprogrammed to cycle between being on and off (emit and not emit) according to a known, and thus expected, pattern with respect to time. For example, a detectable pattern for a beacon may be on-off-on, wherein all beacons are similarly GPS clock synced with the UV image capturing such that, in this example, the UV sensor will be able to produce three images, if the beacon is in the sensor's field of view, comprising a first image wherein the beacon (centroid) is present, a subsequent image wherein the beacon (same centroid) is not present, and a third image wherein the beacon (same centroid) is present again. In this example, the pattern compiling unit 902 may produce (measure) an imaged pattern of 1-0-1 for the centroid that was detected in the first image. In the pattern comparison module 900, preregistered IDs of beacons are stored in association with expected patterns wherein a permutation of the expected pattern is also used when comparing expected patterns to measured patterns. For each expected pattern, a set of expected patterns is created by removing a last position digit of the pattern, shifting every remaining digit right by one position and filling the first (now empty) position with the digit that was removed from the last position. This pattern is stored as a permutation of the permutation set for an expected pattern. The permutations are repeated for the length of the pattern such that the set of expected patterns comprises every shifted permutation of the expected pattern. This is done to account for possible measurement of a beacon when the beacon is not being seen at the beginning of its detectable pattern sequence. Furthermore, each beacon's expected pattern is chosen such that none of the particular permutations in the set of expected patterns of a given beacon will match any other beacon's entire set of expected patterns. After a measured detectable image pattern of a beacon/centroid is matched to one of the expected patterns (or a permutation of an expected pattern) at block 1004, the associated data associated with the centroid is updated to now included the known preregistered ID, and thus the centroid is identified as being a particular beacon at block 1006. This process may be repeated as many times as necessary at block 1008. It is further noted that centroid/beacon IDing as described above utilizes a plurality of image frames.

Figure 11:
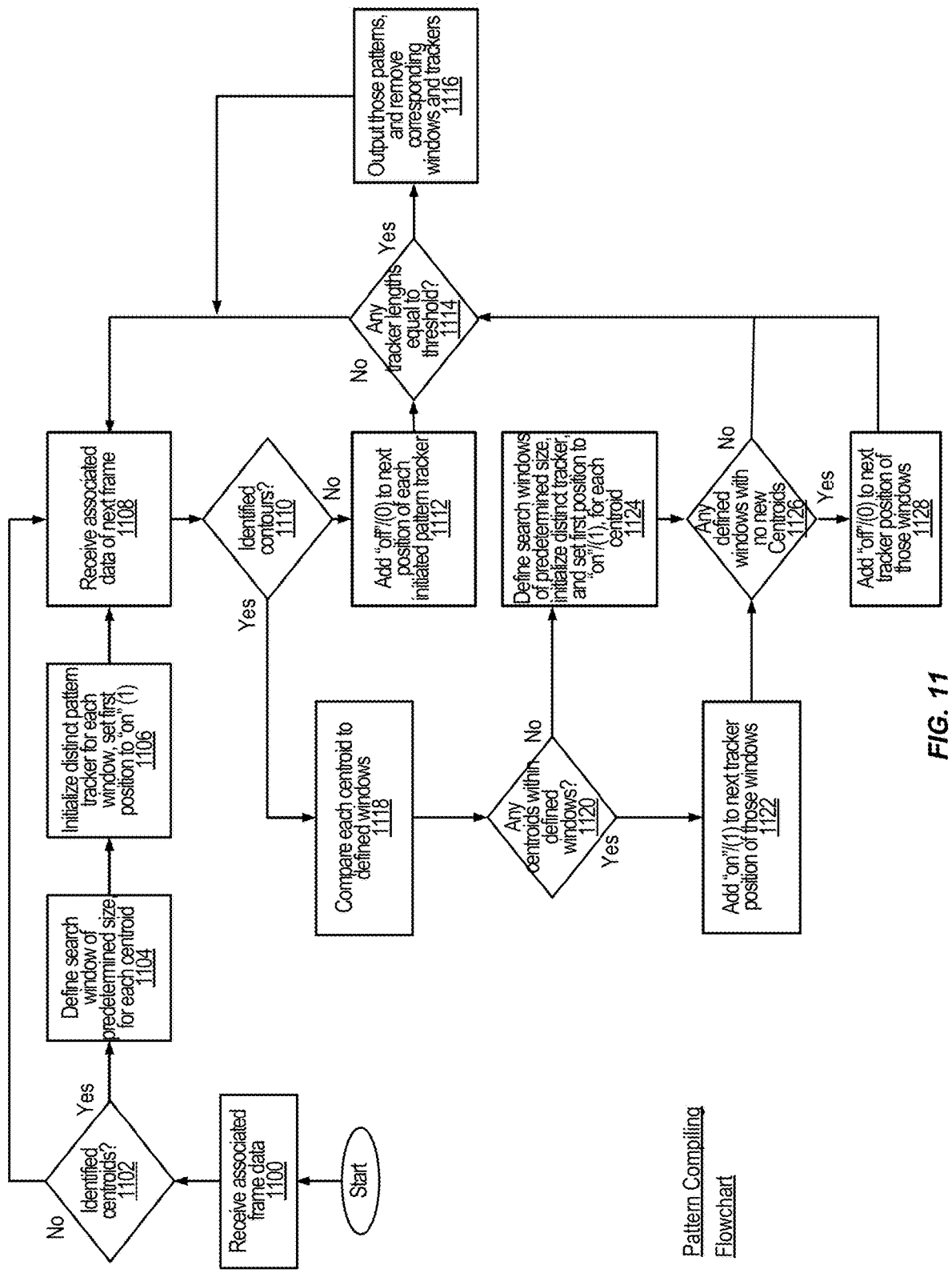
FIG. 11 is a flowchart of a process for performing pattern compiling according to some embodiments of the present invention.

Further description will now be given to the pattern compiling sub-module 902 in association with FIGS. 9 and 11. A pattern compiling process begins at block 1100 by the pattern compiling sub-module 902 receiving associated image data corresponding to an image frame. A determination is made at block 1102 whether any centroids have been identified within the associated frame data. In a situation where centroids are not present within the associated data (i.e. have not been detected within the image), the process proceeds to consider associated data of a next image frame at block 1108. However, in a situation wherein centroid are within the associated data of the frame (i.e. beacons/blobs were imaged and detected), the window generation unit 904 defines a search window for each centroid at block 1104. The defined search windows are centered about the (x,y) pixel locations of the centroids respectively. Furthermore, the search windows are stored in the window buffer 906 as a predetermined size, for example, 100 by 100 pixels. Next, the window generation unit 904 communicates an indication to the pattern tracking unit 910 that one or more windows have been generated, (one window per detected centroid).

The pattern tracking unit 910, in response, initializes a pattern tracker for each window, (separate and distinct trackers), wherein the pattern trackers are time-based state recordings of a centroid's appearance across a plurality of image frames. The pattern tracking unit 910 initializes and stores in the pattern buffer a same number of trackers as windows generated by the window generating unit, where each tracker is associated with a specific window at block 1106. The pattern tracking unit 910 also sets an initial position of the initialized trackers to "1" indicating that the respective centroids were detected thus a beacon was "on"

(i.e. a beacon corresponding to the centroid was on in that frame). After a search window is defined and corresponding pattern tracker initialized for each centroid in the associated data of the frame, in a next step, associated data of a sequential frame is received by the pattern detection module 626 at block 1108. A determination is made at block 1110 whether any centroids are identified within the associated data of the next frame. In a situation where no contours are within the associated data, no new windows are generated as determined by the window generating unit 904. The window generating unit 904 then reports this indication to the pattern tracking unit 910 and in response, the pattern tracking unit adds a "0" to the next position of all previously initialized pattern trackers at block 1112. The pattern tracking unit 910 then compares the number of positions of all previously initialized trackers for determination if any trackers are of a predetermined length at block 1114. The predetermined length may be defined to be a desired length for a centroid's image detectable pattern. That is, for example, beacons may be preprogrammed to have emittance/off pattern sequences that are all distinct but of a same length. The pattern tracking unit 910 determines if a given pattern is of sufficient length based on comparison to the predetermined threshold. In a situation where there are one or more pattern trackers equal to the predetermined threshold, the threshold satisfying patterns (sequence of set 1s and 0s) are output to the pattern comparison sub-module 900 at block 1116. Also, in the same step, the pattern tracking unit 910 removes the search windows and corresponding pattern trackers, of the output patterns, from the window buffer 906 and the pattern buffer 912. The process then proceeds to consider the associated data of a sequential image frame.

As stated above, for each sequential image frames' associated data, the pattern detection module determines if centroids are within the associated data of the next frame at block 1110. In a situation where centroids are within the associated data, the a window comparison unit 908 compares the (x,y) pixel location of each centroid to a previously defined window at block 1118. This is accomplished by comparing the pixel location to pixel location ranges defined by the window sizes at block 1120. In a situation where any centroids fall with the pixel location ranges associated with particular windows, the window comparison unit 908 detects this overlap/intersection for each centroid with respect to a window and adds a "1" to the trackers position for that frame corresponding to the windows within a detected overlap/intersection at block 1122. It is noted that once initialized, each pattern tracker will have one position that corresponds to a given frame. In a situation where the window comparison unit 908 determines that no centroids overlap/intersect any defined window ranges, these centroids are considered to be potentially new centroids corresponding to new beacons within the field of view and thus the window generation unit 904 defines and stores new additional search windows of the predetermined size, centered about the position of the new centroids at block 1124. New pattern trackers are also initialized as discussed above. Next, after either situation where a "1" has been added in a new tracker position or, one or more new search windows have been defined when there are one or more existing (previously defined) search windows, the window generation unit 904 queries the pattern tracking unit for any pattern tracks with no new "1"/(on indication) positions for that frame (this corresponds to no centroids within a previously defined window for that frame) at block 1126. In a situation where the pattern tracking unit determines that all patterns have additions for that frame, (i.e. no trackers without added state indications and thus no windows without centroid overlap/intersection), the pattern tracking unit determines if any pattern trackers are of sufficient length as described above and processed accordingly as also described above. However, in a situation wherein, the response to the query identifies pattern trackers with no new "1"/(on indication) positions for that frame, the pattern tracking unit sets a new position for each of the identified patterns to "0"/(off indication) before continuing to the threshold condition described above at block 1128.

The pattern compiling sub-module 902 of the pattern detection module 626 outputs pattern sequences of a sufficient length to the pattern comparison sub-module 900. The pattern comparison sub-module 900 comprises an ID server populated with pre-registered IDs associated with expected detectable patterns. The pattern comparison sub-module 900 receives the pattern sequences of sufficient length (full patterns) and looks up corresponding IDs associated with expected detectable patterns via a comparison of the full patterns and expected detectable patterns. The pattern comparison unit 600 then updates the associated data of a frame to include an ID when the frame included a centroid that completed a full pattern that was match with an expected pattern.

With the above described method, a system including one or more LED emitting beacons that are pre-programmed to trigger emittance according to a patterned emittance sequence, and one or more UV camera/sensors, and one or more programed processors executing computer readable instructions may detect a pattern of sequenced emittance associated with the beacons respectively by compiling the detectable patterns across multiple images and identifying the beacons based on the detection of the compiled detectable patterns.

At this point the system would have stored for each image frame, associated data comprising a timestamp of image capture, (x,y) image positions and (Θ,Φ) angular image positions of detected centroids within the frame, and beacon IDs corresponding to the centroids. Furthermore, the system may have also stored predetermined x and y offsets, $\Phi_{cam}$, $\Theta_{cam}$, and Roll in association with the particular weapon devices. Based on this collection of associated data, the system may continuously and automatically recalibrate the orientation modules of the system as descried below.

At the base station (remote) servers, the controller receives GPS based position data, RTCM data, orientation (pose) data, and a GPS associated timestamp from each microcontroller on the various devices (weapon devices, mobile beacons, and fiducial beacons) on every pulse of position modules of the devices respectively. The controller also receives associated data for each image frame, and weapon device ID from each weapon device. Furthermore, as a background step, the RTCM data of fiducial beacons is periodically used to apply an RTK corrections to the position devices of the mobile beacons and weapon devices where the period of RTK correction application is governed by the update rate of position modules (GPS) of the fiducial beacons. Furthermore, the base station comprises a weapon & beacon ID server which is preregistered with all weapon and beacon IDs. As the controller receives timestamp associated position and orientation data from the devices respectively, the data is stored in the weapon & beacon ID server to update and thus track the position and orientation of each device up to the most recent timestamp.

Figure 12:
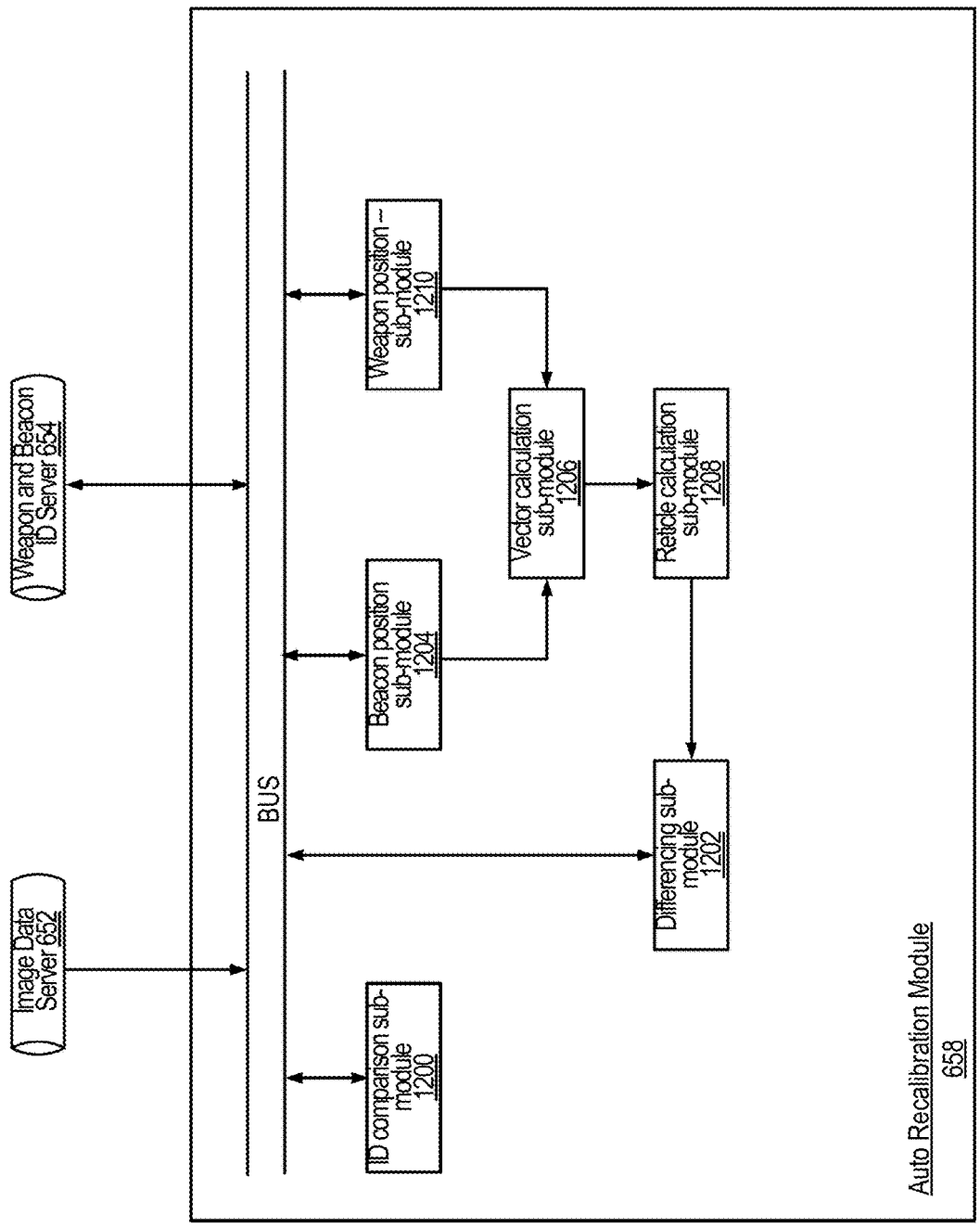
FIG. 12 illustrates an architecture of an auto-recalibration module according to some embodiments of the present invention.
Figure 13:
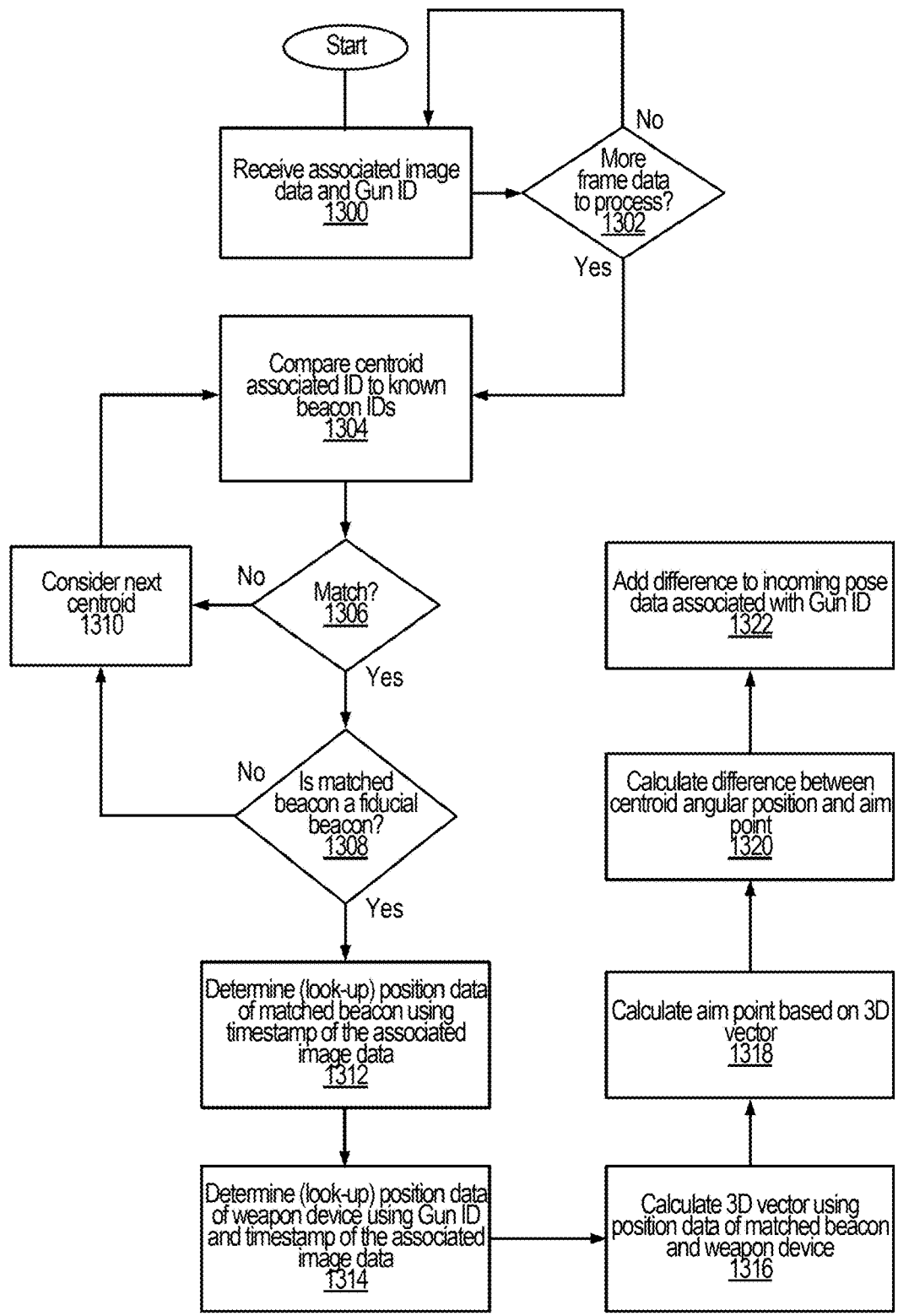
FIG. 13 is a flowchart of a process for performing auto-recalibration according to some embodiments of the present invention.

FIGS. 12 and 13 describe the auto-recalibration module 658 and a process of performing auto-recalibration. The auto-recalibration module 658 may include an ID comparison sub-module 1200, a differencing sub-module 1202, a beacon position sub-module 1204, a vector calculation sub-module 1206, a reticle calculation sub-module 1208, and a weapon position sub-module 1210. When associated image frame data, which includes one or more beacon IDs as determined by the pattern determination module 626, is received at the base station servers 606, the controller 646 stores the associated data in the image data server 652. The auto recalibration module 658 then receives the associated image frame data from the image data server and begins a process that recalibrates the orientation module of the weapon device 600 which captured the image frame.

The process includes the auto-recalibration module 658 receiving associated image frame data corresponding to an image frame, wherein the associated image frame data also includes a weapon device ID of the weapon device 600 that captured the image frame at block 1300. The weapon device 600 attaches it's preregistered ID to a data packet including an image frame and associated data when the weapon device 600 communicates the associated image frame data and image frame to the base station servers 606. After the auto-calibration module 658 receives the associated data, it determines if centroids are included in the associated data. In a situation where centroids are not included in the associated data, the—auto calibration module receives the next frame's associated image data at block 1308. In a situation wherein, centroids are within the associated image frame data, an ID comparison sub-module 1200 of the auto-calibration module 658 compares the IDs of the associated data with IDs of the known beacon IDs which have been preregistered in the weapon & beacon ID server 654 of the base station servers 606 at block 1304. After the comparison and determination of matches at block 1306, the comparison sub-module 1200 determines if the matched IDs are of fiducial beacons at block 1308. In a situation where the matched beacon is not a fiducial beacon, the comparison sub-module proceeds to compare the next centroid ID in the associated image data if there are more centroids to be considered at block 1310. If no more centroids are within the image frame data, the process starts over by receiving the next frame's associated image data. In a situation where the comparison module 1200 determines that the matched beacon is a fiducial beacon, the beacon's ID and timestamp of the associated image frame data are sent to the beacon position sub-module 1204. The beacon position sub-module 1204 determines the position data (GPS based position) of the matched beacon using the timestamp and the beacon ID to look up the position data for that beacon at that timestamp within the weapon and beacon ID server at block 1312. Furthermore, in a somewhat simultaneous manner, the weapon device's ID and timestamp of the associated image frame data are sent to the weapon position sub-module 1210 which determines the position data (GPS based position) and calibration module determined data (predetermined x and y offsets, $\Phi_{cam}$, $\Theta_{cam}$, and Roll) of the weapon device that captured the associated frame data of the matched beacon at block 1314. This determination may be made using the timestamp and the weapon device ID to look up the position data and calibration module determined data (predetermined x and y offsets, $\Phi_{cam}$, $\Theta_{cam}$, and Roll) for that weapon device at that timestamp within the weapon and beacon ID server 654. Next, the beacon position sub-module 1204 and the weapon device sub-module 1210 both comminute their respectively determined position data to the vector calculation sub-module 1206. The vector calculation sub module 1206 receives all ID associated data and executes computer readable instructions that calculate a heading, pitch and distance from the weapon device to the imaged beacon based on the position data at block 1316. The heading pitch and distance may be expressed as a 3-dimensional polar coordinate vector between the GPS based location of the matched beacon and the GPS based location of the weapon device that imaged the beacon. For example, the 3D vector may be defined by ($\Delta\rho$, $\theta_{GPS}$, $\Phi_{GPS}$) wherein, $$\Delta\rho = \text{Range}_{GPS}$$

as calculated above in Eqn.5 but now using the longitude and latitude values determined by the weapon position sub-module and the beacon position sub-module. The heading is calculated based on a ratio of the differences between the longitude values and latitude values of each position and is expressed as:

$$\Phi_{GPS} = \tan^{-1}\left(\frac{\text{long}_b - \text{long}_w}{\text{lat}_b - \text{lat}_w}\right). \quad \text{Eqn. 9}$$

It is noted that the angular coordinate system of the present invention sets 0° as directionally North and 90° as directionally West.

The pitch may be calculated based on a ratio of the altitude difference between each position (weapon and beacon) and a lateral range between each position which is expressed as:

$$\Theta_{GPS} = \tan^{-1}\left(\frac{(Alt_b - Alt_w)}{\sqrt{(\text{Range}_{GPS})^2 - (Alt_b - Alt_w)^2}}\right) \quad \text{Eqn. 10}$$

wherein the denominator may be considered a lateral range.

Next, the vector calculation module 1206 communicates the 3D vector to the reticle calculation sub-module 1208 which, using the predetermined x and y offsets, $\Phi_{cam}$, $\Theta_{cam}$, Roll, and $\Delta\rho$, determines a position of where in the image frame the weapon device is pointing based on the camera's calibration at block 1318. This determined pointing position in the image may be referred to as the aimpoint of the weapon device. The aimpoint may be determined by $$\Theta_{aimpoint} = \tan^{-1}\left(\frac{y_{offset}}{\Delta\rho}\right) - \Theta_{cam}, \text{ and} \quad \text{Eqn. 11}$$

$$\Phi_{aimpoint} = \tan^{-1}\left(\frac{x_{offset}}{\Delta\rho}\right) - \Phi_{cam}. \quad \text{Eqn. 12}$$

Next, the differencing sub-module 1202 receives the calculated aimpoint and the angular position ($\Theta_b, \Phi_b$) of the imaged beacon's centroid. The differencing sub-module 1202 determines the beacon's actual location ($\Theta'_b, \Phi'_b$) in the image frame by applying Eqn. 2 to the angular position. Next, the differencing sub-module 1202 determines the in-frame error between the aimpoint of the weapon device and the actual location of the beacon in the image at block 1320 by calculating an in-frame difference between the two points which is expressed by $$\Theta'_b - \Theta_{aimpoint} \text{ and } \Phi'_b - \Phi_{aimpoint}, \text{ wherein}$$

the in-frame error is used to adjust the GPS based heading and pitch calculated by Eqns. 9 and 10 to determine an expected heading and pitch. The expected heading and pitch may be provided by:

$$\Theta_{expected} = \Theta_{GPS} - (\Theta'_b - \Theta_{aimpoint}), \text{ and} \quad \text{Eqn. 13}$$

$$\Phi_{expected} = \Phi_{GPS} - (\Phi'_b - \Phi_{aimpoint}). \quad \text{Eqn. 14}$$

(ΔΦ,ΔΘ) between the weapon device's heading and pitch ($\Theta_{IMU}$ and $\Phi_{IMU}$), as reported by the orientation module at the timestamp of the associated image frame data, and the expected heading and pitch as determined in Eqn. 13 and 14, also at the same timestamp of the associated image frame data. The pose correction is then communicated to the weapon and beacon ID server 654, which applies the pose correction to subsequent orientation device pose data readouts for that weapon device. That is, the auto-recalibration sub-module 658 recalibrates the orientation device by adding the pose difference (pose correction) (ΔΦ,ΔΘ) to incoming and/or outgoing orientation data associated with the weapon device's ID at block 1322.

The description thus far has discussed the system's framework architecture, pre-calibration technique, UV image data capturing, image analysis, and the collection of data associated with each frame of captured image data. The following discussion will describe the virtual ballistic and fire simulation method. It is noted again here that a feature of the presently described system is to be able to capture image data in the UV spectrum, perform object detection (centroid/blob detection) on the captured image data, determine an identification (preregistered ID) associated with the detected centroid/blob, wherein the centroid/blob image position and the ID may be used to calculate and access position and orientation data associated with the centroid/blob at the time of image capturing. Furthermore, the system may access position and orientation data of the viewing device/user which captured the image of the centroid/blob, at the same timestamp, wherein the image data, relative positions, and relative orientations may be used in conjunction to apply a calibration correction to an orientation measuring device of the viewing device/user.

It is further noted that a similar but patentably distinct feature of the system is that the above process may also operate to execute a firing simulation that involves determining relative positions between a target and a shooter, determining a shooters orientation and aiming point; approximate a virtual ballistic/projectile in response to a detected trigger actuation, and determine a simulated path and impact of the virtual ballistic based on shooter orientation, flight time, wind, type of weapon, and intervening fiducial beacon type (if any intervening beacons are detected). Further description will now be given to the fire simulation module 660 and a process for performing a fire simulation in association with FIGS. 14 and 15. Fire simulation module 660 may include an ID comparison sub-module 1400, a beacon position sub-module 1402, a weapon position sub-module 1404, a differencing sub-module 1406, a beacon property server 1408, a reticle calculation sub-module 1410, and a ballistic constraints server 1412.

Before a firing simulation is executed by the system, it is assumed that the above described camera lens calibration and boresight calibration have been performed, and thus the weapon device and beacon ID server of the base station servers have stored therein, the calibration and predetermined offset data, as described above, in association with the weapon device IDs from which they are calculated for.

It is noted that in some operating examples the auto recalibration process described above may be performed before a fire simulation process is executed, wherein orientation data from the orientation modules used in the fire simulation process will be pre-adjusted based on the recalibration process as described above. In those embodiments, the fire simulation process may begin with the auto-recalibration step at block 1500. In some other operating examples recalibration may not be performed before the fire simulation process is executed and thus the orientation data used in the fire simulation process will be the raw orientation module measured orientation data.

In a situation where the controller 646 of the base station server(s) 606 detects a trigger pull event from a weapon device 600 at block 1502, the fire simulation module 660 may receive associated image frame data and the weapon device ID of the weapon device that communicated the trigger pull at block 1504. Next, an ID comparison sub-module 1400 of the fire simulation module 660 determines whether the data includes identified centroids at block 1506. In a situation where detected centroids are not within the associated image frame data, a weapon position sub-module 1404 of the fire simulation module 660, receives the position data and orientation data associated with the weapon device ID from the weapon and beacon ID server 654, and creates a heading window for the weapon device at block 1508. For example, the heading window may calculate a range of locations that fall within a 3-dimensional space defined by rotating the pitch and yaw of the weapon device a predetermined number of degrees, around each respective axis of rotation. The heading window is then communicated to an intersection determination sub-module, which compares known weapon device and beacon positions, at the timestamp of trigger pull, to the range of locations of the heading window at block 1510. In a situation where location overlap/intersections are determined, the intersection determination sub-module uses the IDs of the intersecting beacons and a pre-registered LUT to evaluate a hit or a miss situation. For example, if intersections with one or more beacons are determined, then a hit may be registered and weapon device IDs associated with the hit (shooter and/or hit target) may be informed at block 1512. If no intersections with any beacons (or no intersections with a target beacon) are determined, then a miss may be registered at block 1514.

In a situation where the ID comparison sub-module 1400 determines that there are detected centroids within the associated frame data, for each centroid, the ID comparison module 1400 compares each centroid ID to known beacon IDs at block 1516 and determines if the centroid is of a target (mobile) beacon at block 1518. If a centroid ID does not match known beacon IDs, the system may determine whether more centroids are present at block 1520. If there are no additional centroids present, the process may return to an auto-calibration step. If additional centroids are detected, the ID comparison sub-module 1400 may again compare each centroid ID to known beacon IDs at block 1516 and determine if the centroid is of a target (mobile) beacon at block 1518. For each detected target beacon (detected target centroid in the associated image frame data), the fire simulation module 660 calculates a range between the weapon device that actuated the trigger pull and target beacon according to Eqn. 5 at block 1522. Next, the weapon position sub-module 1404 uses the range, calibration rotation offsets, and x& y offsets to determine the aimpoint of the weapon device ($\Theta_r, \Phi_r$) as in Eqns. 11 and 12 at block 1524, while the beacon position sub-module 1402 determines a corrected angular position of a centroid ($\Theta_b, \Phi_b$) within the image using Eqn. 2 the calibration determined roll. Subsequently, a first coordinate frame, referred to as the shooter-North (SN) frame, defined by the weapon device and target beacon is established where, using the orientation module defined pointing direction of the weapon device and an offset distance according to centroid and aimpoint image positions, a position of the beacon in the first coordinate frame may be determined by the fire simulation module at block 1526. That is, within the SN frame, the weapon device is considered to be the origin with a pointing direction defined by the orientation module's reading of yaw and pitch ($\Phi_r$ and $\Theta_r$ respectively). Furthermore, the yaw (heading) and pitch may be adjusted respectively by the imaged offset determined by the difference between the centroid angular position in the image with respect to the aimpoint of the weapon device calculated in the image such that the centroid's (beacon's) location in the SN frame may be expressed as:

$$\rho_{SN} = \Delta\rho$$

$$\Phi_{SN} = \Phi_{IMU} + (\Phi_b - \Phi_r), \text{ and}$$

$$\Theta_{SN} = \Theta_{IMU} + (\Theta_b - \Theta_r) \text{ wherein}$$

$\rho_{SN}$ is the distance between the weapon device and the target beacon.

Next, the fire simulation module 660 rotates the coordinate frame such that the position of the target beacon is straight forward with respect to the weapon device. This rotated coordinate frame may be referred to the shooter-target frame (ST frame). In the ST frame, the location of the target beacon determined at block 1528 as:

$$\rho_{ST} = \rho_{SN},$$

$$\Phi_{ST} = 0°,$$

since the target beacon is straight forward with respect to the weapon device, and $$\Theta_{ST} = \Theta_{IMU} + (\Theta_b - \Theta_r).$$

These angular coordinates are then transformed into Cartesian coordinates ($x_{ST}$, $Y_{ST}$, $z_{ST}$) wherein, $z_{ST}$ is the beacon's z plane/position or depth with respect to the weapon device and will be utilized by the ballistic sub-module described below in a time of projectile flight determination. The fire simulation module 660 also determines where the weapon device is pointing, within the ST frame, at block 1530 based on the weapon device's orientation module readings and imaged offset determined by the difference between the centroid angular position in the image with respect to the aimpoint of the weapon device calculated in the image, wherein. The weapon device's orientation in the ST frame may be expressed as:

$$\Theta_{IMU,ST} = \Theta_{IMU}$$

$$\Phi_{IMU,ST} = (\Phi_b - \Phi_r) - \Phi_{IMU}, \text{ and}$$

$$\omega_{IMU,ST} = \omega_{IMU}, \text{ wherein,}$$

$\Theta_{IMU}$ is the measured pitch of the weapon device's orientation module, $\Phi_{IMU}$ is the measured yaw of the weapon device's orientation module, and $\omega_{IMU}$ is the measured roll of the weapon device's orientation module.

In an alternative embodiment, in the above step, the heading of the weapon device is defined by the difference between a GPS based heading and the orientation module measured heading instead of using image data. That is, Eqn. 9 may replace the "$(\Phi_b-\Phi_r)$" in the above position expression.

Next, a ballistic sub-module of the fire simulation module 660 receives $z_{ST}$, $\Theta_{IMU,ST}$, $\Phi_{IMU,ST}$, gravitational constant (G), a muzzle speed $v_o$ which was pre-registered with the type of weapon device and stored in the weapon & beacon ID server 654, and further receives ballistic related constants from a ballistic constants server 1412. Then the ballistic sub-module operates to determine a time of flight $\Delta t$ at block 1132 based on the beacon depth $z_{ST}$ and the pointing direction of the weapon defined by ($\Theta_{IMU}$, and $\Phi_{IMU}$), which may be expressed as:

$$\Delta t = \frac{z_{ST}}{v_o \cos(\theta_{IMU,ST})\cos(\Phi_{IMU,ST})}, \qquad \text{Eqn. 15}$$

which is how long it takes the a virtually fired projectile to travel to a point in space wherein the point is the beacon's depth from the weapon device.

Finally, the ballistic sub-module determines a hit position, defined by ($x_{hit}$, $y_{hit}$, $z_{hit}$), based on the time of flight, weapon device pointing direction in the second (ST) frame, wind measurements, and known empirically determined ballistic related constants at block 1534. The hit position is the location of the virtual ballistic projectile at $\Delta t$ seconds after the trigger pull. The hit position may be expressed as:

$$x_{hit} = \Delta t \times [v_o \cos(\theta_{IMU,ST})\sin(\Phi_{IMU,ST}) + \qquad \text{Eqn. 16}$$
$$V_{wind}v_o\cos(\Phi_{IMU,ST})\sin(\Phi_{wind})(.08\Delta t^2 + .009\Delta t - .008)]$$

$$y_{hit} = \Delta t \times [v_o\cos(\theta_{IMU,ST}) + .5G\Delta t] \qquad \text{Eqn. 17}$$

$$z_{hit} = \Delta t \times [v_o\cos(\theta_{IMU,ST})\cos(\Phi_{IMU,ST}) + \qquad \text{Eqn. 18}$$
$$V_{wind}v_o\sin(\Phi_{IMU,ST})\sin(\Phi_{wind})(.08\Delta t^2 + .009\Delta t - .008)],$$

wherein $V_{wind}$ is the measured velocity of wind in the relative environment as measured via an anemometer, and $\Phi_{wind}$ is the angle of the wind with respect to the virtual projectile direction of straight travel The intersection determination sub-module receives the beacon 3D location as defined in the first coordinate frame ($x_{ST}$, $Y_{ST}$, $Z_{ST}$) and creates a target region by adding a predetermined value to one or more of each of the position coordinates, wherein the adding of the values extends a shape from the one 3D position. The intersection sub-module also receives the hit position and determines a virtual hit or miss based on the comparison and intersection of the coordinates of the hit position and the coordinate ranges defined by the target region at block 1536.

In an alternative embodiment, a situation may occur where no beacon is detected in the image frame at the time of trigger pull. Before the step of determining a heading window that is then communicated to the intersection determination sub-module, the intersection determination sub-module may compare known weapon device and beacon positions, at the timestamp of trigger pull, to the range of locations of the heading window. The heading window may be narrowed down before hit or miss evaluation. The fire simulation module 660 may determine a subset of beacon locations with a "hit-able" orientation and range with respect to the weapon device by calculating a GPS based location of beacons that may potentially be hit in a projected frame of reference that is straight ahead of the weapon device pointing direction, wherein the GPS based location utilizes GPS reported longitude, latitude, and altitude for the weapon device and targets. In this embodiment, the location of all known beacons may be expressed in the shooter-target frame as:

$$x_{ST} = 0$$
$$y_{ST} = A_{T-A_S}, \text{ and}$$
$$z_{ST} = \sqrt{(\text{Range}_{GPS}(T, S))^2 - (Alt_T - Alt_b)^2},$$

wherein
A is the altitude as described above and in light of the above Eqn. 5 description, T and S here are analogous to b and s. That is, for this part of the description and others, target is analogous to beacon and shooter is analogues to weapon device. Furthermore, in this embodiment, the pointing direction of the weapon device in the ST frame may also be expressed based on GPS as discussed above, referencing replacing "$(\Phi_b - \Phi_r)$" with Eqn. 9. A time of flight and hit position can then similarly be determined as above.

Now with reference to the pre-registered LUT to evaluate a hit or a miss situation. In many operating examples of the present invention, beacons may be fixed to various kinds of objects in the environment. Another feature of the presently described systems allows object information and/or structural properties to be stored in association with particular beacons and thus the intersection determination module may access beacon properties when evaluating intersections, such as but not limited to penetrability, size, density, thickness, explosiveness, and other types of reactability. Furthermore, the weapon devices may also be preregistered ballistic properties such as, and not limited to impact force, bullet type, and other weapon and bullet properties that have varying affects with respect to a type of target impacted with. The intersection determination unit may also determine a time of flight to each imaged beacon and evaluate "less than" "greater than" comparative arguments between the time of flights to determine a hit order (i.e. closer or farther in proximity to each other and the virtual projectile) if two or more beacons (or a structure of associated with a beacon as determined by a property look up) are in a same pointing direction.

An example is given here wherein distinct beacons may be fixed to objects and targets. The hit/miss evaluations are made using a property of the fixed to objects and relative proximity of the objects with respect to a fired virtual projectile.

Table 1 illustrates some non-liming possible exemplary outcomes after the intersection determination unit determines intersections/overlap of a virtual projectile position with both the fiducial beacon positions and target beacon position.

TABLE 1

| Target | Wall | Wall Type | Closer to Shooter | Result |
|--------|------|-----------|-------------------|--------|
| Hit | Hit | Permeable | Target | Kill |
| Hit | Hit | Permeable | Wall | Kill through Wall |
| Hit | Hit | Impermeable | Target | Kill |
| Hit | Hit | Impermeable | Wall | Bullet in Wall |
| Hit | Miss | Permeable | Target | Kill |
| Hit | Miss | Permeable | Wall | Kill |
| Hit | Miss | Impermeable | Target | Kill |
| Hit | Miss | Impermeable | Wall | Kill |
| Miss | Hit | Permeable | Target | Punctured Wall |
| Miss | Hit | Permeable | Wall | Punctured Wall |
| Miss | Hit | Impermeable | Target | Bullet in Wall |
| Miss | Hit | Impermeable | Wall | Bullet in Wall |

TABLE 1-continued

| Target | Wall | Wall Type | Closer to Shooter | Result |
|--------|------|-----------|-------------------|--------|
| Miss | Miss | Permeable | Target | Miss |
| Miss | Miss | Permeable | Wall | Miss |
| Miss | Miss | Impermeable | Target | Miss |
| Miss | Miss | Impermeable | Wall | Miss |

UV Beaconing Bidirectional Handshaking

In the implementation of the combat simulation systems described above, communications between the weapon and the target/mobile beacons is unidirectional, with the optical sensing array of the weapon only receiving the signal from the emitter of the mobile beacon. In some embodiments, an emitter device may be added to the weapon device that provides a bidirectional path (imaging and/or sensing in both directions) between the weapon device and the mobile beacon. The bi-directional channel may be direct or indirect. For example, a direct bi-directional channel may enable a weapon device to communicate a signal directly to a target beacon. Oftentimes, direct handshaking may be performed using an optical channel and/or RF channel. In other embodiments, indirect handshaking is performed. In such systems, the base station server is in communication with both the weapon device and the target device. The base station server then knows where each entity is and may pass relevant information to each entity.

In some embodiments, such communications channels may be used to inform a target that a hit has been registered. For example, in simple systems in which no base station server is used, there may still be a need to inform a target (such as a user wearing a mobile beacon) that the target has been hit. In such embodiments, the weapon device may perform all of the ballistic outcome calculations based on analysis of the captured image frames, orientation, and position information. Upon calculating the ballistic outcome, the weapon device may communicate the outcome to the mobile beacon and/or other device worn by the target. The outcome may include hit/health data of the target as of the time of the hit. In some embodiments, the communications channel may be used to communicate other information, such as a location, movement, intent, etc. of the shooter. In some embodiments, the additional communications channel may be used to send video/pictures and/or other higher bandwidth data. For example, the weapon device may communicate a picture and/or video of the moment of the hit or kill. This image may be sent to the target beacon (or other device of the target user), so that the target gets contextual information about the shot. For example, the target may be able to view to image to identify where the shooter was and what the shooter was able to see when the shot was fired.

In some embodiments, the use of bi-directional communications channels may also be useful to further increase the accuracy and precision of aimpoint determinations. For example, optical frequency image data received from a first weapon device may contain an imaged LED pattern of a second weapon device and be processed to obtain and update orientation data of a second device when the second device system is in line of sight of the first weapon device. Furthermore, simultaneously, optical frequency image data received from the second weapon device may contain an imaged LED pattern of the first weapon device and be processed by the programmed processor to obtain and update orientation data of the first weapon device when the first weapon system is also in a line of sight of the second weapon device. By using pattern offsets, comparative azimuth and elevation drift may be determined.

In most instances, each weapon device will see multiple targets and/or other beacons at one time. For example, when the weapon device is aimed at a single target (mobile beacon), the field of the view of the weapon device will also capture signals from multiple fiducial beacons (and possibly other nearby mobile beacons). By incorporating a secondary communications channel into the weapon device, all of the data from the weapon device may be passed to one or more other devices, such as the base station servers. The additional data transmitted by the weapon device may be useful the system and/or operators of the training system for understanding what is going on in a battlefield. This gives the scoring authority a more complete real-time picture of the battlefield and various shooting events.

Additionally, the secondary communications channel may be used to communicate with visibly obscured targets. For example, if a target beacon moves indoors and/or behind an object, the secondary communications channel (depending on the communication protocol of the secondary communications channel) may still communicate data, such as ballistic outcome data, to the obscured target.

In a particular embodiment, the weapon device may be outfitted with an avalanche photodiode (APD). The use of an APD (which may operate in the UV spectrum, IR spectrum, visible spectrum, etc.) or similar sensor enables a significantly higher frame rate to be achievable. For example, rather than sampling at 50-60 frames per second such as when using a camera, the APD may sample at high frequencies that are up to millions of frames per second, as the APD can modulate at MHz range, rather than Hz. This enables the APD to push broadband data to external devices, which enables any kind of information may be transmitted between points very quickly using the APD. For example, rather than just sending simple data, such as hit or miss (ballistic outcome) information, higher bandwidth data (such as high resolution image data (e.g., views of kill shots) may be sent to external devices in near real-time. In some embodiments, the APD and the optical sensing array of the weapon device may operate on completely separate optical paths. In other embodiments, the APD and the optical sensing array may share an optical path. For example, a beam splitter and/or spinner wheel may be used to enable the APD and optical sensor array to operate using a single optical path.

Call and Response Bidirectional Sector Beaconing

In some embodiments, the various beacons (mobile and/or fiducial) may include multiple sectors in the emitter. For example, the beacon may be capable of directional emittance of a particular pulse-coded signal. This enables the beacon to shut down or reduce intensity in some or all directions when the beacon is not being used. In particular, the base station servers may only turn on emitters in direction from which the beacon is being viewed. This may be determined based on weapon aimpoint data, orientation data, and/or locations of weapon devices and/or mobile targets. Based on such information, the base station servers understand whether any users/weapon devices can see each beacon and may adjust the power and/or directionality of a beacon accordingly. Additionally, the base station servers may adjust power and/or directionality based on time of day, light settings, etc. For example, in low light situations such as at night, cloudy days, during storms, etc., the power may be dialed down on some or all beacons as there is less UV light from the sun that may wash out beacon signals. Such features may be particularly useful to conserve beacon power. Additionally, the use of directional beacons may be used to help minimize reflections when certain known conditions exist (presence of reflective material, such as glass, shiny metal, water, etc.).

The exemplary system may further use the base station servers to trigger particular UV LEDs within the volume space. Using contextual position information of the one or more objects and/or users, (utilizing at least GPS data, IMU data, and magnetometer data), within the volume space, the base station servers may determine relative locations and UV LEDs in a relevant direction, line of sight, and/or proximity, of a given user, to activate for potential acquisition. Detection of the particular LED may also be utilized for identification information. Embodiments may include various UV LED emitter arrangements (arrays) in which the arrangements may include up to omnidirectional emittance, for example, and without limitation, a ring of beacons wherein, only a subset of directions may be triggered based on the determined relative locations. Another embodiment may involve sequencing the triggering of an emitter arrangement. In other embodiments, via link margin control, contextual information may be utilized to dial up or dial down power of LED emittance.

Figure 16:
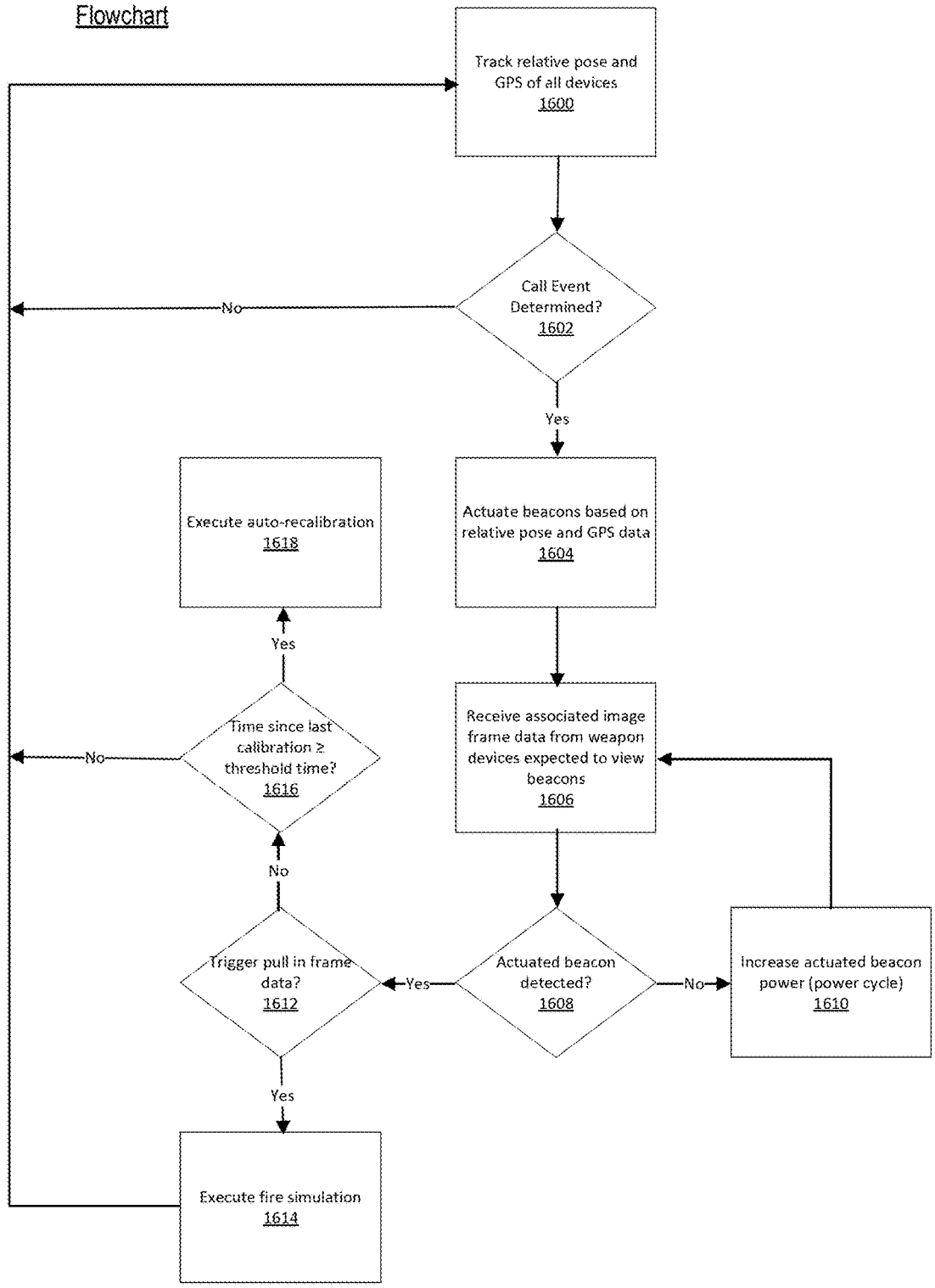
FIG. 16 is a flowchart of a process for performing call and response beaconing according to some embodiments of the present invention.

FIG. 16 is a flowchart of a process of call and response beaconing according to one embodiment of the present invention. At block 1600 the base station server may track a relative pose and location of all devices within a training simulation. At block 1602, a determination is made whether a call event has been received from one or more weapon devices. If no call event was received, the process returns to the start. If a call event was received, the base station servers may activate a subset of the beacons based on the relative pose and location data of the known devices at block 1604. At block 1606, the base station servers may receive associated image frame data from weapon devices that are expected to view the beacons. These weapon devices may be identified based on the pose and location information, which may indicate what the field of view of each weapon device is expected to be. The base station servers may then determine whether the actuated beacons are detected within the associated image frame data of the expected weapon devices at block 1608. If the beacons were not detected in the associated image frame data of one or more of the weapon devices, the base station servers my increase the power (at least in the direction of the expected weapon devices) of the actuated beacons at block 1610. If the actuated beacons were detected in the associated image frame data, the base station servers may detect whether there was a trigger pull in the frame data at block 1612. If a trigger was detected, a fire simulation (such as described in accordance with FIGS. 14 and 15) may be performed at block 1614. If no trigger pull was detected, the base station servers may determine whether a time since a last calibration has exceeded a threshold time at block 1616. If yes, the auto-recalibration process may be performed at block 1618. If the time since a last calibration is less than the threshold time, the process may return to the beginning and continue to track the relative pose and location of all beacons and weapon devices in the training simulation.

ID Beaconing

The combat simulation systems described herein may convey detectable identification information utilizing one or more the multiplicity of UV LEDs within various beacons. For example, a spatial pattern arrangement, particular location within the environment, and/or an emitter being in response to a call may be associated with identification information. As shown in the system architecture, the base station servers may include a controller that coordinates receiving and sending data between the components of the base station and the microcontroller of each weapon device and beacon. In some embodiments, the controller may be programmed to send a command signal, via the wireless network, to the microcontrollers of all or a particular subset of beacons and weapons at differing predetermined times. Furthermore, a given command signal (message) may contain particular bit data that instructs only a subset of the device microcontrollers to activate based on sections of the command signal. In some examples, the controller is programmed to create and send messages to the microcontrollers that contain instructions for a subset (one or more) beacons to emit, the ID of the one or more beacons, and at a same time, instructions for UV cameras of one or more weapon devices to capture image frame data. The microcontrollers of each identified weapon device may then report back the ID(s) with the associated image frame data.

Oftentimes, in small, less complex training setups, such as those that operate without the use of any base station servers, the beacons may be programmed to emit pulse coded signals that contain larger amounts of information, as this may be the only way for the weapon devices to receive or access such information. For example, the pulse-coded signals may include an identifier of the beacon, location and/or pose data for the beacon, a timestamp, object information (such as geometry, materials, effect on ballistics, etc.) and/or other information that may be used by a weapon device to calculate a ballistic outcome involving one or more target/mobile beacons and/or one or more fiducial beacons.

As detailed above, in more complex training setups, one or more basestation servers may often be used to perform the various ballistic outcome calculations. In such embodiments, due to the large amount of data being communicated and processed during a combat simulation, it is often advantageous to have the pulse-coded signals contain as little information as possible to free up bandwidth and processing power for other functions. In such embodiments, the beacons may be programmed to only emit a device identifier (or other small forms of data, such as timestamps), with the base station servers being able to look up and/or otherwise retrieve additional information such as location and/or pose data for the beacon, a timestamp, object information (such as geometry, materials, effect on ballistics, etc.) and/or other information that has been previously stored and/or may be accessed on demand by the base station servers. For example, based on a beacon identifier (centroid) that is detected within a given image frame from a weapon device, the base station may look up and/or otherwise determine additional data related to the identified beacon.

In some embodiments, identification information may be encoded temporally, where a system clock syncing or other timing of various subsets of UV LED triggering is associated with the identification information. For example, the microcontroller of each beacon may be coded to actuate LED emittance at separate and distinct periodic times where beacon IDing would include detecting the presence of a beacon (centroid) in a captured image and querying the weapon & beacon ID server using the timestamp of the captured image, to determine the ID associated with a beacon that was scheduled to be emitting at that time.

In some embodiments, the beacons may be programmed to send out different data at different times. For example, each beacon may typically emit a signal that includes only the device identifier, with a more detailed signal being sent out once on a predefined schedule, such as once every X pulses or once per a set period of time (such as once every minute). The more detailed signal may include data such as location and/or pose information and the like. In some embodiments, the sending of the more detailed signal may be based on one or more factors. For example, beacons that have changed status (such as moving beacons) may transmit information such as location and/or movement data more frequently, while stationary beacons emit location information less frequently, as there is no change in status of the beacon. In other embodiments, as noted above, the beacons may be instructed to pulse a signal when the base station servers have determined that the beacon is within the field of view of one or more weapon devices.

In some embodiments, the beacons may be programmed to pulse a steady state pulse code (such as all 0s) most of the time, with a periodic pulsing of a device identifier. When a weapon device captures the device identifier pulse, the weapon device and/or base station servers may continue tracking the beacon without the beacon sending its ID over and over as long as the status of the beacon has not changed. For example, if the identified beacon has remained stationary, the weapon device and/or base station servers may determine that the beacon detected in a same location is the same as the previously identified beacon.

In some embodiments, the beacons within a training simulation may be asynchronous, with each beacon pulsing at its own time/rate. In other embodiments, some or all of the beacons may be programmed to pulse in synch or in parallel with one another. In yet other embodiments, the base station servers may control when given beacons pulse, such as based on time of day, proximity of weapon devices, light/environmental conditions, etc.

Continuous Pose Detection and Calibration Via Multiple Beacon Imaging

In some embodiments, the weapon devices and/or base station servers may be further configured to be always looking for beacon emittance for orientation module updating/calibration. For example, the weapon devices and/or base station servers may continuously, or at a predetermined intervals, communicate captured frames, position data, orientation data, and/or line of sight of the multiplicity of weapon devices and users. One or more emitters with known location in a particular line of sight may be triggered based on the communicated data as described above. For example, once the location and orientation of a particular weapon device is known, the base station servers may identify one or more beacons that may be visible to the weapon device and send commands that cause the beacons to pulse a particular signal. When one or more of the triggered beacons is detected in the captured frames from a weapon device, the orientation module of the weapon device and/or user is updated. For example, the weapon device may capture image frames that include pulses (centroids) from multiple beacons. Based on a signature within each pulse, the base station server may identify which beacons are visible within the image frames and use this identification information may look up location data of each beacon. In some embodiments, rather than looking up the location data, the beacon pulses may include such information.

The base station server may compare the known locations of each of the beacons with pixel locations within each of the image frames. Based on this comparison of pixel locations and known beacon location, the base station servers may determine an orientation (in both azimuth and elevation) of the weapon device, which may be used to update the orientation module of the weapon device and/or user (target beacon).

Additional information, such as knowledge of the terrain, size of the user, etc. may be used to provide further context regarding a pose of the individual. In particular, such information may be compared with the centroids in the image frames to determine whether the user is standing, kneeling, laying down, etc. For example, the positions of the centroids may be higher or lower in the image frames based on the pose of the user. In some embodiments, to supplement terrain knowledge and user size data, additional information may be included. As just one example, the IMU worn by a user or on the weapon device may include a height sensor that may provide context about the pose (standing, sitting, kneeling, etc.) of the user. In some embodiments, the user may wear additional pose sensors, such as separate beacons on one or more body parts of the user that enable the base station servers to more accurately determine the pose of a user.

Knowing the height/pose of a particular user may be particularly useful when determining ballistic results. For example, by knowing a general pose of each trainee/user, the base station servers may more accurately calculate hit/miss determinations and the impact of such outcomes. For example, a shooter may sight onto another user's torso. The image frame data from the shooter's weapon device may capture a beacon signal from the other user's helmet, which may be slightly off-center of the image frame, as the shooter is aiming at the torso rather than the helmet. The base station server may take the other user's pose information (determined in a manner similar to that above) into account to determine whether the shooter's aimpoint is actually intersecting a position of the other user. As just one example, for a standing target, the shooter may aim slightly below the beacon (if the beacon is affixed to a helmet). If the base station server knows the target is standing, the base station servers will determine an intersection of the aimpoint and the target. However, if the target is laying down, to hit the target's torso, the shooter may need to aim laterally away from the beacon, rather than vertically down from the beacon. In this manner, pose data may be particular useful for determining hit/miss outcomes, as well as the impact of such outcomes (kill, injure, etc.).

Beacon Activation Confirmation

In some instances, beacons may become inoperable due to device malfunction and/or human intervention. In some embodiments, to provide feedback to users and or other entities of the combat training system, the weapon devices and/or other beacons may include one or more inward facing detection channels. For example, a detection channel may be affixed to a beacon and/or weapon that points toward optical emitters of the particular device. The detection channel may detect any emission from the optical emitters. A processor on the device and/or the base station servers may detect when an emittance was triggered and whether the detection channel detected the expected emittance. If no emittance was detected, or a reduced signal was detected, the device may determine that the emitter is at least partially blocked and/or is otherwise malfunctioning and may report such information to the user (such as via a wearable device) and/or the base station servers (which may alert the simulation operators). This may help prevent instances where a trainee tampers with an emitter on his equipment so as to appear invisible to the optical sensing array of another trainee. Additionally, it will ensure that the equipment is functioning properly, even in the event that no tampering has occurred.

In a particular embodiment, the detection channel may include a photodetector that is aimed at the emitter and that detects a return light level from the emitter. The photodetector, such as a phototransistor or photodiode, may be set at the same aperture as emitter, which may enable the photodetector to precisely determine whether any signal is failing to be emitted as optical light, as a processor that controls the photodetector may be preprogrammed with knowledge of the intensity of light to be emitted as a particular signal from the emitter device. If the photodetector sees the full signal, the device may determine that the emitter is fully functional. However, if the photodetector sees no light or sees light scattered back at high level, the device may know that something is blocking the emitter and/or the emitter is not functioning properly.

In some embodiments, the use of a photodetector as a detection channel may serve additional purposes. For example, the photodetector may serve as a safety mechanism. The photodetector may detect the presence of a person in front of the emitter of the weapon device and/or beacon, such as by detecting a reduction in light received, the photodetector may reduce the emitter power. This ensures that high doses of light, particularly UV light, are not emitted directly onto a nearby person.

In another embodiment, the detection channel may include an arrangement of one or more fiber optic cables. The fiber optic arrangement may be fixed to the weapon device and/or internal to the beacon of the user. The fiber optic arrangement may be in operable communication with the UV sensor array for activation detection. The fiber optic channel may be configured to be directed at one or more locations of intended beacon emittance. The one or more programmed processors may then verify that the fiber optic channel was triggered when an emittance from a user was triggered but not detected by any other weapon systems to determine whether the emitter was functioning as intended.

UV Glint/Noise Attenuation

While the optical systems utilized in the combat simulation systems described herein are out of band with other equipment, there still may be some level of interference and/or noise attenuation when using UV emitters/receivers. Thus, there is a need to be able to distinguish between actual signals and noise. For example, sunlight (direct or reflected off of shiny surface like a bumper or glass (glint)) may appear to be LEDs with respect to the UV sensors and thus create noise within the system. When detected, glint can be considered a false positive detection. Additionally, multipath signals, such as those caused by reflections of actual signals, may create noise in the system.

To address environmental interference, such as UV light from the sun, the most basic approach is to distinguish between steady state light (sun) and pulse modulated sources. For example, as detailed above, the beacons of the combat simulation systems are pulse-coded with a particular signature that identifies the beacons. Outside sources, such as the sun, have no pulse modulation in signal, so any such signals detected by one of the optical sensor arrays of a weapon device can be ignored. However, in some embodiments a beacon and/or optical sensing array may be overwhelmed by a steady state signal, which could degrade the signal to noise ratio and render the sensing array useless. For example, high intensities of sunlight at particular angles may essentially wash out the image frames and prevent the optical sensing arrays from being able to distinguish pulse coded signals (centroids) from sunlight. This problem may be addressed by using sensing arrays with wider dynamic range to fix any optical overload conditions.

In the event of detecting a reflection of a pulse-coded beacon, the optical sensing array will detect multiple signals having the same pulse-code. In such situations, a processor of the weapon device and/or a base station server may determine the signal strength and/or intensity of each mirrored signal. Based on this determination, the processor of the weapon device and/or a base station server may identify which signal is the original signal and which signals are reflections and should be ignored. For example, the reflected signals will have lower signal strength and/or intensities than the original signal on its direct path from the emitter. Thus, the processor of the weapon device and/or a base station server may ignore all signals except that which has the strongest signal/intensity. Reflection is at lower signal level, so if see same pulse signal multiple times, use the strongest signal strength, this is direct path.

Similarly, some embodiments may filter out reflected signals based on known signal strengths. For example, the weapon device and/or a base station server may be programmed to expect a predetermined pattern of brightness variation for a given beacon. Based on the expected brightness, the weapon device and/or a base station server may be able to determine whether a signal (centroid) found within one of the image frames is authentic or a reflection of an authentic signal. For example, the brightness of a given beacon may be modulated over time and thus detected over multiple image frames. The modulation may allow the weapon device and/or a base station server to identify each beacon with respect the expected brightness level, with reflections (or environmental sources of UV light) having different brightness levels.

In some situations, a direct signal path may be blocked while a reflected signal gets detected by an optical sensing array. One solution to such a situation is to utilize location information associated with one or more beacons that should be viewable to a particular weapon device. As explained above, the location and orientation of a weapon device may be used to identify one or more beacons that may be visible to the weapon device. The base station servers may be configured to execute the UV detection algorithm in one or more regions of interest (ROIs) of an imaged frame. The ROIs may be determined based on a pointing direction of the UV sensor (pose) and the relative position data (GNSS) of the UV sensor and the intended/known position of a target/beacon. In other words, by knowing where a weapon device or user is, known data may be used to determine which beacons (fiducial or target) should be viewable. The base station sensors may then compare this information with the centroids in the image frame data to determine which signals are authentic (original) and/or reflections, and if only a reflection is present for a particular beacon, the actual location of the beacon emitting the reflected signal may be determined.

Stock Trigger to Initialize Action/Pose

The various training simulation systems described herein utilized a lot of data from weapon (captured image frames, location data, orientation data, etc.). This large amount of data leads to significant processing demands, which need to be performed in real-time or near real-time. Embodiments of the present invention may implement pre-processing schemes that help enable quicker decisions (ballistic outcomes) to be rendered. For example, the weapon device and/or base station servers may do pre-processing prior to detecting, and in anticipation of, a trigger pull. This may be particularly useful when a weapon device is pointed in a general direction of a number of closely clustered targets, which may necessitate a number of calculations that factor in variables such as canting, bullet drop, windage, motion of the target(s) and/or weapon device, etc. For example, in such situations, a single shot may involve determination the ballistic trajectory of a simulated shot, determining positions and expected positions of any number of possibly moving targets, and calculating any potential intersections. Some or all of these calculations may be performed prior to detecting, and in anticipation of, a trigger pull, such as determining estimated trajectories and/or expected positions of targets. Then, once a trigger pull is detected, fewer calculations may be performed to determine the ballistic outcome based on whether any intersections between the ballistic trajectory and positions of the targets occur at the time of the trigger pull (accounting for time for the bullet to travel to the intersection points). This enables the simulation systems to pre-process a subset of the information in order to more quickly and efficiently calculate ballistic outcomes in real-time.

One or more types of data may be used to help anticipate when a trigger pull may be imminent, and accordingly when to begin any pre-processing steps. For example, in some embodiments, the weapon device may include a photodetector and/or other proximity sensor that is able to determine when the scope of the weapon device has been brought up toward a user's eye. This may be indicative of the user preparing to aim and shoot the weapon. In some embodiments, one or more force sensors may be provided on the weapon device that indicate when the weapon device is in a firing position. For example, a button or other sensor may be provided on the butt of the weapon device (and/or other position on the stock) that is engaged or otherwise triggered when the weapon device is raised to the user's shoulder or otherwise maneuvered into a firing position.

In one particular embodiment, the butt of the weapon device may include a button that is depressed by the user's shoulder when the weapon device is in a firing position, which may cause a signal to be sent to a processor of the weapon device and/or the base station server to begin pre-processing data. In some embodiments other physical sensors may be included. For example, a sensor may be provided on or near the trigger of the weapon device that indicates when the user's finger is near the trigger. In some embodiments, the sensor may be a proximity sensor, while in other embodiments a force sensor (which may be integrated into the trigger device itself) may be used that detects contact between the user's finger and the trigger that is below a force level that actuates the trigger.

In some embodiments, sensor data from the weapon device may be used to anticipate a trigger event. For example, the orientation module of the weapon device may detect movement of the weapon device. In some embodiments, this movement may indicate that the weapon device has been maneuvered into a known firing position (such as the weapon being moved from a vertical orientation to a horizontal orientation). Upon such a determination, the weapon device and/or base station serves may begin pre-processing and/or wake up various devices (such as the optical sensor array).

In some embodiments, the anticipation of a trigger event may be based on whether any targets are visible to the weapon device. For example, if the user is aiming or otherwise panning the weapon device and one or more target beacons (centroids) are identified within one or more image frames of the weapon device, the weapon device and/or base station server may begin pre-processing data in anticipation of an imminent trigger pull.

Figure 17:
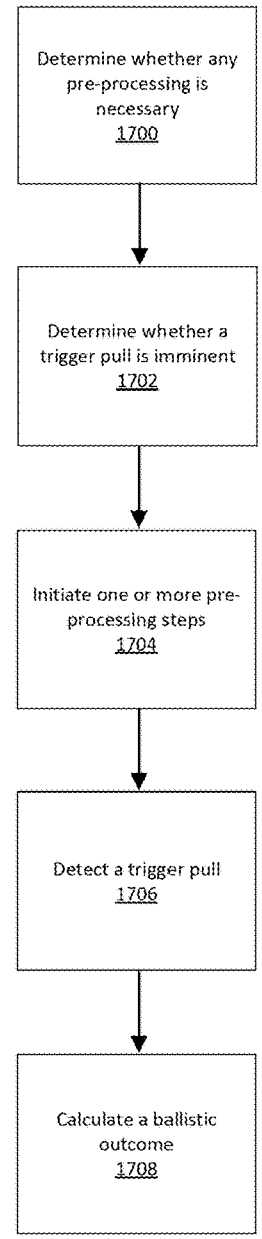
FIG. 17 is a flowchart of a process for performing pre-processing according to some embodiments of the present invention.

FIG. 17 is a flowchart of a process for pre-processing data according to embodiments of the present invention. The process may be performed by a weapon device and/or a base station server. The process may optionally begin at block 1700 by determining whether any pre-processing is necessary. This may include, for example, determining whether simulation conditions necessitate any pre-processing to ensure that ballistic outcomes may be calculated in real-time. For example, if a large number of weapon devices and/or targets are within firing range of one another the system may determine that pre-processing would be beneficial. In such cases where pre-processing is desirable, the process may include determining whether a trigger pull is imminent at block 1702. This determination may be based on signals from one or more weapon sensors (stock/butt/trigger/scope sensors), based on a movement of the weapon device into a firing position, and/or based on targets (centroids) being present in one or more image frames from the weapon device as described above. Once an imminent trigger event is detected, the weapon device and/or base station server may initiate one or more pre-processing functions at block 1704, such as (but not limited to) calculating expected positions and/or ballistic trajectories. The process may then involve detecting a trigger pull at block 1706 and performing final processing steps to calculate a ballistic outcome at block 1708.

Proximity and Activity Based Packet Uploading

The combat simulation systems described herein involve vast quantities of data being processed and communicated between the various devices. For example, some embodiments (as described in greater detail elsewhere herein) may use weapon devices that include a wide band sensor at a high frame rate and a high resolution camera system in UV and/or visible light. Such a setup may include upwards of 2000 high definition channels that are sampling simultaneously. With systems that use a large number of weapon devices, such processing and sampling rates may overwhelm the processing and/or communication systems. To help keep the systems running efficiently without introducing any unnecessary lag, the systems may incorporate any number of mechanisms that reduce processing and/or bandwidth demands. For example, the systems may synthesize radio updates to better understand which weapon devices, beacons, and/or users need to be pulled for a data update at a given time. In practice, the base station servers may track positions of each of the relative weapon devices, users, and/or other beacons. This may be supplemented by tracking movement supplied by the weapon devices, users, and/or other beacons, which may track movement, orientation, and various actions of the weapon devices, users, and/or other beacons. The base station servers may then utilize the tracked data and tracked positions to determine relative location of a given user and/or weapon device and further determine information of the relative surroundings. User and/or weapon data may be pulled for users and/or weapons based on one or more predetermined action events. For example, triggering action events may include, without limitation, position changes, orientation changes, location proximity, an elapsed time since a last trigger pull, a time of day (periodic), and/or other contextual signifiers. For example, an orientation change may signify a weapon has been raised and thus a weapon may be fired and thus data of the user and the weapon may be pulled since the data defining the user's surroundings is likely to be affected.

In essence, the base station servers monitor battlefield conditions to determine where processing power and bandwidth will be most likely to be needed and may activate various functionality in such areas, while dialing down processing and bandwidth usage in areas of lower activity. Embodiments may utilize probabilistic analysis to determine when to perform calculations to reducing processing/bandwidth loads to ensure that the system has sufficient processing power to handle any necessary calculations. For example, in situations where a large number of trainees are approaching one another, the base station servers may determine that there is a high likelihood of conflict. Such conflict will likely involve a large number of ballistic outcome calculations in a short period of time and may dial down transmission/sampling rates for weapon devices and/or beacons that are not near the potential conflict area. In some embodiments, some level of pre-processing (such as described elsewhere herein) may be performed for devices near the potential conflict area to reduce the demands once trigger pulls are detected.

As indicated above, to help reduce the processing demands various factors may be considered. In particular, the base station servers may determine what data is most relevant and facilitate the processing and/or transmission of such data. For example, the system may only cause transmission of image frames that show changes from one frame to the other (indicative of movement). Similarly, stationary beacons may be forced to emit signals with less frequency, as there have been no changes to the beacon status. Other factors that may be considered for reducing bandwidth/processing demands may include, without limitation, a lack of motion of the weapon device and/or beacon, time of day (less activity may be occurring within the middle of the night or hottest time of day, etc. so lower sampling rates are probably acceptable), whether a user is out of ammo (as aimpoints and attempted shots won't be scored if no ammo is loaded in the weapon), etc. In some embodiments, the system may include a table of conditions and corresponding sampling rates for the various conditions. The base station server may match current conditions (time of day, number of users, whether any firing positions are detected, etc.) to the table and adjust sampling rates one or more devices based on the current conditions.

Hybrid Sensing Array

In some embodiments, rather than just having an optical sensing array (such as one operating in the UV spectrum), each weapon device may include a hybrid sensing array that combines an optical sensing array (UV camera with normal video (pulse) rates) with at least one additional sensor that operates with high speed data rates. The additional sensor may be a single point sensor or may be a high resolution sensor with several megapixel resolution. Oftentimes, the optical sensing array and the additional sensor are heterogeneous, such as a sensor that operates on a different wavelength, such as visible light, monochrome light, IR, etc. In one particular embodiment, the additional sensor includes a high sensitivity photodiode array (such as an APD). In some embodiments, the optical sensing array and the APD may be used on a same optical path using a beam splitter for simultaneous transmission. In other embodiments, the APD and optical sensing array may be arranged in a field sequential manner, with a spinning filter wheel. In one particular embodiment, a field sequential arrangement may utilize a spinning filter wheel to sequentially switch between sampling in multiple wavelengths, such as UV, visible, IR in sequence, with only a subset (such as ⅓) of timing window being used for each sensor.

In some embodiments, rather than using an APD array, each weapon device may include a single APD that looks across entire image field. The APD may be used in conjunction with a diffusion disk and/or condensing lens, enabling the APD to look for everything within the field of view of the photodetector and/or within central region. When the APD is used for high speed data transfer, the aiming precision is not the same as the photodetector. Therefore, in such situations, the APD may be primarily utilized for contextual determinations (locations of fiducial beacons, etc.), while the more precise photodetector is used primarily for aimpoint determinations, which must be within the cm range of error. Such arrangements enable the wide angle APD to be utilized as a communications channel, which frees up the optical sensing array for just doing aimpoint targeting.

Hybrid FOV Detector

In some embodiments, a hybrid field of view (FOV) detection system may be implemented on each weapon device. Such hybrid FOV detection systems may operate using a narrow angle, super high resolution imaging sensor/array in combination with a lower resolution wide angle. The hybrid FOV detection systems therefore operate in a manner similar to the human eye, with the center of an image being clear, while the peripheral edges of a field of view are less sharp, but provide great contextual detail. This ensures that the targeting systems for the weapon devices have sufficient pixels on a potential target through the sighting system for aiming precision, while having sufficient wide angle imaging to help determine where the weapon device is and where the weapon device is pointing based on contextual information from fiducial beacons in the field of view surrounding the target. For example, the optical imaging sensor may include a narrow angle (telephoto/long focus) lens that is used for aimpoint determination with more pixels. A high speed wide angle sensor, such as an APD, may be used to monitor fiducial beacons present within the field of view of the weapon device to help the base station servers determine the location and/or orientation of the weapon device. By using a lower resolution wide angle sensor, fewer pixels/data points are sampled, which enables higher transmission rates.

A simple conventional telephoto system consists of 1) a front lens, light converging, element (or group of elements) that have a positive focus (singularly or as a group) and 2) a rear lens, light diverging, element (or group of elements) that have a negative focus. In the simple conventional system, the front lens element receives light rays from the environment and converges the light rays thereby producing a short focal length, wide FOV depicting set of light rays. The converging light rays are then received by the rear lens element wherein the rear lens element diverges the converging light rays thereby producing a long focal length, narrow FOV depicting set of light rays.

It will be appreciated that numerous permutations of hybrid FOV detection arrangements are possible. Some embodiments may combinable different imaging detectors and/or emitters internally (such as by using a beam splitter) or externally (using a multiplicity of sensors and channels, each with different attribute), and/or may be combined in focal plane array. FIGS. 18A-18D illustrate a few possible non-limiting arrangements. For example, FIG. 18A includes a wide field of view detector 1800 such as a visible sensor 1802 with a short focal length lens 1802. The visible sensor 1800 may be a broadband monochromatic sensor which has sensitivity in visible, near IR, and/or near UV ranges. The detector 1800 may be modified by putting a filter in front of the sensor 1800, such as a near IR cutoff filter, although this filter may be omitted in some embodiments. In some embodiments, the sensor 1800 may also have various pattern matrix filter to place over individual pixel, such as a Bayer filter with a grid of RBG (and possibly broadband white) photosensors. In some embodiments, filters having Bayer patterns may be modified to include UV and/or IR sensor channels to Bayer pattern, which may give the ability to get independent RBG+UV or IR sensitivity. The system also include a narrow field of view UV sensor 1804 and lens 1806 and a wide field of view UV sensor 1808 and lens 1810. The narrow field of view UV sensor 1804 may function as a sensor for precise targeting/aimpoint determination, while the wide field of view UV sensor 1808 with blocking filter enables you to look wide for beacon detection. An emitter 1812, such as an APD, may be included to provide a high speed communications channel via lens 1814.

FIG. 18B illustrates a hybrid FOV detector system that includes a focal plane array 1820 in alignment with a forward lens 1822. A narrow field of view sensor (such as an APD)/emitter 1824 (such as a laser diode) may provide a high speed communications channel. The focal plane array 1820 and sensor/emitter 1824 may share a beam splitter 1826. The beam splitters 1826 may be standard, semi-silvered, first surface mirror, and may have any ratio that may be tailored to a desired sensitivity and/or may be a dichroic filter (such as UV and IR), which may allow for precise targeting in the UV spectrum while high speed data may be transmitted in the IR spectrum. The use of a beam splitter may be particularly useful to reduce the size, weight, and/or power, as well as keeps all the optical components aligned and concentric.

In one particular hybrid FOV detection system shown in FIG. 18C may include a telephoto system further includes an intervening beam-splitting element 1842 disposed between the front lens element 1844 and a visible/near IR detector 1846 (and IR filter 1840) to reflect and transmit converging light rays from the front lens element 1844. That is, the intervening beam-splitter 1842 produces a reflected converging light ray path and a transmitted converging light ray path. A UV sensor 1848 coupled to a narrow band filter 1850 is arranged in the reflected converging light ray path, downstream to the beam-splitting element 1842, to enable wide FOV UV beacon detection. An optical (visual) sensor 1852 coupled to a wide band filter 1854 is arranged in the light ray path to enable narrow FOV imaging. Some modifications to the detection system may include implementing multiple lens components within each lens element (doublet, triplet, etc.) for various degrees of correction to chromatic aberration, adjusting a position of one or both lens elements to change the focal lengths and/or appropriately configuring the filters based on the degree of achromaticity (e.g. the higher the degree of aberration correction, the wider the band of the filter). An emitter 1856, such as an APD, may be included to provide a high speed communications channel.

FIG. 18D illustrates a narrow angle detector 1860 and a wide angle focal point array 1862 through a single lens 1864 using a beam splitter 1866. As noted above, the wide angle sensor 1862 may looks at contextual information, such as beacons for orientation and position determination, while the narrow angle sensor 1860 may be used for high resolution targeting.

FIGS. 19A-19E illustrate various embodiments of filter and chip array arrangements for use in hybrid FOV detection systems. FIG. 19A illustrates a modified Bayer filter that includes an arrangement of red, green, blue, and UV sensitive filters, although some embodiments may include IR sensitive filters in addition to or in place of the UV filters. FIG. 19B illustrates a sensor and emitter array having a combination of sensors and emitters on a single chip. In such embodiments, the receiver sensors may have filters, while the emitters are free of filters. FIG. 19C illustrates an array of UV and visible light sensing detectors. FIG. 19D illustrates another embodiment of a sensor and emitter array having a combination of sensors and emitters on a single chip. FIG. 19E illustrates an array having APD and visible light sensors.

It will be appreciated that the detection systems described above are merely examples. Additionally, the illustrated embodiments are simplified and may include any number of other components. Additionally, while many of the lenses are illustrated as being in the form of a double convex lens, the various lens may take other forms, such as compound lens with complex elements. It will be appreciated that the various sensors described above may be used with filters to remove noise and to tune the wavelength sensitivity of the various sensors.

In an alternative embodiment the optical camera may be substituted for a second UV sensor. In such a configuration, the system implements a wide FOV beacon detector and may be used to detect emitters that are used for orientation calibrating and simultaneously implements a narrow FOV beacon detector to detect emitters that are used for virtual ballistic calculation (targeting and hit determination).

Auto Ranging Modality

In some embodiments, it may be desirable to provide an additional distance determination mechanism. This may be particularly useful if there are GPS and/or other location determination issues. In such embodiments, each weapon device may be fitted with an optical sensor (such as a camera) that is able to capture images of visible objects within a field of view of the weapon device. This optical sensor may capture images (still and/or video) of one or more objects. The base station servers may analyze these images and detect objects present within the images. For example, the base station servers may use machine learning techniques to perform object detection of some or all of the objects visible within a particular image. If an identified object matches a known object, the base station server may look up known dimensions of the particular object. The base station server may then use the known dimensions, the size of the object as it appears within the image, and any known information about the location and/or orientation of the weapon device to determine the distance between the weapon device and the detected object. For example, a particular human target may be approximately six feet tall. Based on the size of the human target in the image, the base station server may utilize the scale of the image to determine how far away the human target is from the weapon device.

Such features may be used for any number of objects. For example, humans, human heads, particular vehicle models, particular building, etc. may all be an exact and/or similar known size, which enables the base station servers to derive a distance between the weapon device and the objects based on a relative scale of object. Once the distance is determined, a ballistic outcome may be calculated using the calculated distance in place of GPS-driven distances.

Figure 20:
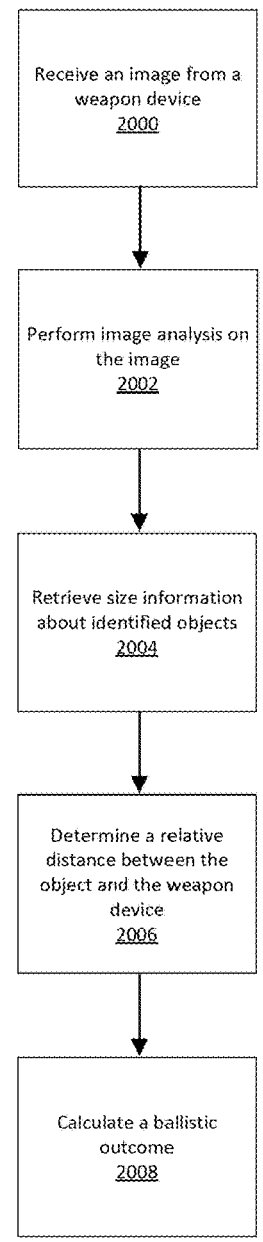
FIG. 20 is a flowchart of a process for performing auto-ranging according to some embodiments of the present invention.

FIG. 20 is a flowchart of a process for determining distance between objects without the use of GPS. The process may be performed by a weapon device and/or a base station server. Process may begin at block 2000 by receiving an image from an optical sensor of a weapon device. At block 2002, image analysis, such as object detection, may be performed on the image to identify one or more objects present within the image. Once any objects are detected, size information about each of the identified objects may be retrieved at block 2004. The system may then compare the size of the object within the image and the known size information, along with knowledge of the scale of the image, to determine a relative distance between the weapon device and the detected object at block 2006. This distance may optionally be used in a ballistic outcome calculation at block 2008.

UV Enhanced Blanks

In some combat training scenarios, to create a more realistic training environment for the trainees, the various weapons involved in the combat training may be loaded with blank rounds. The firing of blanks may create a more realistic firing response for the shooter, as well as may provide visual indications of firing positions for other users in the training environment. However, typically blank ammunition rounds may not be easily detected by the various UV sensors in the training environment, as the blank ammunition rounds may not give off a light signature in the UV spectrum when fired. To address these concerns, some embodiments may implement blanks that contain one or more chemicals that do produce a light signature within the UV spectrum when ignited. Use of such UV enhanced blanks may provide additional UV beacon signal for processing, and may allow the combat training system to more reliably detect muzzle flashes that are indicative of firing events and firing positions of one or more users, vehicles, and/or weapons.

Figure 21:
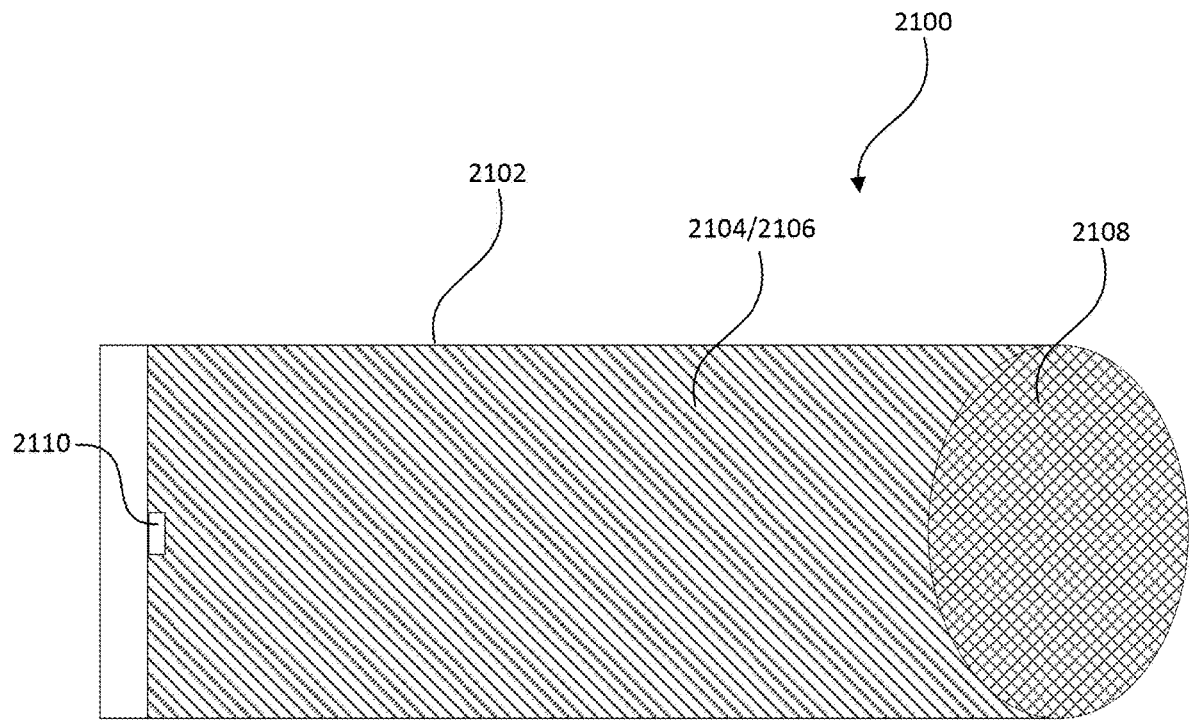
FIG. 21 is schematic of a UV blank round according to some embodiments of the present invention.

FIG. 21 illustrates a general schematic of a blank ammunition round 2100. The blank ammunition round 2100 may include a shell casing 2102, which may be sized and shaped to match any type of ammunition that is involved in a particular simulation. As just one non-limiting example, the shell casing 2102 may be sized and shaped to match hand gun rounds, machine gun rounds, rifle rounds, mortal shells, tank shells, and/or other forms of handheld or artillery weaponry. The shell casing 2102 may be generally cup-shaped and may define an open interior that receives a volume of propellant 2104, such as smokeless powder. Some embodiments may mix an additional chemical 2106 with the propellant that gives off a UV signal when ignited. For example, the additional chemical 2106 may include magnesium and/or other materials. A rear end of the shell casing 2102 may include or be coupled with an ignition device 2110, such as a primer, which may be adjacent to the propellant 2104. A forward end of the shell casing 2102 may be open, which facilitates loading of the propellant 2104 and/or additional chemical 2106 within the interior of the shell casing 2102. A plug or wad 2108 may be positioned proximate a forward tip of the shell casing 2102 and may seal the propellant 2104 and additional chemical 2106 within the interior of the shell casing 2102. In some embodiments, rather than, or in addition to, including a wad 2108, the forward tip of the shell casing 2102 may be crimped closed.

In operation, a trigger pull of a weapon may cause a firing pin or other striker to impact and ignite the ignition device 2110, which in turn ignites the propellant 2104 and additional chemical 2106. Upon ignition, the propellant 2104 and additional chemical 2106 may be propelled out the barrel of the weapon, where the ignited materials may be visible as a muzzle flash. Due to the chemical makeup of the additional chemical 2106, the muzzle flash may have a UV signature that may be detected using any of the UV sensor arrays disclosed herein.

Tilting Narrowband Filter

Embodiments of the present invention may use filters to ensure that the optical sensing array operates on a narrow, out-of-band set of wavelengths. In particular, embodiments may utilize interference filters that use stacks of dielectric material for different indices of diffraction. Different thicknesses and/or materials for each layer may be tuned to dial in a filter to be reflective or transmissive at certain wavelengths. A notch may be made at specific wavelengths to provide an operating range for the optical sensing array. This narrow notch is important, as it enables sunlight and other UV noise (such as in-band noise) to be filtered out. Some types of interference filters may be affected by temperature swings. For example, an operating wavelength may of a diode may shift due to change in temperature. When this happens, the receiver (optical sensing array) and beacon emitter narrowband frequencies may move relative to one another (i.e., the filter notch for the optical sensing array no longer matches the emitter frequency), which may result in a loss of sensitivity and/or connectivity. In such instances, there is a need to be able to retune the notch to maintain the desired sensitivity between the receiver and emitter.

Such filters may be tuned by tilting the filter, which alters the path through the filter and shifts the effective wavelength (or range) of the notch. Based on these principles, some embodiments, utilize tunable narrowband filter that operate by tilting the filter when a shift in wavelength occurs. In some embodiments, a servo system and/or a mechanical actuator (such as a wax motor) may be coupled with the filter that adjusts/tilts the filter based on the current temperature. In some embodiments, the adjustment of the filter angle may be performed automatically based on a temperature of the filter. For example, a wax motor may be used that automatically shifts the filter with temperature changes based on known phase change behavior of the wax being used. In other embodiments, a separate temperature sensor may be used that detects a temperature near the filter and sends a signal to an actuator (such as a servo motor) that causes the actuator to adjust an angle of the filter. In other embodiments, an actuator may be used that adjusts a tilt of the filter based on a measured change in wavelength. For example, one or more sensors may be provided that detect an effective wavelength of the filter and, whenever changes are detected, sending a signal to the actuator to recalibrate the filter.

Binary Optical System

As discussed above, in some embodiments each weapon device may implement a hybrid optical system that combines a lower resolution wide-angle system with a conventional high resolution telescopic system. In some embodiments, both of these optical systems may be integrated into a single chip, which may help reduce processing load while still providing the necessary detail for proper targeting. For example, the telescopic system provides high resolution narrow field imaging for aimpoint determination, while the wide angle system provides environmental context based on the location of one or more fiducial beacons.

As just one example, the binary optical system may include a UV channel and a broadband and/or IR channel. This allows the system to see both the real scene and the UV signature of any beacons (mobile or fiducial) present within a field of view of the weapon device.

In some embodiments, rather than including both optical sensor systems on a single chip, the optical systems may be configured to be used alternatively. For example, the two optics systems may be coupled with a flip lens that enables a single optic system to operate at a given time. In some embodiments, the wide angle optic system may be used when the user is not aiming at a target. This allows the weapon device to image a number of fiducial beacons to determine orientation and/or position information for the weapon device and relative position information between the weapon device and any targets. The flip lens may switch to the telephoto lens when in an aiming mode, allowing the use to precisely aim at a particular target. The determination that a user is aiming the weapon device may be made in a similar manner as the determination that a trigger event is imminent as described elsewhere herein.

Figure 22:
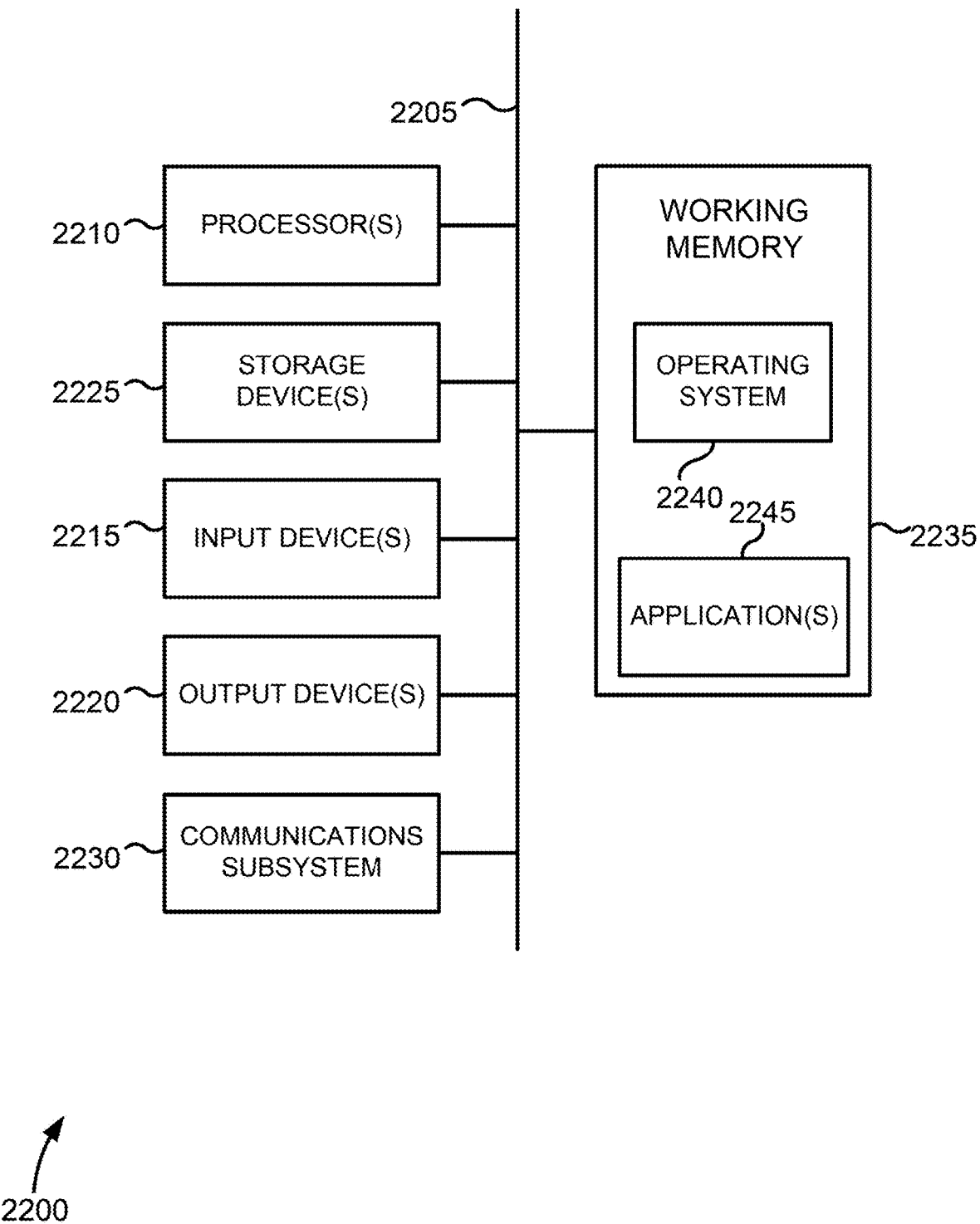
FIG. 22 is block diagram of a computing system according to some embodiments of the present invention.

A computer system as illustrated in FIG. 22 may be incorporated as part of the previously described computerized devices. For example, computer system 2200 can represent some of the components of computing devices, such as the various weapon devices, mobile beacons, fiduciary beacons, base station servers, and/or other computing devices described herein. FIG. 22 provides a schematic illustration of one embodiment of a computer system 2200 that can perform the methods provided by various other embodiments, as described herein. FIG. 22 is meant only to provide a generalized illustration of various components, any or all of which may be utilized as appropriate. FIG. 22, therefore, broadly illustrates how individual system elements may be implemented in a relatively separated or relatively more integrated manner.

The computer system 2200 is shown comprising hardware elements that can be electrically coupled via a bus 2205 (or may otherwise be in communication, as appropriate). The hardware elements may include a processing unit 2210, including without limitation one or more processors, such as one or more special-purpose processors (such as digital signal processing chips, graphics acceleration processors, and/or the like); one or more input devices 2215, which can include without limitation a keyboard, a touchscreen, receiver, a motion sensor, a camera, a smartcard reader, a contactless media reader, and/or the like; and one or more output devices 2220, which can include without limitation a display device, a speaker, a printer, a writing module, and/or the like.

The computer system 2200 may further include (and/or be in communication with) one or more non-transitory storage devices 2225, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 2200 might also include a communication interface 2230, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 2230 may permit data to be exchanged with a network (such as the network described below, to name one example), other computer systems, and/or any other devices described herein. In many embodiments, the computer system 2200 will further comprise a non-transitory working memory 2235, which can include a RAM or ROM device, as described above.

The computer system 2200 also can comprise software elements, shown as being currently located within the working memory 2235, including an operating system 2240, device drivers, executable libraries, and/or other code, such as one or more application programs 2245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 2225 described above. In some cases, the storage medium might be incorporated within a computer system, such as computer system 2200. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 2200 and/or might take the form of source and/or installable code, which, upon compilation and/or installation on the computer system 2200 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 2210, applications 2245, etc.) Further, connection to other computing devices such as network input/output devices may be employed.

Some embodiments may employ a computer system (such as the computer system 2200) to perform methods in accordance with the disclosure. For example, some or all of the procedures of the described methods may be performed by the computer system 2200 in response to processing unit 2210 executing one or more sequences of one or more instructions (which might be incorporated into the operating system 2240 and/or other code, such as an application program 2245) contained in the working memory 2235. Such instructions may be read into the working memory 2235 from another computer-readable medium, such as one or more of the storage device(s) 2225. Merely by way of example, execution of the sequences of instructions contained in the working memory 2235 might cause the processing unit 2210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 2200, various computer-readable media might be involved in providing instructions/code to processing unit 2210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 2225. Volatile media include, without limitation, dynamic memory, such as the working memory 2235. Transmission media include, without limitation, coaxial cables, copper wire, and fiber optics, including the wires that comprise the bus 2205, as well as the various components of the communication interface 2230 (and/or the media by which the communication interface 2230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 2230 (and/or components thereof) generally will receive the signals, and the bus 2205 then might carry the signals (and/or the data, instructions, etc. carried by the signals) to the working memory 2235, from which the processor(s) 2205 retrieves and executes the instructions. The instructions received by the working memory 2235 may optionally be stored on a non-transitory storage device 2225 either before or after execution by the processing unit 2210.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A combat simulation device, comprising:
   at least one processing device; and
   a memory device having instructions stored thereon that, when executed by the at least one processing device cause the at least one processing device to:
   receive a trigger event from a weapon device;
   receive image data from an optical sensor array of the weapon device of a field of view of the weapon device;
   receive position and orientation information of the weapon device at a time of the trigger event;
   execute selective processing of the image data by using image frames of the image data that are indicative of factors including:
   a timestamp associated with the trigger event,
   position and orientation information of the weapon device,
   a type of the weapon device, and
   a movement of the weapon device or a target;
   analyze the image frames associated with at least one of the factors to determine an identity and location of the target, wherein the location of the target is optically encoded for receiving by the optical sensor array; and
   calculate a ballistic outcome by simulating canting effects on the weapon device and based at least in part on the position and orientation information of the weapon device, the identity and location of the target, and ballistic characteristics of a simulated round fired from the weapon device.

2. The combat simulation device of claim 1, wherein: the combat simulation device is the weapon device.

3. The combat simulation device of claim 1, wherein: the position information comprises one or both of global navigation satellite system (GNSS) data and global positioning satellite real-time kinematics (GPS-RTK) data.

4. The combat simulation device of claim 1, wherein: the image data comprises data sensed by one or more of an ultraviolet (UV) light sensor array or an infrared (IR) sensor array.

5. The combat simulation device of claim 1, wherein: the orientation information is provided by an inertial measurement unit (IMU) of the weapon device.

6. The combat simulation device of claim 1, wherein: the memory device further comprises instructions that cause the at least one processing device to determine movement data associated with one or both of the weapon device and the target; and
   calculate lead or lag for the simulated round based on the movement data associated with one or both of the weapon device and the target, wherein calculating the ballistic outcome is further based on the lead or lag.

7. The combat simulation device of claim 1, wherein: calculating a ballistic outcome comprises determining a bullet drop based at least in part on the ballistic characteristics, the position information of the weapon device, and the location of the target.

8. A laserless combat training system, comprising:
an optical target beacon arranged within a volume space;
a weapon device operable by a user, wherein the weapon device is respectively coupled to an optical sensor array, a position module, and an orientation module; and
one or more programmed processors configured to:
receive a location of an optical target and of the weapon device within the volume space, wherein the location is received from encoded information from the optical target beacon;
determine one or more relative locations using the received locations;
receive an orientation of the weapon device via the orientation module;
receive position information of the weapon device via the position module;
receive optical image data of the volume space via the optical sensor array;
receive a trigger event from the weapon device;
in response to receiving the trigger event, receive optical image data via the optical sensor array;
execute selective processing of the optical image data by using image frames of the image data that are indicative of factors including:
a timestamp associated with the trigger event,
position and orientation information of the weapon device,
a type of the weapon device, and
a movement of the weapon device or a target;
analyze the image frames associated with at least one of the factors to determine an identity and location of the target, wherein the location of the target is optically encoded for receiving by the optical sensor array; and
calculate a virtual ballistic outcome using the orientation of the weapon device and optical image data and by simulating canting effects on the weapon device and based at least in part on the position and orientation information of the weapon device, the identity and location of the target, and ballistic characteristics of a simulated round fired from the weapon device.

9. The laserless combat training system of claim 8, further comprising:
at least one fixed beacon that provides environmental context data when imaged within a field of view of the weapon device.

10. The laserless combat training system of claim 8, further comprising: at least one beacon affixed to a mobile object within the volume space.

11. The laserless combat training system of claim 8, wherein: the optical target beacon is affixed to a human target.

12. The laserless combat training system of claim 8, wherein: the one or more programmed processors are part of a server base station that is managing a combat training simulation.

13. The laserless combat training system of claim 8, wherein: the one or more programmed processors are further configured to determine a first orientation; and
the orientation of the weapon device comprises a second orientation and is based on the received optical image data, relative locations, and the first orientation, wherein the second orientation is an updated/calibrated version of the first orientation.

14. The laserless combat training system of claim 8, wherein:
the virtual ballistic outcome is further based at least in part on current real or simulated weather conditions.

15. A method of determining a simulated ballistic result in a laserless combat simulation system, comprising:
receiving a trigger event from a weapon device;
receiving image data from the weapon device of a field of view of the weapon device;
receiving position and orientation information of the weapon device at the time of a trigger event;
executing selective processing of the image data by using image frames of the image data that are indicative of factors including:
a timestamp associated with the trigger event,
position and orientation information of the weapon device,
a type of the weapon device, and
a movement of the weapon device or a target;
analyzing the image frames associated with at least one of the factors to determine an identity and location of the target, wherein the location of the target is encoded on an optical signal received at the weapon device; and
calculating a ballistic outcome by simulating canting effects on the weapon device and based at least in part on the position and orientation information of the weapon device, the identity and location of the target, and ballistic characteristics of a simulated round fired from the weapon device.

16. The method of determining a simulated ballistic result in a laserless combat simulation system of claim 15, further comprising: communicating the ballistic outcome to one or both of the weapon device and the target.

17. The method of determining a simulated ballistic result in a laserless combat simulation system of claim 15, wherein:
calculating the ballistic outcome further comprises determining whether any obstructions were positioned between the weapon device and the target at the time of the trigger event.

18. The method of determining a simulated ballistic result in a laserless combat simulation system of claim 15, further comprising:
continuously calibrating a position module of the weapon device prior to detecting the trigger event.

19. The method of determining a simulated ballistic result in a laserless combat simulation system of claim 15, wherein:
the identity and location of the target are determined based on a pulse-coded signal emitted by the target.

20. The method of determining a simulated ballistic result in a laserless combat simulation system of claim 15, further comprising:
determining that the weapon device is aimed at one or more of the target and a fixed beacon; and
communicating a signal to the one or more of the target and a fixed beacon that causes the one or more of the target and the fixed beacon to emit a pulse-coded signal that identifies the one or more of the target and the fixed beacon.

* * * * *